(12) United States Patent
Van Gaasbeck et al.

(10) Patent No.: US 7,856,294 B2
(45) Date of Patent: Dec. 21, 2010

(54) INTELLIGENT SYSTEM AND METHOD FOR SPACECRAFT AUTONOMOUS OPERATIONS

(75) Inventors: James Van Gaasbeck, Melbourne Beach, FL (US); Philip Courtney, Nederland, CO (US); Don Gardner, Longmont, CO (US)

(73) Assignee: SRA International, Inc., Fairfax, VA (US)

( * ) Notice: Subject to any disclaimer, the term of this patent is extended or adjusted under 35 U.S.C. 154(b) by 385 days.

(21) Appl. No.: 12/000,643

(22) Filed: Dec. 14, 2007

(65) Prior Publication Data

US 2009/0157236 A1 Jun. 18, 2009

(51) Int. Cl.
*G01C 23/00* (2006.01)

(52) U.S. Cl. .................. 701/3; 701/2; 701/29; 701/36; 701/54

(58) Field of Classification Search .............. 701/2, 701/3, 13, 29, 33, 35, 36, 54; 244/158.1; 714/1, 2, 7
See application file for complete search history.

(56) References Cited

U.S. PATENT DOCUMENTS

| 4,654,846 | A | * | 3/1987 | Goodwin et al. | .............. | 714/13 |
| 4,739,498 | A | * | 4/1988 | Eichhorn | .................... | 365/200 |
| 6,128,555 | A | * | 10/2000 | Hanson et al. | ................. | 701/13 |
| 7,558,192 | B1 | * | 7/2009 | Truong et al. | ............... | 370/216 |

* cited by examiner

*Primary Examiner*—Gertrude Arthur Jeanglaud
(74) *Attorney, Agent, or Firm*—Holland & Knight LLP

(57) ABSTRACT

The intelligent system for autonomous spacecraft operations includes an on-board Autonomous Operations subsystem integrated with an on-ground Web-based Remote Intelligent Monitor System (RIMS) providing interface between on-ground users and the autonomous operations intelligent system. The on-board Autonomous Operation subsystem includes an On-Orbit Checkout Engine (OOCE) unit and an Autonomous Tasking Engine (ATE) unit. Spacecraft Command Language (SCL) engine underlies the operations of the OOCE, ATE and RIMS, and serves as an executer of commands sequences. The OOCE uses the SCL engine to execute a series of SCL command scripts to perform a rapid on-orbit checkout of subsystems/components of the spacecraft in 1-3 days. The ATE is a planning and scheduling tool which receives requests for "activities" and uses the SCL scripts to verify the validity of the "activity" prior to execution, and scheduling the "activity" for execution or re-scheduling the same depending on verification results. Automated Mission Planning System (AMPS) supports the ATE operations. The ATE uses a priority schedule if multiple "activities" are to be executed.

40 Claims, 34 Drawing Sheets

FIG. 17

* Only one directory can be specified on the "vast properties" configuration file.

| | | | |
|---|---|---|---|
| C:\data | | | |

File  Edit  View  Favorites  Tools  Help

← Back ▾ → ⊙ | 🔍 Search | 📁 Folders | ▦ ▾

Address 🗋 C:\data

| Folders | × | Name ▲ | Size | Type | Da |
|---|---|---|---|---|---|
| ⊟ 📁 data | | 📁 ADMS | | File Folder | 4/1 |
|   📁 ADMS | | 📁 ADS | | File Folder | 4/1 |
|   📁 ADS | | 📁 Autonomy | | File Folder | 4/1 |
|   📁 Autonomy | | 📁 CDL | | File Folder | 4/1 |
|   ⊟ 📁 CDL | | 📁 ESA | | File Folder | 4/1 |
|     ⊟ 📁 Finished-Images | | 📁 Fault-Protection | | File Folder | 4/1 |
|       📁 Blue | | 📁 HET | | File Folder | 4/1 |
|       📁 Green | | 📁 IAU | | File Folder | 4/1 |
|       📁 Pan | | 📁 IGOR | | File Folder | 4/1 |
|       📁 Red | | 📁 ISC | | File Folder | 4/1 |
|     📁 FTP-Incoming | | 📁 LPT | | File Folder | 4/1 |
|     📁 Nav Data | | 📁 MCU-100 | | File Folder | 4/1 |
|     📁 Processed-Telemetry | | 📁 MVIS | | File Folder | 4/1 |
|     ⊟ 📁 Raw-Passes | | 📁 ROPE | | File Folder | 4/1 |
|       📁 Raw-Pass-{date}-{time} | | 📁 StoredTLM | | File Folder | 4/1 |
|     📁 ROPE-Parameters | | 📁 Terma | | File Folder | 4/1 |
|     📁 TIE | | 📄 AAA_README.TXT | 1 KB | Text Document | 4/1 |
|   📁 ESA | | 📄 CADU_ACME.bin | 54,883 KB | BIN File | 4/5 |
|   📁 Fault-Protection | | 📄 CADU_CPU_CONSOLE.bin | 6,710 KB | BIN File | 4/8 |
|   📁 HET | | | | | |
|   📁 IAU | | | | | |
|   📁 IGOR | | | | | |
|   📁 ISC | | | | | |
|   📁 LPT | | | | | |
|   📁 MCU-100 | | | | | |
|   📁 MVIS | | | | | |
|   📁 ROPE | | | | | |
|   📁 StoredTLM | | | | | |
|   📁 Terma | | | | | |
| ⊞ 📁 DELL | | | | | |

FIG. 21

| TacSat-2 Mission Tasking ||||||
|---|---|---|---|---|---|
| Activities | Health Maintenance | Schedule Management | | Report Writers | Home |
| Imager ▽ Go | Power Management ▽ Go | ATE Delete Scheduled Script ▽ Go | | ATE Requested Schedule ▽ Go | |
| Scheduled Activities ||||||
| Activity ID | Creation Date | Author | Activity Name | Activity Decription | Select ? |
| 3 | 2004-08-09 12:34:09.123 | Paul | Imager | Image pass over ABQ | ◉ |
| 4 | 2004-08-10 13:55:15.443 | Matthew | CDL Pass | Dump ABQ Image | ○ |
| 5 | 2004-08-10 15:24:07.733 | Brian | Dump Momentum | Orbital Maintenance and Momentum Dumping | ○ |
| | Delete Selected | Commit to Schedule ||||

FIG.29

FSW Command History Buffer

| Slot | Mnemonic | Data Field | APID | FC | Secs | SubSecs | GMT | Exec Stat | SID | DID | Exec Mode |
|---|---|---|---|---|---|---|---|---|---|---|---|
| 0 | LPTCDH | x 24 24 00 05 | 1664 | 2 | 1120592979 | 12807 | CALC GMT | x00 | x08 | x00 | x00 |
| 1 | LPTRCM | x 24 24 00 10 | 1662 | 2 | 1120592977 | 5446 | CALC GMT | x00 | x08 | x00 | x00 |
| 2 | LPT_TX_OFF | x 04 20 00 00 | 1871 | 106 | 1120592976 | 39845 | CALC GMT | x00 | x08 | x00 | x00 |
| 3 | MCU_100_OFF | x 07 02 00 00 | 1871 | 134 | 1120592976 | 36966 | CALC GMT | x00 | x08 | x00 | x00 |
| 4 | ACS_ENTER_SAFEMODE | x 55 55 55 55 | 1400 | 200 | 1120592975 | 32353 | CALC GMT | x00 | x08 | x00 | x00 |
| 5 | QM_SET_EXEC_PTR | x 1D 00 00 55 | 1800 | 3 | 1120592224 | 5115 | CALC GMT | x00 | x08 | x00 | x00 |
| 6 | QM_SET_EXEC_PTR | x 15 00 00 55 | 1800 | 3 | 1120592224 | 3240 | CALC GMT | x00 | x08 | x00 | x00 |
| 7 | QM_SET_EXEC_PTR | x 18 00 00 55 | 1800 | 3 | 1120592223 | 37147 | CALC GMT | x00 | x08 | x00 | x00 |
| 8 | QM_SET_EXEC_PTR | x 12 00 00 55 | 1800 | 3 | 1120592223 | 35155 | CALC GMT | x00 | x08 | x00 | x00 |
| 9 | QM_SET_EXEC_PTR | x 1E 00 00 55 | 1800 | 3 | 1120592223 | 29141 | CALC GMT | x00 | x08 | x00 | x00 |
| 10 | QM_SET_EXEC_PTR | x 0F 00 00 55 | 1800 | 3 | 1120592223 | 27070 | CALC GMT | x00 | x08 | x00 | x00 |
| 11 | QM_SET_EXEC_PTR | x 11 00 00 55 | 1800 | 3 | 1120592223 | 20935 | CALC GMT | x00 | x08 | x00 | x00 |
| 12 | SM_ENAB_FMGT | x 55 55 55 55 | 1860 | 6 | 1120592223 | 19103 | CALC GMT | x00 | x08 | x00 | x00 |
| 13 | SM_CLR_PARAMS | x 55 55 55 55 | 1860 | 7 | 1120592223 | 10978 | CALC GMT | x00 | x08 | x00 | x00 |
| 14 | QM_SET_LOAD_PTR | x 1E 00 96 55 | 1800 | 5 | 1120592218 | 19779 | CALC GMT | x00 | x08 | x00 | x00 |
| 15 | QM_SET_LOAD_PTR | x 1E 00 78 55 | 1800 | 5 | 1120592217 | 33766 | CALC GMT | x00 | x08 | x00 | x00 |
| 16 | QM_SET_LOAD_PTR | x 1E 00 64 55 | 1800 | 5 | 1120592217 | 3454 | CALC GMT | x00 | x08 | x00 | x00 |
| 17 | QM_SET_LOAD_PTR | x 1E 00 32 55 | 1800 | 5 | 1120592216 | 19393 | CALC GMT | x00 | x08 | x00 | x00 |
| 18 | QM_SET_LOAD_PTR | x 1E 00 00 55 | 1800 | 5 | 1120592211 | 8243 | CALC GMT | x00 | x08 | x00 | x00 |
| 19 | QM_SET_LOAD_PTR | x 18 00 64 55 | 1800 | 5 | 1120592208 | 31641 | CALC GMT | x00 | x08 | x00 | x00 |
| 20 | QM_SET_LOAD_PTR | x 18 00 00 55 | 1800 | 5 | 1120592205 | 39070 | CALC GMT | x00 | x08 | x00 | x00 |
| 21 | UFM_NOOP | x 55 55 55 55 | 1750 | 41 | 1120592205 | 24847 | CALC GMT | x00 | x08 | x00 | x00 |
| 22 | QM_SET_LOAD_PTR | x 15 00 0A 55 | 1800 | 5 | 1120592205 | 22938 | CALC GMT | x00 | x08 | x00 | x00 |
| 23 | QM_SET_LOAD_PTR | x 15 00 00 55 | 1800 | 5 | 1120592204 | 38761 | CALC GMT | x00 | x08 | x00 | x00 |
| 24 | QM_SET_LOAD_PTR | x 14 00 00 55 | 1800 | 5 | 1120592202 | 24155 | CALC GMT | x00 | x08 | x00 | x00 |
| 25 | QM_SET_LOAD_PTR | x 12 00 00 55 | 1800 | 5 | 1120592201 | 38175 | CALC GMT | x00 | x08 | x00 | x00 |
| 26 | QM_SET_LOAD_PTR | x 11 00 00 55 | 1800 | 5 | 1120592199 | 15536 | CALC GMT | x00 | x08 | x00 | x00 |
| 27 | QM_SET_LOAD_PTR | x 17 00 14 55 | 1800 | 5 | 1120592198 | 29325 | CALC GMT | x00 | x08 | x00 | x00 |

INTELLIGENT SYSTEM AND METHOD FOR SPACECRAFT AUTONOMOUS OPERATIONS

The Invention described herein was developed through research sponsored by the Air Force Research Lab, Contract No. FA 9453-04-C-0011. The United States Government has certain rights to the Invention.

FIELD OF THE INVENTION

The present invention is directed to a spacecraft command and control system, and particularly to an on-board intelligent system operating autonomously to perform an automated checkout of a spacecraft sub-system and components and capable of scheduling, rescheduling, and executing high level "objectives" involving the spacecraft components and/or subsystems.

The present invention is further related to a spacecraft control/command autonomy system which includes key mission-enabling technologies, e.g., On Orbit Checkout Engine (OOCE) system performing rapid checkout and calibration, and Autonomous Tasking Engine (ATE) system, for planning on-board "activities" and scheduling/rescheduling their execution. Both OOCE and ATE systems are integrated with the Spacecraft Command Language (SCL).

The present invention is also directed to an autonomous spacecraft intelligent control/command system which in addition to the on-board logic, e.g., OOCE and ATE, includes a Remote Intelligent Monitor System (RIMS) which may reside on the ground segment (or some other location remote from the spacecraft). The RIMS is a Web-based system which uses the SCL to provide a Web-centric monitoring and control system using a Web-browser interface with on-ground users. The SCL/RIMS communicates with the on-board OOCE and ATE systems to perform the automated checkout of the spacecraft, as well as to schedule and reschedule execution of mission "activities" in an effective and efficient manner which dramatically reduces on-ground and on-board man power requirements.

In overall concept, the present invention is directed to a spacecraft intelligent system capable of developing a knowledge-base used to perform automated checkout of a spacecraft shortly after the launch, reduction of the early orbit checkout period to 1-3 days, and reduce time latency between the launch and operation of the spacecraft subsystems components. For this reason, the OOCE, e.g., the on-board logic, uses the SCL engine to execute a series of scripts (sequences) to exercise the spacecraft payload interfaces to perform a rapid checkout of the devices (subsystems, components), and prove their operationally correct functioning. The OOCE collects information on the ground and generate the SCL scripts which are executed on-board the spacecraft shortly after the spacecraft reaches the orbit.

The present invention is also directed to a planning and scheduling autonomous on-board spacecraft system which uses "just in time" constraint checking to verify that the spacecraft has the necessary resources (power, fuel, etc.) and is free of any mission constraint violations prior to execution of the "activity". If the activity passes the mission constraints, the SCL system schedules the activity for execution. If however, the activity cannot be scheduled, the ATE system tries to reschedule it within the window of time given for the activity request. The ATE system applies priority principal when schedules and reschedules the activities.

BACKGROUND OF THE INVENTION

Fault detection, isolation and recovery (FDIR) has generally been the responsibility of the ground system in the overall spacecraft control/command arrangement. Problems encountered with sensor, components or subsystems on the spacecraft had to be addressed and resolved from the ground. In such an arrangement, ground architectures support the dynamic upload of the resolution to complex spacecraft. This has been a continuing problem, since the number of monitor points and control points in the modern complex spacecraft systems exceeds 32,000, which represents a task which is close to impossible when the FDIR is completely based on the ground system.

In order to reduce the cost and complexity of operations, there is a need for FDIR to be resolved, whether completely or partially on-board of a spacecraft and ideally in a scalable hierarchical fashion.

Planning and scheduling of "activities" is another area of the spacecraft control/command where the complexity of operations makes it advantageous to move at least partially to on-board systems. Planning and scheduling are resource intensive processes both in terms of manpower and hardware. Each scheduling may take an extensive period of time to finalize and convert into command loads for uplink from ground to spacecraft.

Therefore the ability of an autonomous on-board checkout of the spacecraft and on-board planning and re-planning is a desirable feature of spacecraft operations to provide an operational capability of the spacecraft in the fraction of the time allotted for FDIR in present systems and reduces operation costs and flying the spacecraft with a minimum flight crew.

SUMMARY OF THE INVENTION

It is therefore an object of the present invention to provide an intelligent system for spacecraft operations capable of autonomous rapid checkout of the components and sub-systems of the spacecraft in a time as short as 1-3 days to provide an increased responsiveness to various "requests" by reducing the time latency between the launch and operational use of the spacecraft, by increasing effective spacecraft mission lifetime, by reducing ground operational requirements during early orbit checkout, and by reducing ground manpower requirements and increasing mission effectiveness.

It is another object of the present invention to provide a spacecraft autonomous system capable of planning and scheduling on-board activities where the on-board planning and re-planning provides the reduced operation cost as well as reduced ground and on-board manpower requirements.

It is still another object of the present invention to provide an on-board autonomous in-orbit checkout system and autonomous tasking system in conjunction with a ground segment which is based on the web-centric approach to allow geographically diverse teams to cooperate in the planning and tasking of the experiments and to permit remote monitoring of spacecraft operations in a standard cost-effective manner.

The present intelligent system for a spacecraft autonomous operations, comprises:
 (a) an on-board autonomous operations system, including:
   an On-Orbit Checkout Engine (OOCE) system, and
   an Autonomous Tasking Engine (ATE) system;
 (b) a Remote Intelligent Monitor System (RIMS) in communication with said on-board autonomous operations system through a communication channel, said RIMS including a user interface for Web-based communication with a plurality of user stations; and (c) a Spacecraft Command Language (SCL) infrastructure system operatively coupled to said OOCE system, ATE system, and RIMS.

The OOCE system collects checkout logic uploaded from the RIMS, generates SCL based checkout commands in accord with the checkout logic, and executes said SCL based checkout commands to perform a functional testing of respective components of the spacecrafts substantially upon the spacecraft reaches the orbit, and to perform a performance testing of the respective spacecraft components to monitor the operations state thereof.

The ATE system receives objectives uploaded from the RIMS, plans a sequence of on-board actions to attain said objectives, generates SCL based scheduling commands for the on-board actions, and executes the SCL based scheduling commands in a predetermining order.

The ATE system is coupled to on-board ephemeris and an orbit propagator to schedule, reschedule and execute said SCL based scheduling commands, and to perform short-term and long-term autonomous planning and scheduling.

The ATE system is designed to check for mission constraints violations prior to execution of the SCL based scheduling commands, and to re-schedule the execution of the on-board actions in a predetermined time window if a mission constraint violation is detected.

Based on Latitude and Longitude of a specified target, field of view of an Imager, daylight parameters, conflicts with other components of the spacecraft, and downlink or power constraints, the ATE system has the capabilities to determine a next event to image the specified target.

An on-ground Automated Mission Planning System (AMPS) unit evaluates the "activities" requests against the spacecraft power, thermal model thereof and said orbit propagator data, optimize the schedule of said objectives requests, and transmits the optimized schedule to the RIMS. RIMS translates the optimized schedule into ATE commands, and transmits it to the ATE system, wherein a Packet Generator generates command packets responsive to the ATE commands for transmission to the respective components of the spacecraft.

The RIMS is hyperlinked with the AMPS unit. The RIMS hosts the SCL system, an SQL Server database, Tomcat Web-Server, and JAVA Server Pages for creating Operations Screens and the Mission Planning Screens at on-ground user stations.

The ATE system preferably includes:
an ATE Activity Manager (ATE-AM) unit;
an ATE Plan Manager (ATE-PM) unit,
an ATE Execution Manager (ATE-EM) unit,
an ATE Script Scheduler (ATE-SS) unit, and
an ATE Event Executive (ATE-EE) unit.

Upon receiving ATE commands, the ATE-AM generates objectives to the ATE commands, and separates the objectives into near-term objectives and long-term objectives. The ATE system further proceeds with the execution of these in accordance with a near-term and a long-term schedule.

The OOCE system includes an OOCE database storing a plurality of cooperating OOCE rules, OOCE scripts, and OOCE constraints, which are based on SCL scripts and rules.

The OOCE system is loaded and started along with the Autonomy Operations System prior to the spacecraft launch. The OOCE system starts the functional testing mode thereof substantially at spacecraft separation stage as a "listen-only" test sequence during Solar Array deployment and Attitude Determination and Control System (ADCS) safemode sequence to check whether the spacecraft active systems function in the expected states and expected state transitions occur, and completes the functional testing mode substantially upon reaching the Sun Track by administering tests of the respective sub-systems/payloads/compounds of the spacecraft, including command path, Enhanced Commercial Imager, RoadRunner On-Board Processing Experiment (ROPE), and Common Data Link (CDL).

In the performance testing mode thereof, the OOCE system performs verification of operating mode changes and State of Health (SOH) telemetry for the respective components, including spacecraft subsystems and payloads, and generates a test report of a current state of each said respective component.

In both, the functional test mode and the performance test mode, the OOCE system executes the OOCE scripts/rules defining the sequence of tests to be executed for each component of the spacecraft, and also executes a conditional logic to skip a following test depending on the results from previous tests.

These and other features and advantages of the present invention will become apparent after reading a further description of the preferred embodiment in conjunction with accompanying patent Drawings.

BRIEF DESCRIPTION OF THE DRAWINGS

FIG. 17 represents the AMPS Mission Planner User interface;

FIG. 21 represents the Data Directory structure of the system of the present invention;

FIG. 29 is user interface for the Mission Planning System of the present invention;

FIG. 32 illustrates the Flight Software Command History Buffer; and

FIG. 33 schematically represents the Emergency Message Processor BLOB plug-in.

DESCRIPTION OF THE PREFERRED EMBODIMENT

Figure 1:
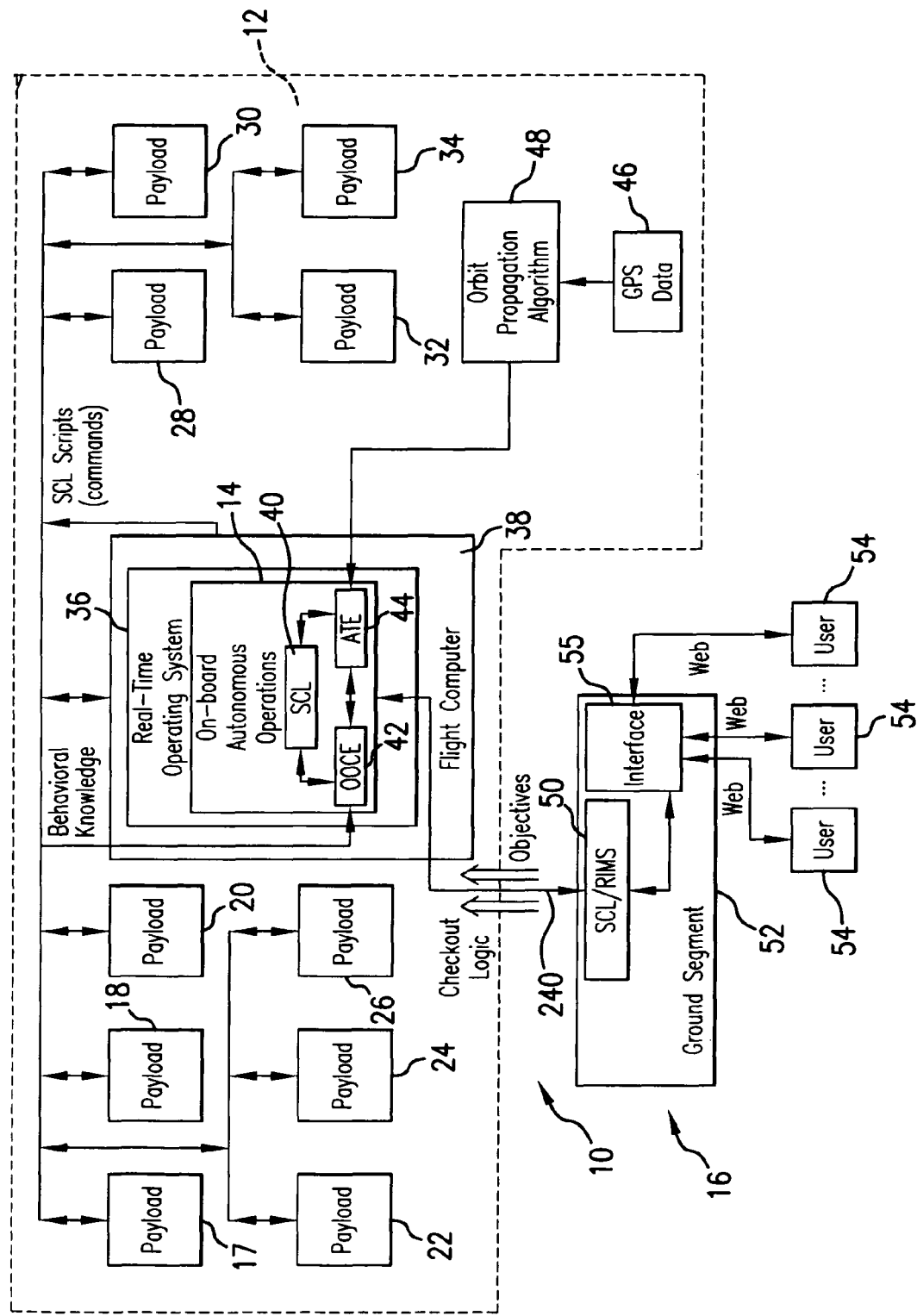
FIG. 1 is a schematic representation of the intelligent command/control system of the present invention that enables autonomous operations of a spacecraft.

Referring to FIG. 1, the intelligent control and command system 10 for operating a spacecraft 12 (also interchangeably referred to herein as a satellite) includes an on-board autonomous operations system 14 and a remote monitoring system 16 communicating with the on-board autonomous system 14, as will be described in detail in following paragraphs.

As an example, and without limiting the scope of protection and the range of applicability of the present invention to a specific spacecraft, the following disclosure relates to the TacSat-2 satellite designed to be the first in a series of satellites to support the goals of the Operationally Responsive Space (ORS) initiative in the Airforce Research Laboratory. However, the system of the present invention is also applicable to other spacecraft systems. The TacSat-2 satellite has an ambitious schedule and integrates 11 payloads, in addition to the Autonomous Operations System payload 14 designed by the Applicant of the present invention, e.g.

Enhanced Commercial Imager 17;
Roadrunner On-Board Processing Experiment (ROPE) 18;
Common data Link (CDL) 20;
Target Indicator Experiment (TIE) 22;
Hall Effect Thruster (HET) 24;
Interstellar Compass (ISC) 26;
Low Power Transmitter (LPT) 28;
Integrated GPS Occultation Receiver (IGOR) 30;
Atmospheric Density Spectrometer (ADS) 32; and
Experimental Solar Array 34.

The Autonomous Operations System 14 runs under the Real-Time Operating System 36 on the flight computer 38. The On-board Autonomous Operations System 14 includes three mark components designed by the Applicants of the subject patent application system.

The underlying autonomy infrastructure is based on the Spacecraft Command Language (SCL) systems 40 which provides a mission executive, real-time expert system, on-board decommutation, and a publish/subscribe software message bus infrastructure as an application integration point. Specifically the SCL system 40 provides an automation engine to execute sequences of commands and permits on-board logic to react to changes in data.

Based on the SCL infrastructure, there are two key mission-enabling technologies for the TacSat-2, e.g., the On-Orbit Checkout Engine (OOCE) system 42 and Autonomous Tasking Engine (ATE) system 44. The OOCE system 42 uses the underlying SCL engine to execute a series of scripts (sequences) to exercise all the payload interfaces to perform a rapid checkout of these devices and prove that they are functioning correctly. The OOCE system 42 is a structured methodology used to collect the information (checkout logic) on the ground and generate the SCL scripts which are executed on-board the satellite shortly after it reaches orbit. Prior to launch, all information regarding how to control a spacecraft subsystem, component, or payload is captured using a structured methodology in a Database. This data is then exported into SCL scripts which are compiled using the SCL ground system and then loaded to the flight system prior to launch.

The OOCE system 42 is one of the key technologies in the achievement of a responsive space program designed as a key technology enabler for the rapid checkout and calibration phase of a mission to remove the laborious and time consuming process of commissioning a new spacecraft. Normally in current systems, the 30-90 day functional checkout and calibration period may be reduced to one day. The system of the present invention, also referred to herein as a RoadRunner system, is pursuing an aggressive goal of functional checkout and collection of imagery within a first orbit of the spacecraft.

The ATE system 44 is a planning and scheduling tool that is also based on the SCL engine. The ATE system 44 accepts requests for "activities" which may be scheduled using the SCL tools.

The ATE system 44 is designed to support automated tasking of the 11 experiments on the RoadRunner bus. Using on-board ephemeris and orbit propagators, the ATE system may schedule, reschedule and execute high level "objectives" which may involve one or more spacecraft components and/or subsystems. Using the on-board GPS data 46 and Orbit Propagation algorithms 48, the ATE system 44 may schedule imagery passes or ground station contacts by knowing the geo-location of the target.

Another key technology for the system 10 of the present invention is the use of the remote monitor 16, e.g. SCL/RIMS system 50 operating remotely from the satellite which is envisioned to reside on the ground segment 52.

The system of the present invention, also referred to herein as the RoadRunner, has embraced the SCL system and used it for simulations, integration, and test, as well as mission operations. The Remote Intelligent Monitor System (RIMS) 50 is a web based system which "sits on top" of the SCL infrastructure system 40 to provide a Web-centric monitoring and control system using a standard Web-browser interface. The RoadRunner system has the goal of flying the spacecraft with not more than two operators. The Web-based RIMS system 50 allows a geographical diverse group of users, e.g. government employees and contractors 54 to aid in troubleshooting, mission planning, and tasking, as well as retrieving mission data collected by the spacecraft. The users 54 may communicate with the present system through the Web-browser interface 55 of the SCL/RIMS system 50.

The intelligent system of the present invention is capable of pushing beyond the boundaries of traditional command/control systems. With the 11 payloads 17-34 on the spacecraft 12, the command telemetry database may include in excess of 32,000 data points on a "normal" dedicated spacecraft. This sheer number of data points, message formats and operational scripts may be successfully processed in the present system in a fashion which avoids untimely and costly pitfalls of data bases, flight software and ground software that may be out of sync. The present system resolves fault detection, isolation and recovery (FDIR) on-board at the satellite level thus removing this major responsibility from ground architectures. For planning and scheduling it is important and advantageous to move at least part of the ability on-board from the ground segment as is found in present systems. A combination of ground base planning and a hierarchical on-board detailed scheduling/re-scheduling capability underlies the principals of the operation of the present system.

In the present system a high level plan is computed at the ground and uploads to the spacecraft controller (ATE) which then processes it and sends commands to the individual subsystems and/or components of the spacecraft for execution. Feedback in terms of successful scheduling and unresolved conflict is propagated back to the ATE system 44 and ultimately to the ground.

Based on an indication from the launch vehicle separation switch, the OOCE system 42 begins execution. The OOCE validates that the vehicle is in the expected configuration and begins to power up avionics units using SCL scripts which are executed by the on-board SCL Real-Time Engine as will be described in detail in further paragraphs. These scripts are auto-generated from the ground segment using the OOCE command patterns. Each command is wrapped with a series of tests, e.g. a "pre-condition check", "send command", "wait x time", "check telemetry" verifiers to see that the command was executed correctly. If not, then corrective measures are taken and the error is logged. Success or failure is logged to an on-board file in the RAM disk. These files are later downlinked to the ground to indicate pass or fail conditions and to give insight into errors for anomaly resolution.

As tests execute, the OOCE system sets telemetry variables to indicate the current status thereof in the overall execution of all tests. These OOCE status variables are downlinked to the ground or stored in the onboard data store (RSM disk) for later transmission to the ground.

Once the avionics units are checked out successfully, the OOCE system schedules a collection of data with the primary instrument(s). The OOCE sends a message to the ATE planning system to schedule a data collection within the $1^{st}$ pass. The goal of the procedure is to have the vehicle checked out with the $1^{st}$ orbit and poised to collect payload data when it comes into view for the first time.

The OOCE and ATE systems share a common set of SCL scripts on the spacecraft. The scripts all follow the OOCE Command Pattern and are thoroughly validated during the Integration and Test phase of the mission. When the satellite (spacecraft) makes contact with the ground station, real-time telemetry is downlinked to indicate the current OOCE status, the OOCE logs files, as well as the ATE log files, are downlinked. As requests for "activities" are processed by the ATE system, it produces a series of entries in the log file to indicate the decision logic used to schedule, re-schedule or delete an activity in the schedule. All these logs are downlinked and processed by the RIMS graphical user interface. The RIMS system also provides a user interface to display telemetry items used to indicate the progress of the OOCE execution.

Figure 2:
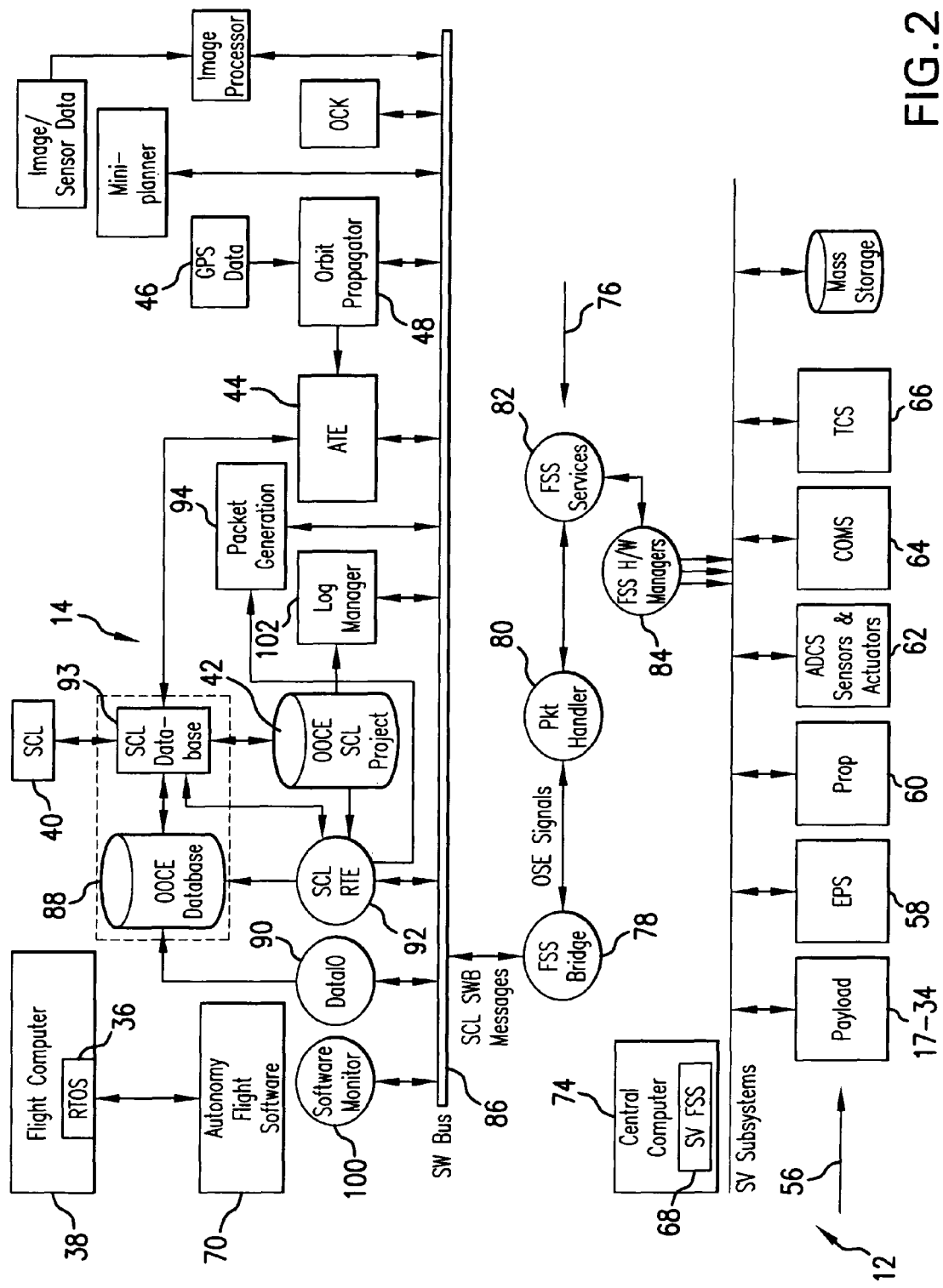
FIG. 2 is a schematic representation of the on-board autonomy flight system architecture of the present invention.

Referring to FIG. 2, there is shown the on-board flight architecture and the interaction of the subsystems of the spacecraft 12 with both the hardware and software components of the spacecraft vehicle subsystems 56 including Payloads 17-34, on-board Autonomous Operations System 14, the propulsion (PROP) 60. ADCS (Attitude Determination and Control System), sensors and actuators 62, (Communications System) COMS 64 and (Thermal Control System) TCS 66, power (TPS subsystem). The spacecraft system may include various subsystems depending upon the mission profile. The operation and functionality of space vehicle (SV) subsystems 56 are served by Spacecraft Vehicle to Flight Software (SVFSS) 68 which runs on the central computer 74.

All the SV subsystems 56 shown in FIG. 2, as well as others which may be used in different spacecraft vehicles depending upon mission profile, communicate with the on-board Autonomy Flight Software (AFS) 70 of the present invention through the spacecraft bus (SWBUS) 72 presented in detail in following paragraphs.

The RoadRunner flight software architecture shown in FIG. 2, uses the Spacecraft Command Language (SCL) rule based expert system 49 to control operations of the spacecraft and provide on-board autonomous operations. The SCL expert system 40 provides an artificial intelligent engine which reacts to changing data and triggers rules to monitor the state of health (SOH) of the subsystems or the entire space vehicle.

The central computer 74 controls the satellite's payloads, thrusters, solar arrays, batteries, etc., e.g. the SV subsystems 56, by executing the SVFS 68. The on-board Autonomy Flight Software 70 is executed under a real-time operating system 56 on the flight computer 38. The Autonomous Operations System 14 interconnects with the SV subsystems 56 and the SV Flight Software 68 through a channel 76 which includes the FSW-SCL bridge 78 which serves as the interface from the Broadreach Flight Software System (FSS) to the on-board Autonomous Operation System 14. The FSW-SCL bridge 78 is a component provided by Broadreach Engineering, Inc. and is configured to allow only specific application ID (APID) packets to and from the Flight of Software (FSW) and SCL. The bridge 78 may also be disabled in the event of saving the vehicle or other contingency procedures. The FSW-SCL bridge 78 is connected to the Packets Handler 80 for receiving therefrom or sending thereto the specific application ID packets. Communication of the Packets Handler 80 and the FSW-SCL bridge 78 is through the OSE signals. The OSE is a real-time operating system kernel which is designed to satisfy the specific needs of the data-communication industries to interrupt, prioritize, report pre-emptive priority scheduling, memory allocation, other process communication, etc. In the OSE system a signal is a message that is sent directly from one process to another. The message contains an ID, and the addresses of the sender and the receiver, as well as data. Once a signal is sent, the sending process can no longer access it, i.e., owners ship of a signal is never shared. The receiving process may specify what signal it "wants" to receive at any particular moment. The process can wait or poll the signal queue for a specific signal. The OSE kernel manages the ownership of signals. The known ownership makes it possible for a system debugger to keep track of the communication between processes. The OSE signals on FIG. 2 aid in process synchronization.

The Packets Handler 80 is bi-directionally coupled to the FSS services unit 82 the function of which is to provide low-level Operating System function to higher level applications. The FSS services unit 82 is coupled to the FSS hardware managers unit 84 for controlling the SV subsystems 56 as well as to read data concerning the subsystems 56 operation and functioning.

The communication between the channel 76 and the autonomous operations system 14 is conducted through the SCL software bus (SWBUS) 86 which is a publish and subscribe messaging bus. Various applications communicate each with the other via SWBUS messages. A messaging protocol is defined to enable standard message formats for the applications. At the on-board Autonomous Operations System's side, an OOCE database 88 is a database which contains bus telemetry mnemonics as well as local data values for the on-board processing. The spacecraft telemetry is received through the Flight Software System-SCL (FSS-SCL) bridge 78 to the Data IO unit 90 which decommutates the telemetry data for all processes to access. The Data IO unit 90 decommutates Consultative Committee for Space Data Systems (CCSDS) telemetry packets and stores the values in the local OOCE database 88. It also performs the engineering unit conversion and limits checking in the mnemonic values.

A SCL real-time engine (RTE) 92 is used to execute on-board scripts and rules. It supports a library of sub-scripts SCL database) 93, which may be called from a parent script. Scripts may be scheduled in absolute and relative times. On-board rules are defined to monitor telemetry mnemonics and events for anomalous conditions and take corrective action. The OOCE system 42 is implemented as a set of SCL scripts and rules, as will be described in detail in further paragraphs. When the specified condition is encountered, the SCL-RTE 92 takes appropriate action. Basically, the OOCE database 88 and SCL database 93 may be considered as a single activity.

A packet generator 94 generates valued real-time CCSDS command packets on-board under the control of the SCL-RTE 92. These command packets are passed through the SWBUS 86, and the FSS-SCL bridge 76 to the bus flight software 96 for execution of the command packets, which may include the bus or payload commands.

An OCK (Orbit Control Kit) 98 is an on-board software system employed to autonomously maintain the spacecraft in a predefined (or adjustable) station keeping box. The OCK uses sensing, control, and computing hardware already on board most spacecraft and typically requires less propellant than orbit maintenance accomplished from the ground.

A software monitor 100 provides heartbeat monitoring to check if all critical applications are operating correctly. Log manager 102 is tasked with storing log files on the file system (RAM disk), managing the RAM disk and dumping files to the ground segment.

The Autonomous Tasking Experiment (ATE) system 44 is a set of cooperating C/C++ applications that provide short and long term autonomous planning capabilities. The ATE 44 is designed to fulfill the following requirements:

Top Level Requirement: to demonstrate autonomous on-orbit operations with machine to machine interfaces (Tactical Space Capabilities); and Sub-Requirement: to demonstrate autonomous space vehicle tasking.

Figure 3:
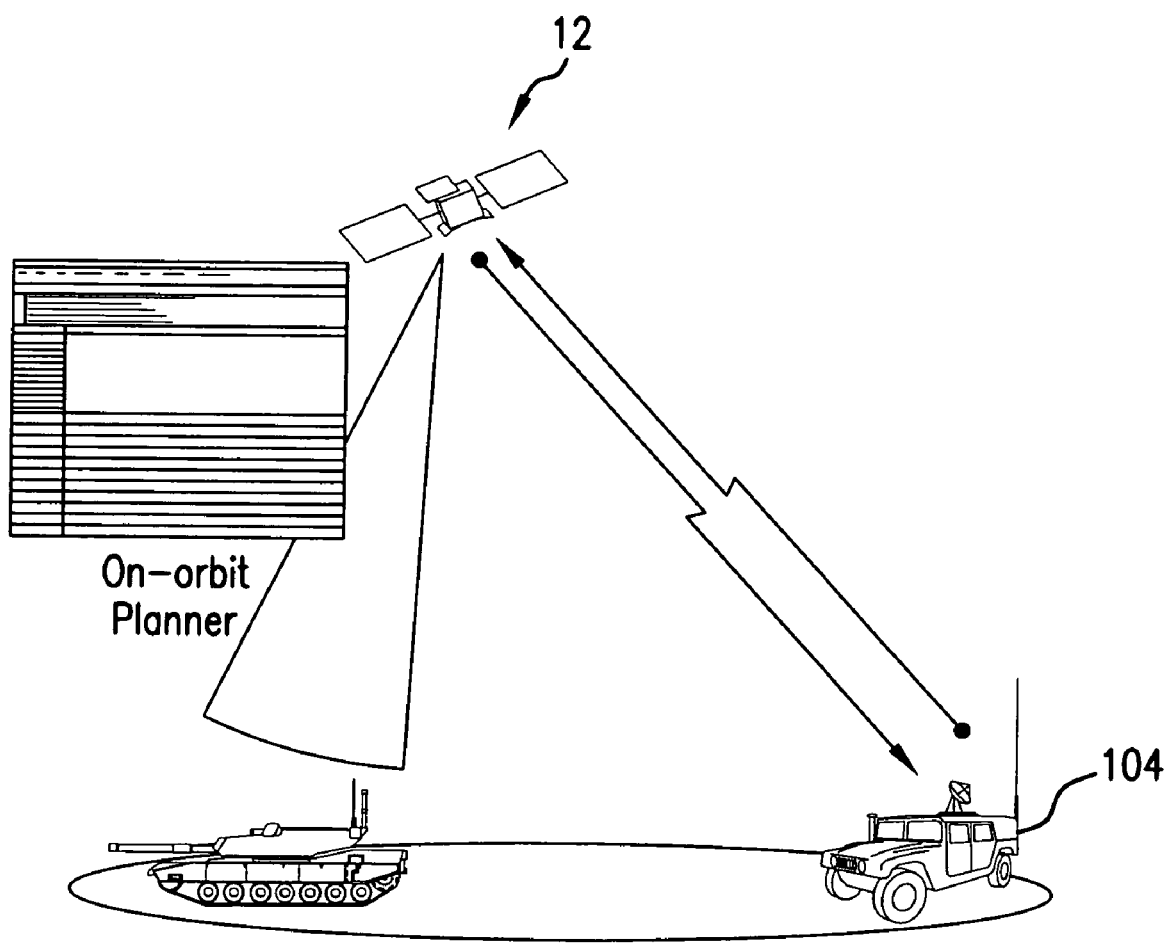
FIG. 3 schematically represents principals of communication of a non-expert user with the ATE on-board spacecraft.

As shown in FIG. 3, one of the ATE system is to permit non-expert users 104 in the battlefield to send data requests to the spacecraft 12 (for example: "image a particular region in latitude and longitude") and to receive the response directly, if possible with regard to the current spacecraft location in orbit. The ATE system 44 also serves as a long-term and short-term scheduler for all the payloads.

Figure 4:
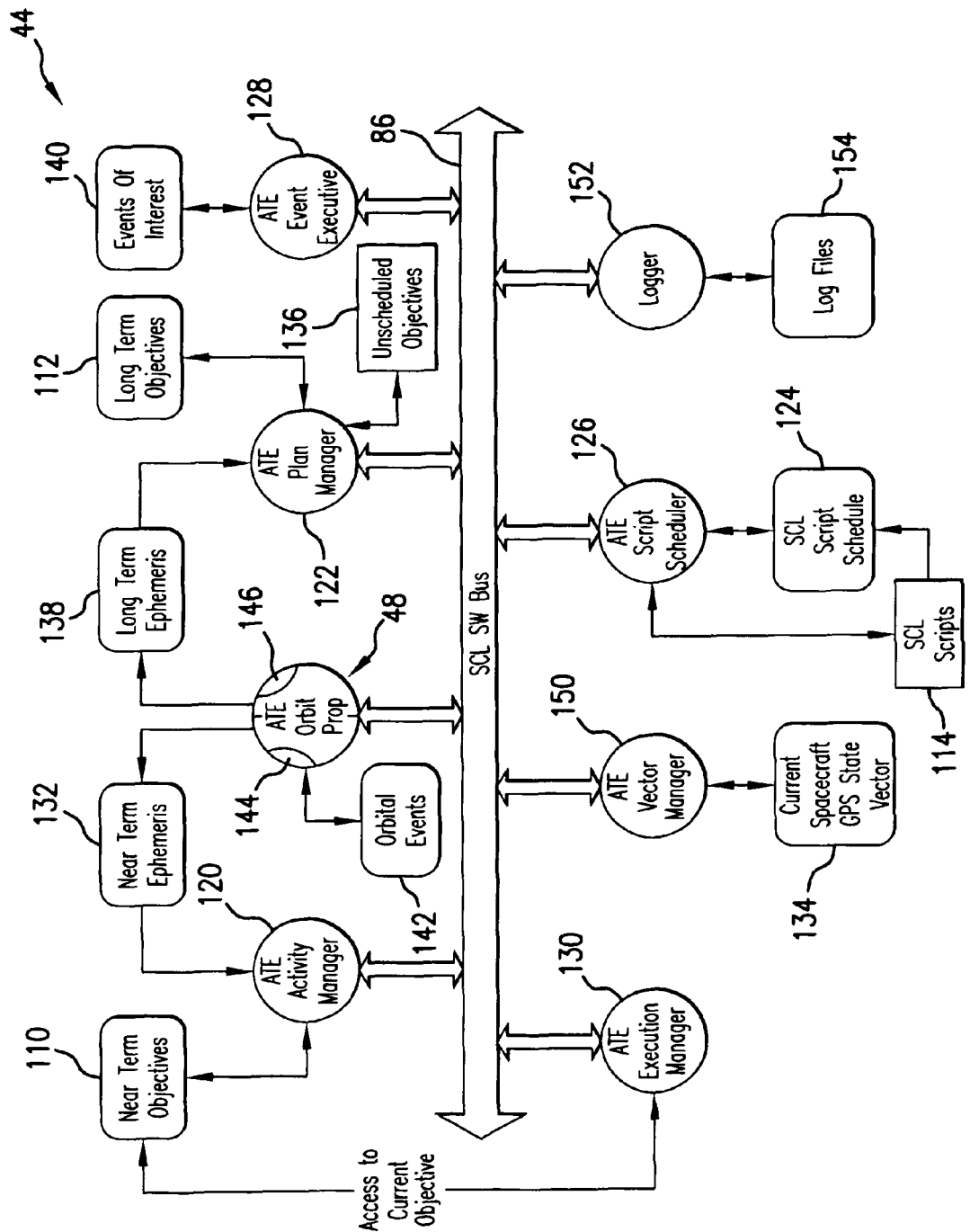
FIG. 4 is a schematic representation of the ATE on-board system architecture.

The ATE unit 44 shown in FIGS. 1-2 and 4 is designed as a "lightweight" on-board planner which relies on an on-board Orbit Propagator 48 which processes the GPS data 46 obtained from the Integrated GPS On-orbit Receive (IGOR) instrument. The Orbit Propagator 48 permits queries of target locations to determine if the satellite is capable of slewing to the target in the allotted time. Targets which cannot be achieved within the current constraints are re-planned.

Figure 4A:
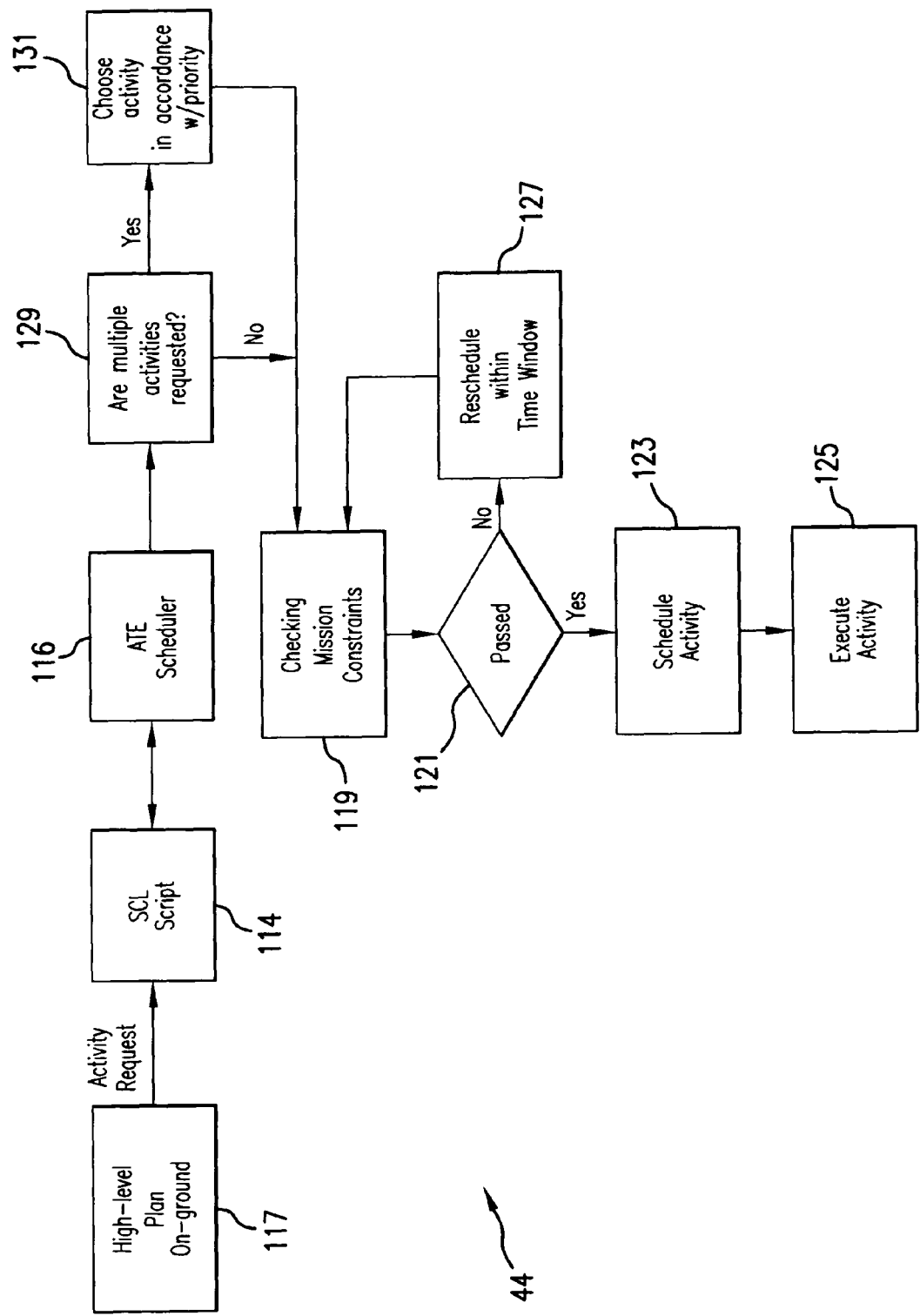
FIG. 4A is a flow-chart diagram of the scheduling nowtime of the ATE system.

The ATE system 44, as shown in FIG. 4, includes short and long-term "objectives" 110, 112, respectively. The short-term objectives 110 perform "just in time" constraint checking using the SCL on-board scripting capabilities. ATE has a set of SCL scripts 114 stored in the SCL database 93 (shown in FIG. 2) on-board which are executed prior to a corresponding objective being executed. The SCL scripts have been developed and tested and are used to check consumables and conflicts prior to executing an objective. Consumables may include power or buffer space. Conflicts may include a slew maneuver during an imaging. The ATE software is a planning and scheduling tool that "sits on top" of the SCL engine. Referring to FIG. 4A, representing the flow chart of the ATE operation, in block 116 (ATE scheduling tool) the ATE system accepts requests for "activities" 117 which may be scheduled using the SCL tools (SCL scripts) 114. In block 119 the ATE uses "just in time" (i.e. as late as possible) constraint checking to verify that the satellite has the necessary resources (power, fuel, etc.) and does not have any mission constraint violations prior to execution of the "activity".

Mission constraints take into account physical attributes such as orbital position, slew rates of the satellite, memory available for data collection, and field of view of the camera or antenna. If the activity passes these constraints, the logic block 121 sends the signal through the ATE script scheduler 126 (shown in FIG. 4) to the SCL script 114 for the activity to be scheduled in block 123. The "activity" is then executed in block 125. If the activity cannot be scheduled at the 1st attempt, ATE will try to reschedule it in block 127 within the window of time given for the activity request. The ATE logic 44 checks in block 129 if multiple activities are scheduled for the same time. There is a priority supplied with the request to allow ATE to choose which activity has precedence. If there are multiple activities scheduled, the ATE logic chooses the "activity" in accordance with the priority command in block 131, and follows to block 19 to check constraints. If, however, in block 129, no multiple activities are scheduled, the process follows to block 119 for procedure as described in previous lines. The ATE system 44 may perform sensor queuing on-board. For example, the Target Indicator Experiment (TIE) experiment would find a target indicator and report it to the system 14 where it could be geo-located and prompt a high priority imaging collection using the ATE planning system 44.

In a broader operational spectrum, the ATE system 44 is used to plan and autonomously configure the payload and spacecraft to perform sensing of a specified target. For this purpose Latitude and Longitude are supplied to the ATE 44 for the target and the on-board Autonomous Flight Software 70 (shown in FIG. 2) determines the next opportunity to image the identified area with the constraints of the orbit, the imager's field of view, daylight, and conflicts with other payloads, downlinks or power constraints.

Using the same paradigm as imaging, the ATE system 44 plans and autonomously configures the vehicle and communications to perform a downlink of a specified data buffer. The latitude and longitude of the (Common Data Link) CDL tactical field site is supplied as part of the ATE Tactical Field Reservation command. The on-board Autonomous Operations System 14 uses current spacecraft ephemeris, rates and orientation to determine the slew maneuver needed to point the CDL antenna at the site. No attempt is made to "backscan" on the site, i.e. continue slewing to keep the spacecraft antenna pointed at the CDL ground site.

One of the most compelling goals of the ATE system is to reduce response time for contingencies and evolving scenarios. For example, it is expected that the uplink of a tasking request from in-theater, image a target, and downlink the imagery within the same pass will require less than 7 minutes to prove the utility of a Tactical Satellite to bring actionable intelligence to theater commanders in near real-time.

The inclusion of the on-board orbit propagator 48 permits target acquisition time determination and target acquisition pointing calculations. While the orbit is coded for the Road-Runner mass models and slew rates, the interfaces to the ATE application 44 are designed to be reusable and may be applied to other missions.

The ATE scheduling algorithm 116 of FIG. 4A uses a simple 3 tier priority scheme for conflict resolution. In the event of a tie between two conflicting objectives, it is first in, first out (FIFO). The ATE also includes the capability to block out sections of a schedule as a high priority objective which cannot be rescheduled. Tactical Field Reservation and Exclusive Reservation permits the ATE to guarantee that any objectives scheduled within one of these windows is given highest priority and there will be no attempt to optimize the schedule around this.

It is contemplated that the ATE supports at least the following commands:
ATE Delete Scheduled Objective
ATE Delete Scheduled Script
ATE Exclusive Reservation
ATE GPS Vector Filter
ATE Ground Session
ATE Image
ATE Prepare File
ATE Schedule Script
ATE Tactical Field Reservation
ATE Tactical Field Experiment The requested objectives for the ATE system are collected on the ground system using the Virtual Mission Operations Center (VMOC) interface. The VMOC interface is a web-based set of forms which may guide the user through a set of parameters required to task the satellite and its payloads. Behind the scenes on the web server, the Automated Mission Planning System (AMPS) evaluates tasking requests against a satellite power and thermal model and a Simplified General Perturbations (SGP4) orbit propagator. The AMPS tool attempts a $1^{st}$ order optimization of the requested schedule and may deny some of the requests. The optimized schedule is exported to an eXtensible Markup Language (XML) file and imported into the Remote Intelligent Monitor System (RIMS) Planning and Tasking tools as will be discussed in following paragraphs. Once ingested by the RIMS Planning and Tasking Tool, the schedule is translated into a series of ATE commands and a flight script is auto-generated in the Packet Generator 94 (shown in FIG. 2) and prepared for upload to the spacecraft through the SWBUS 86 and the channel 76.

Referring again to FIG. 4, the ATE system 44 includes an ATE Activity Manager (ATE-AM) 120, which executes the ATE software. All ATE commands are routed to the ATE-AM 120. Upon receiving a command, the ATE-AM 120 creates an objective for the command. The ATE-AM 120 determines if the objective can be scheduled for execution within the next orbit period. If the objective can be scheduled, the objective is inserted into the near term objectives 110. If the objective cannot be scheduled in the near term objectives, then the ATE-AM 120 sends the objective to the ATE Plan Manager 122 for scheduling in the long term objectives 112. The ATE-AM 120 forwards the schedule SCL script command 124 to the ATE Script Scheduler 126.

The ATE-AM 120 uses the ATE Event Executive 128 to request notification that the next near term objective is ready for execution. When the ATE-AM receives the "execution" notification, the ATE-AM notifies the ATE Execution Manager 130 to begin execution of the objective. The ATE-AM must notify the ATE Execution Manager in advance of the actual objective execution time to allow the ATE Execution Manage enough time to perform any "just-in-time" verification.

When the ATE-AM 120 receives notification from the ATE Near Term Orbit Propagator 48 that the near term ephemeris 132 has been updated, the ATE-AM cycles through the near term objectives 110 to fine tune each objective execution time. This processing minimizes any error in the execution time because the new near time ephemeris 132 is propagated from a more current state vector 134.

The ATE-AM 120 is responsible for removing an objective from the near term objectives 110 and deleting the objective when the objective is complete or the objective cannot be completed. An objective may not be completed for the following reasons:
1. The objective could not be scheduled for execution before its expiration time.
2. An error occurred during execution on the objective.

When the ATE Plan Manager (ATE-PM) 122 receives an objective, the ATE-PM determines if the objective may be scheduled before the objective expiration time. If the objective may be scheduled, the objective is inserted into the long term objectives 112. If the objective cannot be scheduled, the objective is added to the unscheduled objectives 136. The ATE-PM 122 periodically attempts to schedule unscheduled objectives until the unscheduled objective expires.

The ATE-PM 122 uses the ATE Event Executive 128 to request notification that the next long term objective is ready to become a near term objective. This notification should occur when the objective's begin time is within the next orbit period. When the ATE-PM 122 receives the "move objective to near term" notification, the ATE-PM removes the objective from the long term objectives 112 and sends the objective to the ATE-AM 120 for insertion into the near term objectives 110.

When the ATE-PM 122 receives notification from the ATE Long Term Orbit Propagator that the long term ephemeris 138 has been updated, the ATE-PM 122 cycles through the long term objectives 112 to fine tune each objective's execution time. This processing minimizes any error in the execution time because the new long term ephemeris 138 is propagated from a more current state vector 134.

When the ATE Execution Manager (ATE-EM) 130 receives a notification that an objective is ready for execution, the ATE-EM 130 performs any "just-in-time" verification (e.g. power, ACS restrictions, etc.) and spacecraft pointing calculations needed to insure that the objective can be executed. If the objective may be executed, the ATE-EM 130 executes and monitors the steps needed to execute the objective. If the objective cannot be executed or an error is detected while executing the objective, the ATE-EM 130 notifies the ATE-AM 120, which then attempts to reschedule the objective.

When the ATE Script Scheduler (ATE-SS) 126 receives the schedule script command 114, the ATE-SS 126 adds the script to the SCL script schedule 124 to be executed. The ATE-SS sends the "execute script at" message to the SCL-RTE 92 (shown in FIG. 2) TBD (to be determined) seconds before the script begins execution. Once the ATE-SS 126 sends the "execute script at" message, the ATE-SS removes the entry from the SCL script schedule 124. When the ATE-SS receives a TBD command (i.e. delete scheduled script), the ATE-SS removes the desired entry from the SCL script schedule 124.

The ATE Event Executive (ATE-EE) 128 receives event notification requests for any event of interest 140 that requires notification at a specified time. When the ATE-EE receives an event notification request, the ATE-EE 128 adds the event to the events of interest 140. When the time associated for an event of interest occurs, the ATE-EE 128 sends notification that the event has occurred. When the ATE-EE receives an event delete request, the ATE-EE removes the event from the events of interest. The events of interest 140 may include orbital events 142 as well as time driven events required to assist the ATE execution.

The ATE Orbit Propagator 48 includes a near term orbit propagator (ATE-NTOP) 144 and Long Term Orbit Propagator (ATE-LTOP) 146. The ATE-NTOP 144 requests and receives the "begin near term orbit propagation" event. When the ATE-NTOP 144 receives the "begin near term orbit propagation" event, the ATE-NTOP propagates the near term ephemeris 132 from the current state vector 134. When ATE-NTOP completes the propagation of the near term ephemeris, the ATE-NTOP notifies the ATE-AM 120 that new term ephemeris is available for fine tuning the times for the near term objectives.

The ATE-NTOP 144 determines which orbital events will occur in the next orbit. The ATE-NTOP sends events notification requests to the ATE-EE 128 for those events.

The ATE-LTOP 146 requests and receives the "begin long term orbit propagation" event. When the ATE-LTOP receives the "begin long term orbit propagation" event, the ATE-LTOP propagates the long term ephemeris from the current state vector 134. When ATE-LTOP completes the propagation of the long term ephemeris 138, the ATE-LTOP notifies the ATE-PM 122 that new long term ephemeris 138 is available for fine tuning the times for the long term objectives 112.

An ATE Vector Manager (ATE-VM) 150 receives the GPS state vector 134 from IGOR. The ATE-VM 150 performs any necessary filtering needed to reduce the error in the GPS state vector 1334. The ATE-VM writes the filtered GPS state vector to the FSW database arranged preferably on the central computer 74 (shown in FIG. 2).

If the GPS state vector is not available, the ATE-VM 150 will receive a state vector from the Mission Operations Center (MOC).

A logger 152 manages the log files 154 for the ATE system 44. The logger also manages other logs that are outside the scope of the ATE system.

These commands are executed in the following fashion:

Tactical Field Reservation Command

| Command Parameter | Parameter Description |
|---|---|
| Begin Time | The time to begin the tactical field reservation. |
| End Time | The time to end the tactical field reservation. |
| Attitude | The quaternion relative to LVLH that defines the spacecraft attitude at the beginning of the tactical field reservation. This attitude is used to place the spacecraft in a favorable orientation for a tactical field experiment. The spacecraft will be in this attitude at the begin time for the reservation. |
| Execute Begin Script Flag | Flag used to indicate whether or not a script should be executed at the beginning of the tactical field reservation. |
| End Action | The action to be taken at the end of the tactical field reservation (e.g. no action, go to solar inertial, go to experiment pointing, execute a script, etc.). |
| Begin Script ID | The ID of the script to execute at the beginning of the tactical field reservation. |
| Begin Script Parameters | The script parameters that are passed to the begin script. |
| End Script ID | The ID of the script to execute at the end of the tactical field reservation. |
| End Script Parameters | The script parameters that are passed to the end script. |

Schedule a Tactical Field Reservation Use Case

Goal:
    To reserve a block of time in the ATE schedule for a tactical field experiment.

Brief:
    Ground operations may reserve a block of time in the ATE schedule for a tactical field experiment. The tactical field reservation is used to prevent the ATE from scheduling another objective during the requested block of time. The tactical reservation allows ground operations to put the satellite in a desired orientation at the beginning of the requested block of time. The tactical reservation allows ground operations to put the satellite in a desired configuration at the end of the requested block of time. The end action can be superceded by the end action in the command for the tactical field experiment. The tactical field reservation is the second highest priority objective, by convention, for ATE scheduling.

Scope:
    ATE

Level:
    Subfunction

Primary User:
    Ground Operations

Triggers:
    ATE-AM receives a tactical field reservation command (ATE_TF_RES).

Preconditions:
    ATE processes are started and initialized.

Success End Condition:
    The tactical field reservation objective is inserted into the ATE schedule.
    The ATE commands accepted counter is incremented.

Minimum Failed End Condition:
    The reservation is not scheduled.
    The appropriate messages are logged in the ATE event log and ATE history log.

Main Success Scenario
    1. ATE-AM creates a tactical field reservation objective.
    2. ATE-AM validates the tactical field reservation objective.
    3. ATE-AM increments the ATE commands accepted counter.

4. ATE-AM calculates the objective begin time (i.e. reservation begin time−(tactical field reservation slew time+tactical field reservation settle time+tactical field reservation guard time)) and objective end time (i.e. reservation end time+end action time).

5. ATE-AM adds the tactical field reservation to the near term objectives.

6. ATE-AM sends near term objective scheduled telemetry packet.

7. ATE-AM logs tactical field reservation added to the near term objectives in the ATE event log.

Nominal Extensions

7a. If the tactical field reservation "begin time" is not in the next orbit period, the ATE-AM sends the tactical field reservation to the ATE-PM to add the tactical field reservation to the long term objectives.

7b. If the tactical field reservation objective collides with an objective that is not an exclusive objective or a tactical field reservation objective in the near term objectives, the ATE-AM removes the objective from the near term objective. The ATE-AM adds the tactical field reservation objective to the near term objectives. The ATE-AM attempts to reschedule the removed objective.

Failure Extensions

1a. If the creation of the tactical field reservation objective fails, the ATE-AM logs an objective creation error message to both the ATE event log and the ATE history log and terminates the use case.

2a. If the tactical field reservation objective is invalid, the ATE-AM increments the ATE commands rejected counter, logs an invalid image command message to both the ATE event log and the ATE history log, and terminates the use case.

7c. If the tactical field reservation objective collides with an exclusive reservation objective in the near term objectives, the ATE-AM logs a tactical field reservation collision message to both the ATE event and the ATE history logs, deletes the tactical field reservation that was just created, and terminates the use case.

7d. If the tactical field reservation objective collides with another tactical field reservation objective in the near term objectives, the ATE-AM logs a tactical field reservation collision message to both the ATE event and the ATE history logs, deletes the tactical field reservation that was just created, and terminates the use case.

Execute a Tactical Field Reservation Use Case

Goal:
To execute tactical field reservation from the begin time to the end time.

Brief:
The ATE commands the ACS software to place spacecraft in the desired attitude. The command must be sent to the ACS software far enough in advance so the spacecraft is in the desired attitude at the begin time of the tactical field reservation. If the execute begin script flag is true, the ATE executes the begin script at the begin time for the tactical field reservation. The ATE executes the end action at the end time for the tactical field reservation. The end action allows ground operations a way to specify a spacecraft configuration after the tactical field reservation time block. If an image and downlink command (i.e. the tactical field experiment) is received during the tactical field reservation time block, the end action for the tactical field reservation is superceded by the end action for the tactical field experiment.

Scope:
ATE

Level:
Subfunction

Primary User:
Ground Operations

Triggers:
A tactical field reservation's begin time arrives.

Preconditions:
ATE processes are started and initialized

Success End Condition:
The end action for the tactical field reservation or the tactical field experiment is executed. The ATE-AM removes the tactical field reservation from the near term objectives.

Minimum Failed End Condition:
The ATE-AM removes the tactical field reservation from the near term objectives. The appropriate messages are logged in the ATE event log and ATE history log.

Main Success Scenario
1. ATE-AM notifies the ATE-EM that it is time to execute the tactical field reservation.
2. ATE-EM commands the ACS software to place the spacecraft in the requested attitude. Align and clock vectors for slew earth.
3. Setup CDL uplink.
4. ATE-EM executes the begin script at the begin time.
5. ATE-EM requests event notification for the end action.
6. ATE-EM receives event notification for the end action.
7. ATE-EM executes the end action.
8. ATE-EM notifies the ATE-AM that the tactical field reservation completed

| Command Parameter | Parameter Description |
| --- | --- |
| Objective ID successfully. | The unique identifier assigned to the objective when the objective is created by the ATE-AM. Ground operatioins would have to download the near term objectives and/or the long term objectives to locate the desired objective id. |

9. ATE-AM logs tactical field reservation successfully completed in the ATE event log.

Schedule a Script Use Case

Goal:
Delete a scheduled objective from the ATE schedule.

Brief:
The ability to delete a scheduled objective provides ground operations a way to abort a scheduled objective prior to objective execution.

Scope:
Subsystem

Level:
Subfunction

Primary User:
Ground Operations

Triggers:
  ATE-AM receives a delete scheduled objective command (ATE_DEL_OBJ).

Preconditions:
  ATE processes are started and initialized.

Success End Condition:
  The objective is deleted from the ATE schedule.

Minimum Failed End Condition:
  The requested objective is not deleted from the ATE schedule.
  The appropriate messages are logged in the ATE event log and ATE history log.

Main Success Scenario
  1. ATE-AM validates the objective ID.
  2. ATE-AM increments the ATE commands accepted counter.
  3. ATE-AM finds the requested objective in the near term objectives.
  4. ATE-AM removes the objective from the near term objectives.
  5. ATE-AM deletes the objective.
  6. ATE-AM sends near term objective deleted telemetry packet.
  7. ATE-AM logs an objective deleted message in both the ATE event and ATE history logs.

Nominal Extensions
  3a. If the ATE-AM fails to locate the objective in the near term objectives, the ATE-AM forward the delete objective command to the ATE-PM for deletion from the long term objectives.

Failure Extensions
  1a. If the objective ID is invalid, the ATE-AM increments the ATE commands rejected counter, logs an objective ID error message to both the ATE event log and the ATE event log and the ATE history log, and terminates the use case.

Determine Target Access Information Use Case

Goal:
  To determine the target access time and associated data (i.e. state vector, position in ECEF, nadir sun inner angle, distance, slant angle, and azimuth) for an image or ground session objective.

Brief:
  Determine when the spacecraft will be in the correct location to access a requested target location within a specified timeframe. When determining the target access time, the following criteria must also be met: minimum slant angle, maximum slant angle, and day or night indicator.

Scope:
  ATE

Level:
  Subfunction

Primary User:
  ATE-AM or ATE-PM

Triggers:
  ATE-AM or ATE-PM attempts to schedule an image or ground session objective.

Preconditions:
  The image or ground session objective has been created and validated.

Success End Condition:
  The target access time is determined.

Minimum Failed End Condition:
  The target access time is not determined.

Main Success Scenario
  8. For each ephemeris entry within the time frame while a target access time is not determined, perform steps 2-5.
  9. Verify that the nadir sun inner-angle meets the day or night criteria.
  10. Calculate distance, slant angle, and azimuth between the spacecraft and the target location.
  11. Determine if slant angle is within minimum and maximum slant angles.
  12. Determine if the spacecraft is on the correct side of the earth (i.e. distance between spacecraft and target location is less than the radius of the earth).
  13. Provide target access time and associated data to user.

Failure Extensions
  2a. If the nadir sun innerangle does not meet the day or night criteria, process next ephemeris entry.
  4a. If the slant angle between the spacecraft and the target location is not between the minimum and maximum slant angles, process next ephemeris entry.
  5a. If the spacecraft is not on the correct side of the earth, process next ephemeris entry.
  6a. If the target access time is not found, notify the user that the target access time was not found.

Validate Exclusive Reservation Objective Use Case

Goal:
  To validate an exclusion reservation objective.

Brief:
  The exclusive reservation objective is created from the parameters in the exclusive reservation command. Allowing the objective to validate itself and supports a common interface for validating all objective types.

Scope:
  ATE

Level:
  Subfunction

Primary User:
  ATE-AM

Triggers:
  ATE-AM creates an exclusive reservation objective.

Preconditions:
  The exclusive reservation objective has been created.

Success End Condition:
  The exclusive reservation objective is validated.

Minimum Failed End Condition:
  The appropriate messages are logged in the ATE event log and ATE history log.

Main Success Scenario
  14. Validate the reason.
  15. Validate the begin time and the end time.
  16. Validate the begin action.
  17. Validate the end action.

Nominal Extensions

3a. If the begin action is execute a script, then validate the begin script ID.

4a. If the end action is execute a script, then validate the end script ID.

Failure Extensions

1a. If the reason for the reservation is invalid, log the invalid reservation reason message to both the ATE event log and the ATE history log, and terminate the use case.

2a. If the begin time or end time are invalid, log an invalid reservation time message to both the ATE event log and the ATE history log, and terminate the use case.

3b. If the begin action is invalid, log an invalid begin action message to both the ATE event log and the ATE history log, and terminate the use case.

3c. If the begin action is execute a script and the begin script ID is invalid, log an invalid begin script ID message to both the ATE event log and the ATE history log, and terminate the use case.

4b. If the end action is invalid, log an invalid end action message to both the ATE event log and the ATE history log, and terminate the use case.

4c. If the end action is execute a script and the end script ID is invalid, log an invalid end script id message to both the ATE event log and the ATE history log, and terminate the use case.

Exclusive Reservation Command

| Command Parameter | Parameter Description |
| --- | --- |
| Reason | Used for bookkeeping purposes on the ground to indicate why the block of time is reserved (e.g. delta-v, downlink session, payload operations, etc.) |
| Begin Time | The time to begin the exclusive reservation. |
| End Time | The time to end the exclusive reservation. |
| Begin Action | The action to be taken at the beginning of the exclusive reservation (e.g. no action, go to solar inertial, go to experiment pointing, execute a script, etc.) |
| End Action | The action to be taken at the end of the exclusive reservation (e.g. no action, go to solar inertial, go to experiment pointing, execute a script, etc.). |
| Begin Script ID | The ID of the script to execute at the beginning of the exclusive reservation. |
| Begin Script Parameters | The script parameters that are passed to the begin script. |
| End Script ID | The ID of the script to execute at the end of the exclusive field reservation. |
| End Script Parameters | The script parameters that are passed to the end script. |

Schedule an Exclusive Reservation Use Case

Goal:

To exclusively reserve a block of time in the ATE schedule.

Brief:

Ground operations can prevent ATE interface by exclusively reserving a block of time. The exclusive reservation is used to prevent the ATE from scheduling another objective during the requested block of time. The exclusive reservation allows ground operations to put the satellite in a desired configuration at the beginning and at the end of the requested block of time. By convention, exclusive reservation is the highest priority objective, for ATE scheduling.

Scope:
ATE

Level:
Subfunction

Primary User:
Ground Operations

Triggers:
ATE-AM receives an exclusive reservation command (ATE_EX_RES).

Preconditions:
ATE processes are started and initialized.

Success End Condition:
The exclusive reservation objective is inserted into the ATE schedule.
The ATE commands accepted counter is incremented.

Minimum Failed End Condition:
The reservation is not scheduled.
The appropriate messages are logged in the ATE event log and ATE history log.

Main Success Scenario

18. ATE-AM creates an exclusive reservation objective.

19. ATE-AM validates the exclusive reservation objective.

20. ATE-AM increments the ATE commands accepted counter.

21. ATE-AM adds the exclusive reservation to the near term objectives.

22. ATE-AM sends near term objective scheduled telemetry packet.

23. ATE-AM logs exclusive reservation added to the near term objectives in the ATE event log.

Nominal Extensions

4a. If the exclusive reservation begin time is not in the next orbit period, the ATE-AM sends the exclusive reservation to the ATE-PM to add the exclusive reservation to the long term objectives.

4a. If the exclusive reservation objective collides with an objective that is not an exclusive reservation objective in the near term objectives, the ATE-AM removes the objective from the near term objective. The ATE-AM adds the exclusive reservation objective to the near term objectives. The ATE-AM attempts to reschedule removed objective.

Failure Extensions

1a. If the creation of the exclusive reservation objective fails, the ATE-AM logs an objective creation error message to both the ATE event log and the ATE history log and terminates the use case.

2a. If the exclusive reservation objective is invalid, the ATE-AM increments the ATE commands rejected counter, logs an invalid image command message to both the ATE event log and the ATE history log, and terminates the use case.

4c. If the exclusive reservation objective collides with another exclusive reservation objective in the near term objectives, the ATE-AM logs an exclusive reservation collision message to both the ATE event and the ATE history logs, deletes the exclusive reservation that was created, and terminates the use case.

Execute an Exclusive Reservation Use Case

Goal:
To execute an exclusive reservation from the begin time to the end time.

Brief:
The ATE executes the begin action at the begin time for the exclusive reservation. The begin action allows ground operations to specify a spacecraft configuration for the exclusive reservation time block. The ATE executes the end action at the end time for the exclusive reservation. The end action allows ground operations to specify a spacecraft configuration after the exclusive reservation time block.

Scope:
ATE

Level:
Subfunction

Primary User:
Ground Operations

Triggers:
An exclusive reservation's begin time arrives.

Preconditions:
ATE processes are started and initialized.

Success End Condition:
The end action is executed.
The ATE-AM removes the exclusive reservation from the near term objectives.

Minimum Failed End Condition:
The ATE-AM removes the exclusive reservation from the near term objectives.
The appropriate messages are logged in the ATE event log and ATE history log.

Main Success Scenario
10. ATE-AM notifies the ATE-EM that it is time to execute the exclusive reservation.
11. ATE-EM executes the begin action.
12. ATE-EM requests event notification for the end action.
13. ATE-EM receives event notification from the end action.
14. ATE-EM executes the end action.
15. ATE-EM notifies the ATE-AM that the exclusive reservation completed successfully.
16. ATE-AM logs exclusive reservation successfully completed in the ATE event log.

GPS Vector Filter Use Case

Goal:
Refine the GPS vector provided by the spacecraft's GPS payload to an acceptable value.

Brief:
The filter will obtain the GPS vectors representing the spacecraft's position and velocity from a spacecraft payload (IGOR). The Filter uses these vectors as a base and calculates the actual spacecraft position and velocity to a specified value.

Scope:
Sub-system

Level:
Summary

Primary User:
On-Board Autonomy Software

Triggers:
Spacecraft position and velocity vector are made available.

Preconditions:
GPS Vector Filter is activated.

Success End Condition:
Spacecraft position and velocity vector are refined to an acceptable value.

Minimum Failed End Condition:
The filtered position and velocity vector does not change.

Main Success Scenario
1. ATE-VF receives the spacecraft position and velocity vector.
2. ATE-VF calculates precise spacecraft position and velocity vector.
3. ATE-VF provides the filtered spacecraft position and velocity to the flight software.

Nominal Extensions
2a. If the spacecraft positions and velocity fulfill the specified value criteria, then do not perform filtering.

Failure Extensions
1a. If the Spacecraft does not provide the requisite vectors, the GPS
Vector Filter will use it's own algorithms to determine the current spacecraft position and velocity to an acceptable value. These algorithms may use a vectors provided by ground-ops or the last known spacecraft vectors.

Perform Ground Session Contact Use Case

Goal:
To configure the spacecraft and communications to perform ground session contact over the desired location.

Brief:
To perform a successful ground session contact, the spacecraft must be placed in the correct attitude to sweep the communications contact area across the desired target location. The requested communications subsystem must be configured prior to the ground session contact.

Scope:
ATE

Level:
Subfunction

Primary User:
ATE-EM

Triggers:
The objective begin time for a ground session objective occurred.

Preconditions:
The spacecraft ACS software are in the correct states to support a ground session contact with the target location.

Success End Condition:
The ground session contact is made.

Minimum Failed End Condition:
    The communications subsystem is properly shutdown.
    The spacecraft is in a favorable mode.

Main Success Scenario
    17. Determine which slew earth mode to use.
    18. Calculate alignment and clock vectors in body frame.
    19. Send alignment and clock vectors to ACS software for selected slew earth mode.
    20. Determine ground session slew time.
    21. Send slew earth command (ACS_SLEW_ETH_TRK_NAD) to ACS software with the ground session slew time.
    22. Setup requested communications subsystem (includes queuing communication command with absolute times).
    23. Calculate CDL phased array pointing trajectory.
    24. Verify transition to earth track mode.
    25. Execute command queue for ground session contact.
    26. Takedown communications subsystem.

Nominal Extensions
    2a. This step only required if spacecraft pointing is required.
    3a. This step only required if spacecraft pointing is required.
    4a. This step only required if spacecraft pointing is required.
    5a. This step only required if spacecraft pointing is required.
    7a. This step only required for CDL contact.
    8a. This step only required if spacecraft pointing is required.

Validate Ground Session Objective Use Case

Goal:
    To validate a ground session objective.

Brief:
    The ground session objective is created from the parameters in the ground session command. Allowing the objective to validate itself and supports a common interface for validating all objective types.

Scope:
    ATE

Level:
    Subfunction

Primary User:
    ATE-AM

Triggers:
    ATE-AM creates a ground session objective.

Preconditions:
    The ground session objective has been created.

Success End Condition:
    The ground session objective is validated.

Minimum Failed End Condition:
    The appropriate messages are logged in the ATE event log and ATE history log.

Main Success Scenario
    24. ATE-AM validates the expiration time.
    25. ATE-AM validates the latitude and longitude.
    26. ATE-AM validates the minimum and maximum slant angles.
    27. ATE-AM validates the priority.
    28. ATE-AM validates the duration.
    29. ATE-AM validates the pointing mode.
    30. ATE-AM validates the begin action.
    31. ATE-AM validates the end action.

Nominal Extensions
    7a. If the "begin action" is execute a script, then validate the end script ID.
    8a. If the "end action" is execute a script, then validate the end script ID.

Failure Extensions
    1a. If the expiration time is invalid, log an invalid expiration time message to both the ATE event log and the ATE history log, and terminate the use case.
    2a. If the latitude or longitude is invalid, log an invalid ground station location message to both the ATE event log and the ATE history log, and terminate the use case.
    3a. If the minimum slant angle or maximum slant angle is invalid, log an invalid slant angle message to both the ATE event log and the ATE history log, and terminate the use case.
    4a. If the priority is invalid, log an invalid priority message to both the ATE event log and the ATE history log, and terminate the use case.
    5a. If the duration is invalid, log an invalid duration message to both the ATE event log and the ATE History log, and terminate the use case.
    6a. If the pointing mode is invalid, log an invalid pointing mode message to both the ATE event log and the ATE history log, and terminate the use case.
    7b. If the begin action is execute a script and the begin script ID is invalid, log an invalid begin script ID message to both the ATE event log and the ATE history log, and terminate the use case.
    7c. If the begin action is execute a script and the begin script ID is invalid, log an invalid begin script id message to both the ATE event log and the ATE history log, and terminate the use case.
    8b. If the end action is invalid, log an invalid end action message to both the ATE event log and the ATE history log, and terminate the use case.
    8c. If the end action is execute a script and the end script ID is invalid, log an invalid end script id message to both the ATE event log and the ATE history log, and terminate the use case.

Ground Session Command

| Command Parameter | Parameter Description |
| --- | --- |
| Expiration Time | The time the ground session request expires. |
| Revolution Number | The orbit revolution number. This number is needed coordinate contact times for ground session resources. |
| Latitude | The latitude of the ground station. |
| Longitude | The longitude of the ground station. |
| Minimum Slant Angle | The minimum slant angle between the spacecraft and the target. |
| Maximum Slant Angle | The maximum slant angle between the spacecraft and the target. |
| Priority | The priority of the ground session request. The priority is used for schedule conflict resolution. (HIGH, MEDIUM, LOW). |
| Duration | The minimum length of time for the ground session contact. Used to insure that the target access time can support the minimum duration for the contact. |

-continued

| Command Parameter | Parameter Description |
|---|---|
| Pointing Mode | Enumerated value for the spacecraft pointing. (e.g. no pointing, point CDL, etc.). |
| Begin Action | The action to be taken at the beginning of the ground session (e.g. CDL ground sessions, SGLS ground session, execute a script, etc.). |
| End Action | The action to be taken at the end of the ground session (e.g. no action, go to solar inertial, go to experiment pointing, execute a script, etc.). |
| Begin Script ID | The id of the script to execute at the beginning of the ground session. |
| Begin Script Parameters | The script parameters that are passed to the begin script. |
| End Script ID | The id of the script to execute at the end of the ground session. |
| End Script Parameters | The script parameters that are passed to the end script. |

Schedule a Ground Session Use Case

Goal:
To schedule a requested ground session.

Brief:
Ground operations, field operations, or an on-board queuing device can request a ground session. The ATE will schedule the requested ground session at the next available time slot that meets the ground session criteria. The ground session criteria consist of the minimum slant angle, the maximum slant angle, the expiration time, and the duration. The ATE uses the requested priority for conflict resolution. The conflict between two requests with the same priority will be resolved using command arrival time (i.e. first come-first served).

Scope:
ATE

Level:
Subfunction

Primary User:
Ground Operations

Triggers:
ATE-AM receives a ground session command (ATE_GND_SESSION).

Preconditions:
ATE processes are started and initialized.

Success End Condition:
The ground session objective is inserted into the ATE schedule. The ATE commands accepted counter is incremented.

Minimum Failed End Condition:
The ground session objective is not scheduled. The appropriate messages are logged in the ATE event log and ATE history log.

Main Success Scenario
32. ATE-AM creates a ground session objective.
33. ATE-AM validates the ground session objective.
34. ATE-AM increments the ATE commands accepted counter.
35. ATE-AM gets the ground session objective's information for scheduling (i.e. position in ECEF, the minimum slant angle, and maximum slant angle).
36. ATE-AM determines search start time (i.e. current time+image objective setup time) and search end time (i.e. ground session command received time+one orbit period).
37. ATE-AM determines a target access time and associated data for the ground session.
38. ATE-AM determines the target begin time (i.e. target access time−½*duration) and target end time (i.e. target access time+½*duration).
39. ATE-AM determines the objective begin time (i.e. target begin time−(ground session slew time+ground session settle time+ground session guard time)) and objective end time (i.e. target end time+end action time) for the ground session objective.
40. ATE-AM adds the ground session objective to the near term objectives.
41. ATE-AM sends near term objective scheduled telemetry packet.
42. ATE-AM logs ground session objective added to the near term objectives in the ATE event log.

Nominal Extensions
6a. If a target access time for the ground session is not found in the next orbit period, the ATE-AM sends the ground session objective to the ATE-PM to add the image objective to the long term objectives.
8a. If the objective begin time has already passed, the ATE-AM sends the ground session objective to the ATE-PM to add the image objective to the long term objectives.
9a. If the ground session objective collides with an objective with a higher priority or equal priority in the near term objectives, the ATE-AM sends the ground session objective to the ATE-PM to add the image objective to the long term objectives.
9b. If the ground session objective collides with an objective with a lower priority in the near term objectives, the ATE-AM removes the objective from the near term objective. The ATE-AM adds the ground session objective to the near term objectives. The ATE-AM attempts to reschedule removed objectives.

Failure Extensions
1a. If the creation of the image objective fails, the ATE-AM logs an objective creation error message to both the ATE event log and the ATE history log and terminates the use case.
2a. If the creation of the image objective fails, the ATE-AM logs an objective creation error message to both the ATE event log and the ATE history log and terminates the use case.
3a. If the target access time for the ground session is after the expiration time, the ATE-AM logs an ground session request expired message to both the ATE event log and the ATE history log, deletes the image objective, and terminates the use case.
Ground Session Slew Time
Ground Session Settling Time
Ground Session Guard Time Execute a Ground Session Objective Use Case Goal:
To execute ground session over the requested target location.

Brief:
The ATE executes a ground session objective when the begin time of the objective arrives. The ATE performs the necessary setup to support the ground session. The ATE schedules commands to configure the requested antenna at the correct times to maintain ground contact over the target location. The ATE performs the necessary cleanup and end action after the ground session is complete.

Scope:
  Subsystem

Level:
  Subfunction

Primary User:
  Ground Operations

Triggers:
  A ground session objective "begin time" arrives.

Preconditions:
  ATE processes are started and initialized.
  The spacecraft and ACS software are in the correct states to support imaging the target location.

Success End Condition:
  The "end action" for the ground session objective is executed.
  The ATE-AM removes the ground session objective from the near term objectives.

Minimum Failed End Condition:
  The ATE-AM removes the ground session objective from the near term objectives. The appropriate messages are logged in the ATE event log and ATE history log.

Main Success Scenario
  27. ATE-AM notifies the ATE-EM that it is time to execute the ground session objective.
  28. ATE-EM validates the ground session objective just-in-time criteria.
  29. ATE-EM performs ground session contact.
  30. ATE-EM executes the "end action".
  31. ATE-EM notifies the ATE-AM that the ground session objective completed successfully.
  32. ATE-AM logs ground session objective successfully completed in the ATE event log.

Failure Extensions
  2a. If the ground session objective just-in-time criteria is invalid, log an invalid ground session just-in-time criteria message to both the ATE event log and the ATE history log, and terminate the use case.

Perform Imaging Pass Use Case

Goal:
  To configure the spacecraft and imager to perform image collection over the desired location.

Brief:
  To perform a successful imaging pass, the spacecraft must be placed in the correct attitude to sweep the imager's view across the desired target location. The imager, the RoadRunner On-Processing Experiment (ROPE), and the image memory must be configured to acquire and save the image data. The spacecraft position and attitude data must also be collected during the imaging pass for image reconstruction at a later time.

Scope:
  ATE

Level:
  Subfunction

Primary User:
  ATE-EM

Triggers:
  The objective begin time for an image objective occurred.

Preconditions:
  The spacecraft and ACS software are in the correct states to support imaging the target location.

Success End Condition:
  The image and supporting data are collected

Minimum Failed End Condition:
  The imager is properly shutdown.
  The spacecraft is in a favorable mode.

Main Success Scenario
  33. Determine which slew earth mode to use.
  34. Calculate align and clock vectors in body frame.
  35. Send align and clock vectors to ACS software for selected slew earth mode.
  36. Determine image slew time.
  37. Send slew earth command (ACS_SLEW_ETH_TRK_NAD) to ACS Software with the image slew time.
  38. Setup imager (includes queuing imager on and off commands with absolute times).
  39. Setup ROPE.
  40. Setup memory for image.
  41. Verify transition to earth track mode.
  42. Execute command queue for imaging.
  43. Collect image support data.
  44. Takedown imager.
  45. Takedown ROPE.

Validate Image Objective Use Case

Goal:
  To validate an image objective.

Brief:
  The image objective is created from the parameters in the image command. Allowing the objective to validate itself supports a common interface for validating all objective types.

Scope:
  ATE

Level:
  Subfunction

Primary User:
  ATE-AM

Triggers:
  ATE-AM creates an image objective.

Preconditions:
  The image objective has been created.

Success End Condition:
  The image objective is validated.

Minimum Failed End Condition:
  The appropriate messages are logged in the ATE event log and ATE history log.

Main Success Scenario
   43. ATE-AM validates the expiration time.
   44. ATE-AM validates the latitude and longitude.
   45. ATE-AM validates the minimum and maximum slant angles.
   46. ATE-AM validates the priority.
   47. ATE-AM validates the image size
   48. ATE-AM validates the day or night indicator.
   49. ATE-AM validates the end action.
   50. ATE-AM validates the imager parameters.
   51. ATE-AM validates the ROPE parameters.

Nominal Extensions
   7a. If the end action is execute a script, then validate the end script id.

Failure Extensions
   1a. If the expiration time is invalid, log an invalid expiration time message to both the ATE event log and the ATE history log, and terminate the use case.
   2a. If the latitude or longitude is invalid, log an invalid target location message to both the ATE event log and the ATE history log, and terminate the use case.
   3a. If the minimum slant angle or maximum slant angle is invalid, log an invalid slant angle message to both the ATE event log and the ATE history log, and terminate the use case.
   4a. If the priority is invalid, log an "invalid priority message" to both the ATE event log and the ATE history log, and terminate the use case.
   5a. If the image size is invalid, log an "invalid duration message" to both the ATE event log and the ATE History log, and terminate the use case.
   6a. If the day night indicator is invalid, log an "invalid image size message" to both the ATE event log and the ATE history log, and terminate the use case.
   7b. If the end action is invalid, log an "invalid end action message" to both the ATE event log and the ATE history log, and terminate the use case.
   7c. If the end action is execute a script and the end script ID is invalid, log an "invalid end script ID message" to both the ATE event log and the ATE history log, and terminate the use case.
   8a. If the imager parameters are invalid, log an "invalid imager parameters message" to both the ATE event log and the ATE history log, and terminate the use case.
   9a. If the ROPE parameters are invalid, log an "invalid ROPE parameters message" to both the ATE event log and the ATE history log, and terminate the use case.

Image Command

| Command Parameter | Parameter Description |
| --- | --- |
| Expiration Time | The time the image request expires. |
| Latitude | The latitude of the target to be imaged. |
| Longitude | The longitude of the target to be imaged. |
| Minimum Slant Angle | The minimum slant angle between the spacecraft and the target. |
| Maximum Slant Angle | The maximum slant angle between the spacecraft and the target. |
| Priority | The priority of the image request. The priority is used for schedule conflict resolution. (HIGH, MEDIUM, LOW). |
| Image Size | Enumerated value for the requested image size. (e.g. 0 = 6 km x 6 km, 1 + 6 km x 12 km, etc.) |
| Day Night Indicator | Enumerated value for when the image should be taken (e.g. Day = 0, Night = 1, and Either = 2). |
| End Action | The action to be taken at the end of the image pass (e.g. no action, go to solar inertial, go to experiment pointing, execute a script, etc.). |
| End Script ID | The id of the script to execute at the end of the imaging pass. |
| End Script Parameters | The script parameters that are passed to the end script. |
| Imager Parameters | TDB list of parameters for the imager. |
| Rope Parameters | TDB list of parameters for the rope. |

Schedule an Image Use Case

Goal:
   To schedule a requested imaging opportunity.

Brief:
   Ground operations, field operations, or an on-board queuing device can request an imaging opportunity. The ATE will schedule the requested image opportunity at the next available time slot that meets the imaging criteria. The imaging criteria consist of the latitude, the longitude, the minimum slant angle, the maximum slant angle, the day or night indicator, and the expiration time. The ATE uses the requested priority for conflict resolution. The conflict between two requests with the same priority will be resolved using command arrival time (i.e. first-come-first-served).

Scope:
   ATE

Level:
   Subfunction

Primary User:
   Ground Operations

Triggers:
   ATE-AM receives an image command (ATE_IMAGE).

Preconditions:
   ATE processes are started and initialized.

Success End Condition:
   The image objective is inserted into the ATE schedule.
   The ATE commands accepted counter is incremented.

Minimum Failed End Condition:
   The image objective is not scheduled.
   The appropriate messages are logged in the ATE event log and ATE history log.

Main Success Scenario
   52. ATE-AM creates an image objective.
   53. ATE-AM validates the image objective.
   54. ATE-AM increments the ATE commands accepted counter.
   55. ATE-AM gets the image objective's information for scheduling (i.e. position in ECEF, the minimum slant angle, and the maximum slant angle).
   56. ATE-AM determines search start time (i.e. current time+image objective setup time) and search end time (i.e. image command received time+one orbit period).

57. ATE-AM determines a target access time and associated data for the image.

58. ATE-AM determines the target begin time (i.e. target access time−½*imager on time) and target end time (i.e. target access time+½*imager on time).

59. ATE-AM determines the objective begin time (i.e. target being time−(image slew time+image settle time+image guard time)) and objective end time (i.e. target end time+end action time) for the image objective.

60. ATE-AM adds the image objective to the near term objectives.

61. ATE-AM sends near term objective scheduled telemetry packet.

62. ATE-AM logs image objective added to the near term objectives in the ATE event log.

Nominal Extensions

6a. If a target access time for the image is not found in the next orbit period, the ATE-AM sends the image objective to the ATE-PM to add the image objective to the long term objectives.

7a. If the objective "begin time" for the image objective has already passed, the ATE-AM sends the image objective to the ATE-PM to add the image objective to the long term objectives.

8a. If the image objective collides with an objective with a higher priority or equal priority in the near term objectives, the ATE-AM sends the image objective to the ATE-PM to add the image objective to the long term objectives.

8b. If the image objective collides with an objective having a lower priority in the near term objectives, the ATE-AM removes the lower priority objective from the near term objectives. The ATE-AM adds the higher priority image objective to the near term objectives. The ATE-AM attempts to reschedule the removed objective.

Failure Extensions

1a. If the creation of the image objective fails, the ATE-AM logs an objective creation error message to both the ATE event log and the ATE history log and terminates the use case.

2a. If the image objective is invalid, the ATE-AM increments the ATE commands rejected counter, logs an invalid image command message to both the ATE event log and the ATE history log, and terminates the use case.

6a. If the target access time for the image is after the expiration time, the ATE-AM logs an image request expired message to both the ATE event log and the ATE history log, deletes the image objective, and terminates the use case.

Constants:
   Image Slew Time
   Image Settling Time
   Image Guard Time

Execute an Image Objective Use Case

Goal:
   To execute an imaging pass of the requested target location.

Brief:
   The ATE executes an image objective when the begin time of the objective arrives. The ATE performs the necessary setup to support the image pass. The ATE schedules commands to turn on and turn off the imager at the precise times to obtain the correct image size over the target location. The ATE performs the necessary cleanup and end action after the image pass is complete.

Scope:
   Subsystem

Level:
   Subfunction

Primary User:
   Ground Operations

Triggers:
   An image objective "begin time" arrives.

Preconditions:
   ATE processes are started and initialized.
   The spacecraft and ACS software are in the correct states to support imaging the target location.

Success End Condition:
   The "end action" for the image objective is executed.
   The ATE-AM removes the image objective from the near term objectives.

Minimum Failed End Condition:
   The ATE-AM removes the image objective from the near term objectives.
   The appropriate messages are logged in the ATE event log and ATE history log.

Main Success Scenario

46. ATE-AM notifies the ATE-EM that it is time to execute the image objective.

47. ATE-EM validates the image objective just-in-time criteria.

48. ATE-EM performs imaging pass.

49. ATE-EM executes the end action.

50. ATE-EM notifies the ATE-AM that the image objective completed successfully.

51. ATE-AM logs image objective successfully completed in the ATE event log.

Failure Extensions

2a. If the imager objective "just-in-time criteria" is invalid, log an invalid image just-in-time criteria message to both the ATE event log and the ATE history log, and terminate the use case.

Perform Orbit Adjust Use Case

Goal:
   To configure the spacecraft and thruster to perform an orbit adjustment at the desired time.

Brief:
   To perform a successful orbit adjustment, the spacecraft must be placed in the correct attitude to maneuver the spacecraft with the desired DV at the correct time. The thruster must be fired for the correct duration to achieve the desired DV. After the DV is complete, the spacecraft must be rotated 180 degrees to gather data for the thruster experiment.

Scope:
   ATE

Level:
   Subfunction

Primary User:
   ATE-EM

Triggers:
   The objective "begin time" for an orbit adjust objective occurred.

Preconditions:
   The spacecraft ACS software are in the correct states to support the orbit adjustment.

Success End Condition:
   The orbit is adjusted.

Minimum Failed End Condition:
   The thruster is properly shutdown.
   The spacecraft is in a favorable mode.

Main Success Scenario
   52. Determine which slew earth mode to use.
   53. Calculate align and clock vectors in body frame for the orbit adjust.
   54. Send align and clock vectors to ACS software for the orbit adjust for the selected slew earth mode.
   55. Determine orbit adjust slew time.
   56. Send slew earth command (ACS_SLEW_ETH_TRK_NAD) to ACS software with the orbit adjust slew time.
   57. Setup thruster (includes queuing thruster on and off commands with absolute times).
   58. Verify transition to earth track mode.
   59. Execute command queue for orbit adjust.
   60. Calculate align and clock vectors in body frame for post orbit adjust data collect.
   61. Send alignment and clock vectors for the post orbit adjustment data collect to ACS software for the slew earth mode not used for the tactical field image.
   62. Determine post orbit adjust slew time.
   63. Verify orbit adjust complete.
   64. Send slew earth command (ACS_SLEW_ETH_TRK_NAD) to ACS software with the post orbit adjust slew time.
   65. Verify transition to earth track mode.
   66. Takedown thruster.
   67. Execute end action.

Validate Orbit Adjust Objective Use Case

Goal:
   To validate an orbit adjust objective.

Brief:
   The orbit adjust objective is created from the parameters in the orbit adjust command. Allowing the objective to validate itself supports a common interface for validating all objective types.

Scope:
   ATE

Level:
   Subfunction

Primary User:
   ATE-AM

Triggers:
   ATE-AM creates an orbit adjust objective.

Preconditions:
   The orbit adjust objective has been created.

Success End Condition:
   The orbit adjust objective is validated.

Minimum Failed End Condition:
   The appropriate messages are logged in the ATE event log and ATE history log.

Main Success Scenario
   63. ATE-AM validates the current orbit DV.
   64. ATE-AM validates the current orbit DV time.
   65. ATE-AM validates the next orbit DV.
   66. ATE-AM validates the next orbit DV time.
   67. ATE-AM validates the end action.

Nominal Extensions
   5a. If the end action is execute a script, then validate the end script ID.

Failure Extensions
   1a. If the current orbit DV is invalid, log an invalid current orbit DV message to both the ATE event log and the ATE history log, and terminate the use case.
   2a. If the current orbit-DV time is invalid, log an invalid current orbit delta-v time message to both the ATE event log and the ATE history log, and terminate the use case.
   3a. If the next orbit DV is invalid, log an invalid next orbit DV message to both the ATE event log and the ATE history log, and terminate the use case.
   4a. If the next orbit DV time is invalid, log an invalid next orbit delta-v time message to both the ATE event log and the ATE history log, and terminate the use case.
   5b. If the end action is invalid, log an invalid end action message to both the ATE event log and the ATE history log, and terminate the use case.
   5c. If the end action is execute a script and the end script id is invalid, log an invalid end script id message to both the ATE event log and the ATE history log, and terminate the use case.

| Command Parameter | Parameter Description |
| --- | --- |
| Current Orbit DV | Requested DV maneuver during the current orbit. |
| Current Orbit DV Time | The time to begin the DV maneuver within the current orbit. |
| Next Orbit DV | Requested DV maneuver during the next orbit. |
| Next Orbit DV Time | The time to begin the DV maneuver within the next orbit. |
| End Action | The action to be taken at the end of the orbit adjustment (e.g. no action, go to solar inertial, go to experiment pointing, execute a script, etc.). |
| End Script ID | The ID of the script to execute at the end of the orbit adjustment. |
| End Script Parameters | The script parameters that are passed to the end script. |

Perform Orbit Determination Use Case

Goal:
   To perform orbit determination from a set of GPS state vectors.

Brief:
   Periodically the Microcosm experiment will receive GPS state vectors for the spacecraft. The Microcosm experiment will use a set of the GPS state vectors to determine the orbit of the spacecraft. Based on the orbit determination and parameters for the desired orbit, the Microcosm experiment can request an orbit adjustment.

Scope:
   Microcosm

Level:
   Subfunction

Primary User:
    ATE

Triggers:
    Microcosm receives a GPS state vector.

Preconditions:
    ATE and Microcosm processes are stated and initialized.

Success End Condition:
    Orbit determination is successfully performed.

Minimum Failed End Condition:
    The appropriate messages are logged in the Microcosm log.

Main Success Scenario
    68. ATE-VM sends the GPS state vector and associated time of state vector to Microcosm.
        69. Determine the orbit.

Request an Orbit Adjust Use Case

Goal:
    To request an orbit adjustment.

Brief:
    Periodically the Microcosm experiment will calculate DV's for an orbit adjustment. When the DV's are calculated is TBD; however, the calculation could be event driven with some orbital event. Once the DV's are calculated, the Microcosm experiment sends an orbit adjust command to the ATE for scheduling.

Scope:
    Microcosm

Level:
    Subfunction

Primary User:
    ATE

Triggers:
    Microcosm receives a determine orbit adjust event (could be tied to any orbital event).

Preconditions:
    ATE and Microcosm processes are started and initialized.

Success End Condition:
    An orbit adjust command is send to the ATE.

Minimum Failed End Condition:
    The appropriate messages are logged in the Microcosm log.

Main Success Scenario
    1. ATE-EE sends determine orbit adjust event to Microcosm
    2. Determine the DV and DV time for the current orbit.
    3. Determine the DV and DV time for the next orbit.
    4. Send orbit adjust command to ATE. Setting up and sending the orbit adjust command can be as simple as executing an SCL script with the DV and time(s) as script parameters.

Schedule an Orbit Adjust Use Case

Goal:
    To schedule a requested orbit adjustment.

Brief:
    Ground operations or on-board software (i.e. microcosm) can request an orbit adjustment. The orbit adjust command contains two orbit adjust requests; one request for the current orbit and one request for the next orbit. The ATE will attempt to schedule the requested current orbit adjustment. If the current orbit adjustment cannot be scheduled, the ATE will attempt to schedule the requested next orbit adjustment. If the neither requested orbit adjustment is scheduled, the ATE will provide telemetry indicating that the orbit adjust request cannot be accommodated. If several consecutive orbit adjust requests cannot be scheduled, then ground operations should free up time (i.e. delete high priority objectives) in the ATE schedule.

Scope:
    ATE

Level:
    Subfunction

Primary User:
    Microcosm

Triggers:
    ATE-AM receives an orbit adjust command (ATE_ORB_ADJ).

Preconditions:
    ATE processes are started and initialized.

Success End Condition:
    The orbit adjust objective is inserted into the ATE schedule.
    The ATE commands accepted counter is incremented.

Minimum Failed End Condition:
    The orbit adjust is not scheduled.
    An orbit adjust not scheduled telemetry packet is generated.
    The appropriate messages are logged in the ATE event log and ATE history log.

Main Success Scenario
    1. ATE-AM creates an orbit adjust objective.
    2. ATE-AM validates the orbit adjust objective.
    3. ATE-AM increments the ATE commands accepted counter.
    4. ATE-AM determines orbit adjust priority base on the magnitude of the current orbit DV. The greater the magnitude the higher the priority.
    5. ATE-AM determines the objective begin time (i.e. current orbit DV time−(orbit adjust slew time+orbit adjust settle time+orbit adjust guard time)) and objective end time (i.e. current orbit DV time+DV burn time+post orbit adjust slew time+post orbit adjust settle time+end action time) for the orbit adjust objective.
    6. ATE-AM adds the orbit adjust objective to the near term objectives.
    7. ATE-AM sends near term objective scheduled telemetry packet.
    8. ATE-AM logs orbit adjust added to the near term objectives in the ATE event log.

Nominal Extensions

6a. If the orbit adjust objective "begin time" has already occurred, the ATE-AM sends the orbit adjust to the ATE-PM to add the orbit adjust to the long term objectives.

6b. If the orbit adjust objective collides with an objective in the near term objectives that has a lower priority than an orbit adjust objective, the ATE-AM removes the objective from the near term objectives. The ATE-AM adds the orbit adjust objective to the near term objectives. The ATE-AM attempts to reschedule the removed objective.

Failure Extensions

1a. If the creation of the orbit adjust objective fails, the ATE-AM logs an objective creation error message to both the ATE event log and the ATE history log and terminates the use case.

2a. If the orbit adjust objective is invalid, the ATE-AM increments the ATE commands rejected counter, logs an invalid image command message to both the ATE event log and the ATE history log and terminates the use case.

Execute an Orbit Adjust Use Case

Goal:
To execute an orbit adjust at the requested time for the adjustment.

Brief:
The ATE executes an orbit adjust when the orbit adjust objective "begin time" arrives. The ATE performs the necessary setup to support the orbit adjust. The ATE schedules command to turn on and turn off the thruster at the precise times to obtain the correct orbit adjustment. The ATE performs the necessary cleanup and end action after the orbit adjust is complete.

Scope:
ATE

Level:
Subfunction

Primary User:
Microcosm

Triggers:
An orbit adjust objective begin time arrives.

Preconditions:
ATE processes are started and initialized.

Success End Condition:
The end action is executed.
The ATE-AM removes the orbit adjust objective from the near term objectives.

Minimum Failed End Condition:
The ATE-AM removes the orbit adjust objective from the near term objectives.
The appropriate messages are logged in the ATE event log and ATE history log.

Main Success Scenario
68. ATE-AM notifies the ATE-EM that it is time to execute the orbit adjust objective.
69. ATE-EM validates the orbit adjust just-in-time criteria.
70. ATE-EM performs orbit adjust.
71. ATE-EM executes the end action.
72. ATE-EM notifies the ATE-AM that the orbit adjust objective completed successfully.
73. ATE-AM logs orbit adjust objective successfully completed in the ATE event log.

| Command Parameter | Parameter Description |
| --- | --- |
| File(s) To Prepare Flag(s) | Identifies which ATE container to prepare as files for download. |

Prepare File(s) Use Case

Goal:
Prepare an ATE container(s) as a file for download.

Brief:
The containers that ATE uses to manage scheduling and execution may not be in a contiguous section of memory. The ground operations uses the prepare file command to signal the ATE to prepare a file(s) for the requested container(s). The file will be located in a contiguous section of memory for downloading.

Level:
Subfunction

Primary User:
Ground Operations

Triggers:
ATE-AM receives a prepare file command (ATE_PREP_FILE).

Preconditions:
ATE processes are started and initialized.

Success End Condition:
The requested file(s) are prepared from the matching ATE container(s).

Minimum Failed End Condition:
The file(s) are not prepared.
The appropriate messages are logged in the ATE event log and ATE history log.

Main Success Scenario
8. ATE-AM validates the file(s) to prepare flag(s)
9. ATE-AM increments the ATE commands accepted counter.
10. ATE-AM notifies other ATE processes to prepare the requested files.
11. ATE-AM prepares the near term objectives file.

Nominal Extensions
3a. If the file(s) to prepare flag(s) only specifies the near term objectives, the ATE-AM does not notify the other ATE processes.
4a. If the file(s) to prepare flag(s) does not specify the near term objectives, the ATE-AM does not prepare the near term objectives file.

Failure Extensions
1a. If the file(s) to prepare flags(s) is invalid, the ATE-AM increments the ATE commands rejected counter, logs an file(s) to prepare a flags(s) error message to both the ATE event log and the ATE history log, and terminates the use case.
4a. If the ATE-AM fails to prepare the near term objectives file, the ATE-AM logs a find near term objectives prepare file error message to both the ATE event log and the ATE history log and terminates the use case.

Propagate Orbit Use Case

Goal:
　To propagate a set of ephemeris entries from a given state vector.

Brief:
　The ATE software requires spacecraft ephemeris data to determine when to schedule an objective, given a target latitude and longitude. The spacecraft ephemeris is generated from a spacecraft state vector. This state vector is provided from either IGOR or from ground operations. Two sets of ephemeris will be maintained by the ATE. The first set is the near-term ephemeris. The near-term ephemeris will be maintained by the ATE. The first set is the near-term ephemeris. The near-term ephemeris contains ephemeris entries for the next two orbits. The second set is the long-term ephemeris. The long-term ephemeris contains ephemeris entries for the next eight and a half days.

Scope:
　ATE

Level:
　Subfunction

Primary User:
　ATE-NTOP and ATE-LTOP

Triggers:
　The propagate ephemeris event is received.

| Command Parameter | Parameter Description |
| --- | --- |
| Execute Time | The time to begin the script execution. |
| Script ID | The ID of the script to execute at the requested time. |

Preconditions:
　ATE processes are started and initialized.

Success End Condition:
　The ephemeris is propagated.

Minimum Failed End Condition:
　The proper messages are logged.

Main Success Scenario
　74. Validate orbit propagation configuration parameters (i.e. current state vector, time of current state vector, ephemeris time step, integration time step, and order and degree of the gravity model).
　75. Determine begin time and end times for the ephemeris entries.
　76. Propagate from time of the current state vector until the "begin time" for the first ephemeris entry without storing the ephemeris entries.
　77. From begin time until end time perform steps 5-7.
　78. Propagate next state vector and store it in the associated ephemeris entry.
　79. Transform the state vector position from ECI to ECEF and store the position in ECEF in the associated ephemeris entry.
　80. Calculate the nadir sun innerangle and store it in the associated ephemeris entry.

Delete Scheduled Script Use Case

Goal:
　Delete a scheduled script from the script schedule.

Brief:
　The ability to delete a scheduled SCL script provides ground operations a way to abort a scheduled script prior to script execution.

Scope:
　Subsystem

Level:
　Subfunction

Primary User:
　Ground Operations

Triggers:
　ATE-AM receives a delete scheduled script command (ATE_DEL_SCRIPT).

Preconditions:
　ATE processes are started and initialized.

Success End Condition:
　The script is deleted from the script schedule.

Minimum Failed End Condition:
　The requested script is not deleted from the script schedule.
　The appropriate messages are logged in the ATE event log and ATE history log.

Main Success Scenario
　12. ATE-AM validates the execute time.
　13. ATE-AM increments the ATE commands accepted counter.
　14. ATE-AM forwards the delete schedule script command to the ATE-SS.
　15. ATE-SS finds the requested script in the script schedule.
　16. ATE-SS removes the script object from the script schedule.

Failure Extensions
　1a. If the execute time has already occurred, the ATE-SS increments the ATE commands rejected counter, logs and execute time error message to both the ATE event log and the ATE history log, and terminates the use case.
　4a. If the ATE-SS fails to locate the script in the script schedule, the ATE-SS logs a find script object error message to both the ATE event log and the ATE history log and terminates the use case.

| Command Parameter | Parameter Description |
| --- | --- |
| Execute Time | The time to begin the exclusive reservation. |
| Script ID | The id of the script to execute at the requested time. |
| Script Parameters | The script parameters that are passed to the script. |

Schedule A Script Use Case

Goal:
　Schedule a pre-loaded SCL script to be executed at a requested time.

Brief:
　The ability to schedule SCL scripts provides ground operations a way to schedule spacecraft activities on-board the spacecraft in advance. Scheduling a script with the schedule script command minimizes the resources required by the script until executing the script. Scheduling a script with the SCL command execute-script-at and execute-script-in require the full complement of resources for the when the command is sent to SCL. Scheduled scripts may also be used for fault injection during testing.

Scope:
　ATE

Level:
　Subfunction

Primary User:
　Ground Operations

Triggers:
　ATE-SS receives a schedule script command (ATE_SCHED_SCRIPT).

Preconditions:
　ATE processes are started and initialized.
　The script is loaded in the SCL project.

Success End Condition:
　The script is scheduled for execution.

Minimum Failed End Condition:
　The script is not scheduled for execution.
　The appropriate messages are logged in the ATE event log and ATE history log.

Main Success Scenario
　17. ATE-AM validates the execute time.
　18. ATE-AM validates the script id.
　19. ATE-AM increments the ATE commands accepted counter.
　20. ATE-AM sends schedule script message to ATE-SS.
　21. ATE-SS creates a script request object.
　22. ATE-SS inserts the script request into the script requests.
　23. ATE-AM sends script request scheduled telemetry packet.
　24. ATE-SS requests that the ATE-EE schedule an execute script event.
　The time for the execute script event is the script execution time minus TBD seconds.

Nominal Extensions
　8a. If the newly scheduled script is not the next script to be executed by the ATE-SS, then do not request the execute script event. The ATE-SS should only have one execute script event in the ATE-EE event schedule at a time.

Failure Extensions
　1a. If the execute time has already occurred, the ATE-AM increments the ATE commands rejected counter, logs and execute time error message to both the ATE event log and the ATE history log, and terminates the use case.
　2a. If the script ID is invalid, the ATE-AM increments the ATE commands rejected counter, logs script id error message to both the ATE event log and the ATE history log, and terminates the use case.
　5a. If the creation of the script request object fails, the ATE-SS logs a script object creation error message to both the ATE event log and the ATE history log and terminates the use case.
　8b. If the request for the execute script event fails, the ATE-SS logs a request for event notification error message to both the ATE event log and the ATE history log, deletes the script object, and terminates the use case.

Execute a Scheduled Script Use Case

Goal:
　To execute a scheduled script at the requested time.

Brief:
　The ATE executes the scheduled script by sending an execute-script-at command to SCL prior to the request time to execute the script.

Scope:
　Subsystem

Level:
　Subfunction

Primary User:
　Ground Operations

Triggers:
　ATE-SS receive an execute script event.

Preconditions:
　ATE processes are started and initialized
　SCL processes are initialized and the RTE is started.

Success End Condition:
　The script is executed.
　The ATE-SS removes the script object from the scheduled scripts.

Minimum Failed End Condition:
　The ATE-SS removes the script object from the scheduled scripts.
　The appropriate messages are logged in the ATE event log and ATE history log.

Main Success Scenario
　81. ATE-EE notifies the ATE-SS it is time to execute a script.
　82. ATE-SS verifies that it is time to execute the first script in the script schedule.
　83. ATE-SS sends an execute-script-at command to SCL to execute the script
　84. ATE-SS removes the script object from the script schedule.
　85. ATE-SS logs script executed message in the ATE event log.

Perform Tactical Field Experimental Use Case

Goal:
　To configure the spacecraft, imager, and CDL communications to perform an image collection over the desired location and downlink the image to the desired CDL location.

Brief:

To perform a successful tactical field experiment, the spacecraft must be placed in the correct attitude to sweep the imager's view across the desired image target location. The imager, the ROPE, and the image memory must be configured to acquire and save the image data. The spacecraft position and attitude data must also be collected during the imaging pass for image reconstruction at a later time. After the image pass is complete, the spacecraft must be placed in the correct attitude to sweep the CDL communications contact area across the desired ground session target location. The CDL communications subsystem must be configured prior to the ground session contact.

Scope:
ATE

Level:
Subfunction

Primary User:
ATE-AM

Triggers:
The tactical field experiment objective is created and validated.

Preconditions:
The spacecraft and ACS software are in the correct states to support the tactical field experiment.

Success End Condition:
The image and supporting data are collected and downlinked.

Minimum Failed End Condition:
The imager is properly shutdown.
The CDL communications subsystem is properly shutdown.
The spacecraft is in a favorable mode.

Main Success Scenario
86. Determine which slew earth mode to use.
87. Determine a target time for the tactical field image.
88. Calculate align and clock vectors in body frame for the tactical field image.
89. Send align and clock vectors for the tactical field image to ACS software for selected slew earth mode.
90. Determine tactical field image slew time.
91. Send slew earth command (ACS_SLEW_ETH_TRK_NAD) to ACS software with the image slew time.
92. Determine the target begin time and target end time for the tactical field image.
93. Setup imager (includes queuing imager on and off commands with absolute times and executing the command queue).
94. Setup ROPE.
95. Setup memory for image.
96. Collect image support data.
97. Determine a target time for the tactical field ground session.
98. Calculate align and clock vectors in body frame for the tactical field ground session.
99. Send alignment and clock vectors for the tactical field ground session to ACS software for the slew earth mode not used for the tactical field image.
100. Determine tactical field ground session slew time from the tactical field image attitude to the tactical field ground session attitude.
101. Determine the target begin time and target end time for the tactical field image.
102. Verify transition to earth track mode for the tactical field image.
103. Verify image collection complete.
104. Send slew earth command (ACS_SLEW_ETH_TRK_NAD) to ACS software with the tactical field ground session slew time.
105. Setup CDL communications subsystem for downlink (includes queuing CDL commands with absolute times and executing the command queue).
106. Calculate CDL phased array pointing trajectory.
107. Verify transition to earth track mode.
108. Execute CDL phased array pointing trajectory.
109. Takedown imager.
110. Takedown rope.
111. Takedown CDL.

Validate Tactical Field Experiment Objective Use Case

Goal:
To validate a tactical field experiment objective.

Brief:
The tactical field experiment objective is created from the parameters in the tactical field experiment command. Allowing the objective to validate itself supports a common interface for validating all objective types.

Scope:
ATE

Level:
Subfunction

Primary User:
ATE-AM

Triggers:
ATE-AM creates a tactical field experiment objective.

Preconditions:
The tactical field experiment objective has been created.

Success End Condition:
The tactical field experiment objective is validated.

Minimum Failed End Condition:
The appropriate messages are logged in the ATE event log and ATE history log.

Main Success Scenario
70. ATE-AM validates the target latitude and target longitude.
71. ATE-AM validates the image size.
72. ATE-AM validates the grounds session latitude and longitude.
73. ATE-AM validates the duration.
74. ATE-AM validates the imager parameters.
75. ATE-AM validates the ROPE parameters.

Nominal Extensions
3a-4a. If perform ground session is false, then do not validate the ground session parameters.

Failure Extensions
1a. If the target latitude or target longitude is invalid, log an invalid target location message to both the ATE event log and the ATE history log, and terminate the use case.
2a. If the image size is invalid, log an invalid image size message to both the ATE event log and the ATE history log, and terminate the use case.

3b. If the ground session latitude or ground session longitude is invalid, log an invalid ground session location message to both the ATE event log and the ATE history log, and terminate the use case.

4b. If the duration is invalid, log an invalid ground session duration message to both the ATE event log and the ATE history log, and terminate the use case.

5a. If the imager parameters are invalid, log an invalid imager parameters message to both the ATE event log and the ATE history log, and terminate the use case.

6a. If the ROPE parameters are invalid, log an invalid ROPER parameters message to both the ATE event log and the ATE history log, and terminate the use case.

Tactical Field Experiment Command

| Command Parameter | Parameter Description |
|---|---|
| Target Latitude | The latitude of the target to be imaged. |
| Target Longitude | The longitude of the target to be imaged. |
| Image Size | Enumerated value for the requested image size. (e.g. 0 = 6 km × 6 km, 1 = 6 km × 12 km, etc.) |
| Perform Ground Session | Indicates whether of not to perform the ground session as part of the tactical field experiment. The ground session should only be valid when the target and the ground station are located near one another. |
| Ground Session Latitude | The latitude for ground session contact. |
| Ground Session Longitude | The longitude of the ground session contact. |
| Duration | The length of time for the ground session contact. |
| Imager Parameters | TDB list of parameters for the imager. |
| Roper Parameters | TDB list of parameters for the rope. |

Execute Tactical Field Experimental Objective Use Case

Goal:
To execute tactical field experiment that images a target location and initiates a ground session to downlink the image.

Brief:
The ATE executes a tactical field experiment objective when the ATE is executing a tactical field reservation and the ATE receives a tactical field experiment command. The ATE determines when to execute the image pass and ground session contact. The ATE performs the necessary setup to support the tactical field experiment. The ATE schedules commands to turn on and turn off the imager at the precise times to obtain the correct image size over the target location. The ATE performs the necessary setup to support the ground session contact. The ATE schedules commands to configure the requested antenna at the correct times to maintain ground contact over the target location. The ATE performs the necessary cleanup after the image pass and/or ground session is complete.

Scope:
ATE

Level:
Subfunction

Primary User:
Tactical Field Terminal

Triggers:
ATE-AM receives a tactical field experiment command (ATE_TF_EXP).

Preconditions:
ATE is executing a tactical field reservation.
The spacecraft and ACS software are in the correct states to support the tactical field experiment.

Success End Condition:
The tactical field experiment objective is executed.
The ATE commands accepted counter is incremented.

Minimum Failed End Condition:
The tactical field experiment objective is not executed.
The appropriate messages are logged in the ATE event log and ATE history log.

Main Success Scenario
76. ATE-AM verifies that a tactical field reservation objective is being executed.
77. ATE-AM creates a tactical field experiment objective.
78. ATE-AM validates the tactical field experiment objective.
79. ATE-AM increments the ATE commands accepted counter.
80. ATE-AM notifies the ATE-EM to execute the tactical field experiment objective.
81. ATE-EM validates the tactical field experiment just-in-time criteria.
82. ATE-EM performs the tactical field experiment.
83. ATE-EM notifies the ATE-AM that the tactical field experiment objective completed successfully.
84. ATE-AM logs tactical field experiment objective successfully completed in the ATE event log.

Failure Extensions
1a. If the ATE is not executing a tactical field reservation, the ATE-AM increments the ATE commands rejected counter, logs an invalid state for receiving a tactical field experiment command message to both the ATE event log and the ATE history log, and terminates the use case.
2a. If the creation of the tactical field experiment objective fails, the ATE-AM logs an objective creation error message to both the ATE event log and the ATE history log and terminates the use case.
3a. If the tactical field experiment objective just-in-time criteria is invalid, the ATE-EM logs an invalid tactical field experiment just-in-time criteria message to both the ATE event log and the ATE history log, and terminates the use case.

Validate Tactical Field Reservation Objective Use

Goal:
To validate a tactical field reservation objective.

Brief:
The tactical field reservation objective is created from the parameters in the tactical field reservation command. Allowing the objective to validate itself supports a common interface for validating all objective types.

Scope:
ATE

Level:
Subfunction

Primary User:
ATE-AM

Triggers:
ATE-AM creates a tactical field reservation objective.

Preconditions:
The tactical field reservation objective has been created.

Success End Condition:
The tactical field reservation objective is validated.

Minimum Failed End Condition:
The appropriate messages are logged in the ATE event log and ATE history log.

Main Success Scenario
85. Validate the "begin time" and the "end time".
86. Validate the attitude.
87. Validate the execute begin script flag.
88. Validate validates the end action.

Nominal Extensions
3a. If the execute begin script flag is true, then validate the begin script ID.
4a. If the end action is execute a script, then validate the end script id.

Failure Extensions
1a. If the begin time or end time is invalid, log invalid reservation time message to both the ATE event log and the ATE history log, and terminate the use case.
2a. If the attitude is invalid, log invalid reservation time message to both the ATE event log and the ATE history log, and terminate the use case.
3b. If the execute begin script flag is true and the begin script ID is invalid, log invalid begin script ID message to both the ATE event log and the ATE history log, and terminate the use case.
4b. If the end action is invalid, log invalid end action message to both the ATE event log and the ATE history log, and terminate the use case.
4c. If the end action is execute a script and the end script ID is invalid, log invalid end script ID message to both the ATE event log and the ATE history log, and terminate the use case.

The SCL system 40 was developed by the Applicant of the present invention as an embedded software system to operate a U.S. Navy satellite for a predetermined period of time without ground intervention. The SCL system provides an automation engine to execute sequences of commands and allows to have logic on-board to react to changes in data. The SCL enables one to build a command and control system for ground and/or space applications. The behavior of the system is specified using a full-featured scripting language, where it is possible to control and respond to events in a rules- or time-based manner. Such applications can monitor thousands of rapidly changing sensors and direct hundreds of actuators based on complex logic. The SCL system is designed as a collection of reusable components that are integrated through a powerful custom database and as a result the SCL operates wherever a control system is needed.

The OOCE system 42 of the present invention uses this underlying SCL engine to execute the series of scripts (sequences) to exercise all the payload interfaces to perform a rapid checkout of these devices and ensure that they are functioning correctly. In this sense, the OOCE is a structured methodology used to collect information (checkout logic) on the ground and generate the SCL scripts which are executed on-board the satellite shortly after it reaches the orbit. The OOCE system 42 is a set of cooperating SCL scripts and rules that provide a key enabling technology for autonomously commissioning the spacecraft, e.g. functional checkout, within its first day on orbit. The OOCE is designed to fulfill the following requirements:

Top Level Requirement: Demonstrate autonomous on-orbit operations with machine to machine interfaces [Tactical Space Capabilities]

Sub-Requirement: Demonstrates autonomous functional checkout of the space vehicle.

The OOCE system 42 uses the spacecraft control language (SCL) which is used for ground-based Assembly-Integration and Test (AI&T) system, ground-based operations, flight-based autonomous operations, and an orbit test and checkout. The OOCE software 42 is loaded and started with the Autonomy Flight Software prior to the spacecraft launch, shortly after the flight software is booted.

Functional Testing

The OOCE is designed to complete all functional tests within 1 orbit (goal) with a threshold of 1 day. The Functional tests verify that critical spacecraft subsystems can safely support initial operation of payload subsystems. The Functional tests also verify the function of payload subsystems. Functional test areas include power on, command path access, state of health reporting, and verification of expected state and configuration. Each functional test returns a summary of the current state of the device or subsystem. The OOCE is built upon a reusable set of scripts (SCL scripts stored in the SCL/OOCE database 88, 93 shown in FIG. 2) which are also shared with the ATE system 44 and the ground operations for day-to-day tasking as will be presented in the following paragraphs. These configuration SCL scripts are used to command the low level interfaces using a specified test "pattern". This pattern has a "pre-condition check", "send command", "wait x time", "check telemetry" verifiers to verify the correct execution of the command. If not, then corrective measures are taken and the error is logged.

The functional testing:
Starts as separation.
Starts out as a "listen only" test sequence during solar array deployment and the Attitude Determination and Control System (ADCS) safemode sequence to determine that the active S/C subsystems are in the expected states and the expected state transitions are occurring.
When the spacecraft has reached Sun Track, command path, imager, RoadRunner on-board Processing Experiment (ROPE), and Common Data Link (CDL) tests are initiated to complete functional testing.

Spacecraft Performance Testing

Performance tests are designed to be completed within 1 day (with a threshold of 3 days). The Performance testing includes verification of operating mode changes and state of health telemetry for spacecraft subsystems and payloads. Each performance test returns a summary of the current state of the device or subsystem.

The performance testing:
Includes more aggressive commanding and data analysis to verify subsystem/payload performance.
Schedules an autonomous image capture of a predetermined target location.
Schedules an autonomous CDL ground contact at a predetermined ground location.

Data Logging

The OOCE flight software 42 maintains the following logs in the Integrated Avionics Unit (IAU) memory: test history log, test event log, and diagnostics log. Each log may be commanded to be downlinked by the autonomy flight software 70, specifically through the Log manager 102 shown in FIG. 2.

The OOCE system demonstrates a Rapid Response capability by developing a flight knowledge base 160 shown in FIG. 2 to perform automated checkout of a spacecraft immediately after launch. The OOCE is expected to reduce early orbit checkout period to 1-3 days. In prior art systems, the on orbit checkout of a spacecraft may last 30-90 days. Therefore, the OOCE is a key technology needed to reduce time latency between launch and operational use of satellite assets.

The OOCE Framework captures functional and performance test sequences and export the OOCE commands, utilities and rules. Each test is broken down into a Test Pattern, a Test Step Pattern, and a Command Pattern.

As presented in FIG. 1, the OOCE system includes a methodology and set of tools to collect behavioral knowledge for avionics units and sensors. These behaviors are collected into a structured database tool in an English-like manner. The OOCE include tools to export this data and auto-generate SCL scripts for all commands in the system. The auto-generated SCL scripts wrap all commands with the command pattern which allows fault detection isolation and recovery to be built into the on-board system in a structured and predictable manner.

Each Test Pattern is broken down as follows:
OOCE test Script (per test)
Test Recovery Script (per test, if required)
Each Test is further broken down into Test Step Patterns:
Test Step Script (per test step)
Test Step Recover Script (as required)
Each Test Step is further broken down into Command Patterns:
Command Script
Pre-, execution, and post verification scripts.

This approach leads to a modular, auto-generated set of scripts which are the baseline for flight, and integrated with the ground's Mission Planning System (to be discussed in further paragraphs). All commands used for configuring devices or subsystems are wrapped with a script which follows the Command Pattern. This allows these scripts to be used as part of the day-to-day tasking as well as part of the ATE scheduled script capability.

Figure 5:
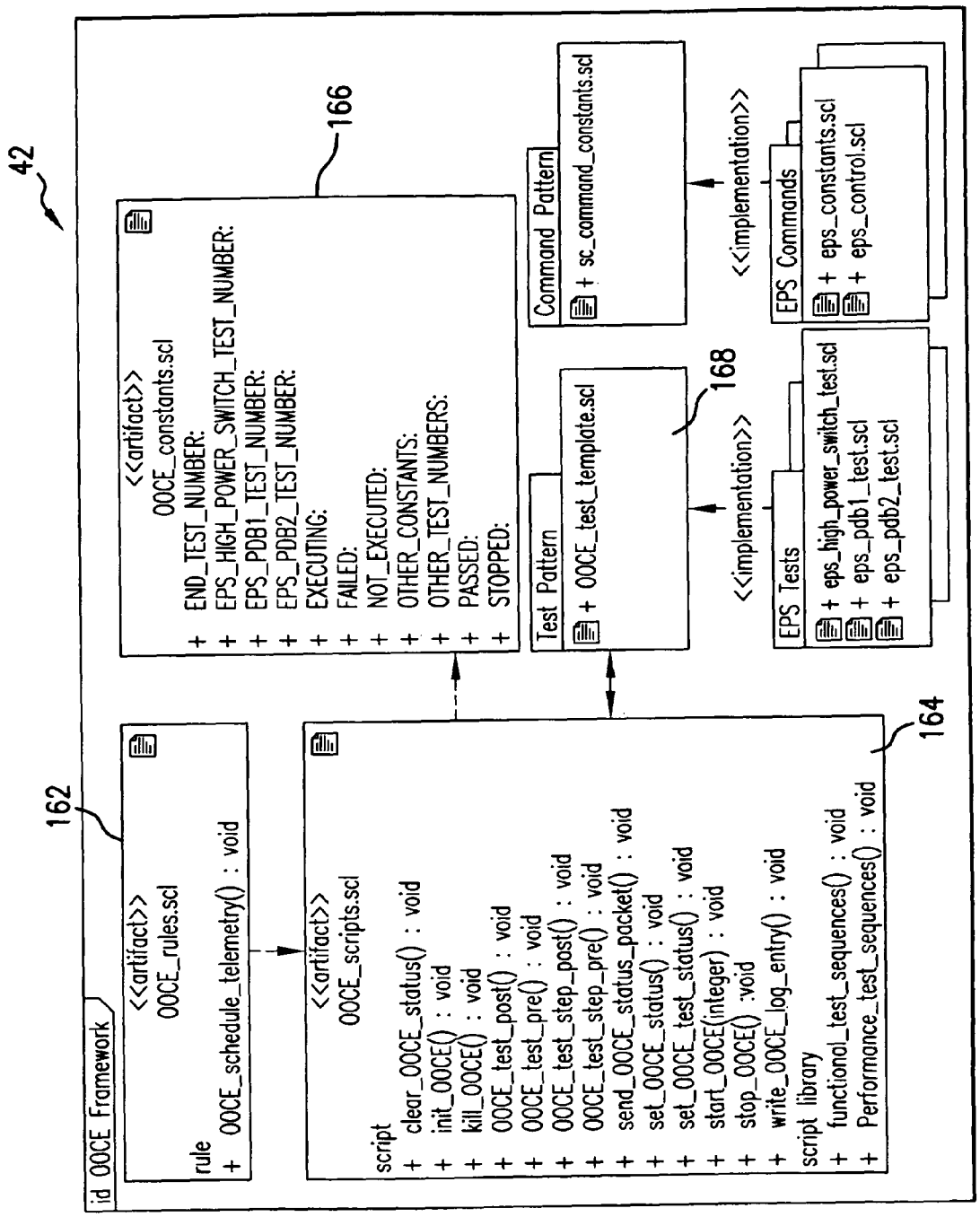
FIG. 5 is a Unified Markup Language (UML) diagram for the OOCE framework.

Specifically, as shown in FIG. 5, presenting the UML (Unified Markup Language) diagram of the OOCE Framework, the latter includes:
OOCE Rules (ooce_rules.scl) 162 for
Periodic telemetry scheduling
Separation event monitor (oc_separation_monitor)
Sun track event ADCS mode monitor (oc_sun_track_monitor);
OOCE Scripts (ooce_scripts.scl) 164 for
OOCE commands
Functional test sequences
Performance test sequences
Utilities; and
Constants (ooce_constants.scl) 166.

Not shown in FIG. 5, is also portion of the OOCE Framework, which includes
Telemetry Packets and Database Records for
OOCE initialization and execution status
Current test and test step
Tests "passed" and "failed" counters
The OOCE rule ooce_schedule_telemetry of the OOCE Rules 162

Schedules the send_ooce-status-packet script based on OOCE_TEST_STATUS
Uses OOCE_ACTIVE_TLM_RATE while OOCE is executing
Uses OOCE_INACTIE_TLM_RATE after OOCE has completed
Stops the send_ooce_status_packet script if OOCE is stopped or killed.
The rule oc_separation_monitor of the OOCE Rules 162 is for
Refer to separation sequence.
The rule oc_sun_track_monitor of the OOCE Rules 162 is for
Refer to sun track sequence.
In the OOCE Command Scripts 164:
the script init_ooce
Initializes OOCE prior to being started;
the script start_ooce
Establishes test Parameters: a_startig_test_set and
Starts OOCE testing after it has been initialized;
the script stop_ooce
Cancels OOCE test currently executing and discontinues further testing
the script clear_ooce_status
Resets the current status summary of OOCE functional and performance testing;
the script set_ooce_status
Establishes test Parameters: a_ooce_test_status, a_ooce_current_test, a_ooce_current_test_step, a_ooce_test_pass_cnt, a_ooce_test_fail_cnt; and
Configures OOCE test status indication;
the script set_ooce_test_status
Establishes test Parameters: a_test_number, a_test_status, a_test_step_cnt, a_test_step_pass_cnt, a_test_step_fail_cnt; and
Configures functional and performance test completion status indication;
the script kill_ooce
Deletes OOCE logs and stop sending OOCE Status telemetry packet.

For the OOCE functional test, the sequence scripts are used which:
Define the sequence of tests to be executed for each logical grouping of functional tests, e.g. for each subsystem; and
Include conditional logic (if necessary) to skip tests depending on the results from previous tests.
For example, the script eps_functional_tests
Performs EPS subsystem functional tests
For the OOCE performance test, the sequence scripts are developed which:
Define the sequence of tests to be executed for each logical grouping of performance tests, e.g. for each subsystem; and
Include conditional logic (if necessary) to skip tests depending on the results from previous tests.
The OOCE Utility Scripts include:
script send_ooce_status_packet for
Periodic script to generate the OOCE status packet;
script ooce_test_pre which
Establishes test Parameters: a_test_number, a_test_step_cnt, a_test_step_pass_cnt, a_test_step_fail_cnt; and
Performs pre-test actions of initializing db records and logging the test start;

script ooce_test_post which
Establishes test Parameters: a_test_status, a_test_step_cnt, a_test_step_pass_cnt, a_test_step-fail_cnt; and
Performs post-test actions to update db records and log the test result;
script ooce_test_step_pre which
Establishes test Parameters: a_test_step_cnt; and
Performs pre-test step actions to update db records and log the test step start;
script ooce_test_step_post which
Establishes test Parameters: a_test_status, a_reason, a_test_step_pass_cnt, a_test_step_fail_cnt,
Performs post-test step actions to update db records and log the test step result, and
Sends a test step fail telemetry packet if the test step fails; and
script write_ooce_log_entry which
establishes test Parameters: a_ooce_log_entry, a_ooce_log; and
Writes entries into the ooce_history, ooce_event, and ooce_diagnostic logs.

In FIG. 5, a Test Pattern 168 may include
OOCE Test Script (per test) which:
Uses no parameters or returned value
Verifies that the test is not already executing
Schedules recovery scripts or inserts relative time commands in a queue if necessary
Executes OOCE pre and post test scripts
Executes OOCE pre and post test step scripts
Executes test steps;
  Test Recovery Script (per test, if required) which:
Uses no parameters or returned value
Performs recovery actions if the test is aborted or does not complete
Can use test step counters and/or telemetry values to determine actions;
  Test Constants (per subsystem) 166; and
  OOCE Telemetry Database Records which include
Test status and test step counters.
A Test Step Pattern (not shown in FIG. 5) may include
Test Step Script (1 or more test steps) which
Is independent of OOCE (except for PASSED and FAILED constants 166)
Can be executed from other test executives;
Parameters which include
  a_test_status returns PASSED or FAILED
  a_reason returns a string explaining why the test step failed
  Passed by reference; and
Performs an atomic test action, e.g. it
  Verifies a telemetry value against a single limit
  Verifies a telemetry value against upper and lower limits
  Sends 1 or more commands and verifies successful execution.
The Test Step Pattern further includes
Test Step Recovery Script (per test step script, if required) which
Uses no parameters or returned value; and
Performs recovery actions if the test step is aborted or does not complete.
A Command Pattern 170 may include:
Command Sequence Script which
Uses input parameters passed through to commands; and
Verifies command sequence constraints
Schedules recovery script if necessary
Calls the constituent command send scripts
Calls command completion verification scripts
Verifies command sequence completion condition
Cancels the recovery script if necessary;
  Send Script (e.g. send_qm_set_exec_q a_qnum) which
Uses input parameters which are the command parameters; and
Verifies command constraints
Constructs and sends the command (e.g. QM_SET_EXEC_Q)
Verifies command execution
Returns CMD_SUCCESS if the command was sent and execution verified
Else returns CMD_FAIL_PRECONDITION or CMD_FAILURE;
  Command Completion Verification Script (e.g. qm_set_exec_q_post a_qnum, a_timelimit) which
Uses input parameters, e.g. the command parameters and a timelimit
Verifies that the command execution completed successfully
Returns CMD_SUCCESS if all post-conditions are met
Else returns CMD_FAILSURE;
  Command Constants (by subsystem); and
  Command Packet Database Records (if parameterized) which include
Command packet records (rr_cmds_DCOM.sml)
Constituent command packet records (rr_cmds_DB.sml).

The Command and Telemetry databases have been updated with knowledge gained during development of the OOCE scripts. OOCE test scripts were developed and run against brassboard and flight hardware. The scripts were also imported into the Autonomy Flight Software (AFSW) framework providing a reuse of trusted logic from flight to ground and ground to flight. The Broadreach flight software was tightly coupled to the flight software database version and a recompilation of the OOCE and ATE database, scripts and rules was performed.

Figure 6:
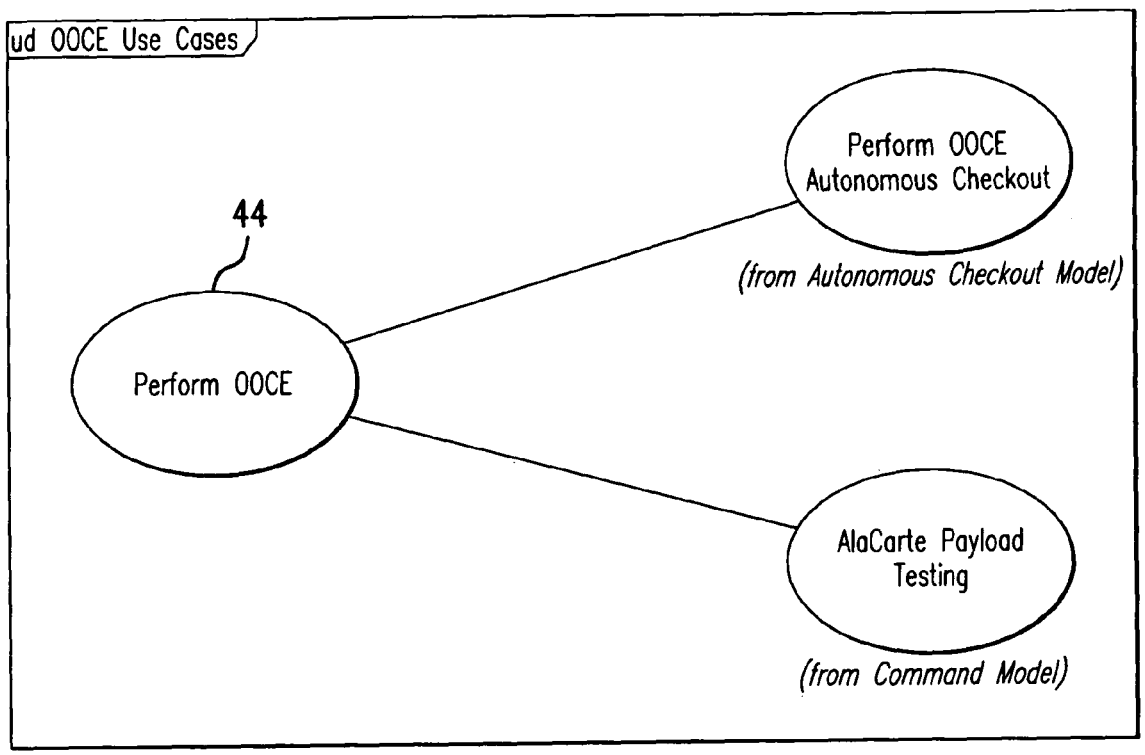
FIG. 6 is a schematic representation of the OOCE modes of operation.
Figure 7:
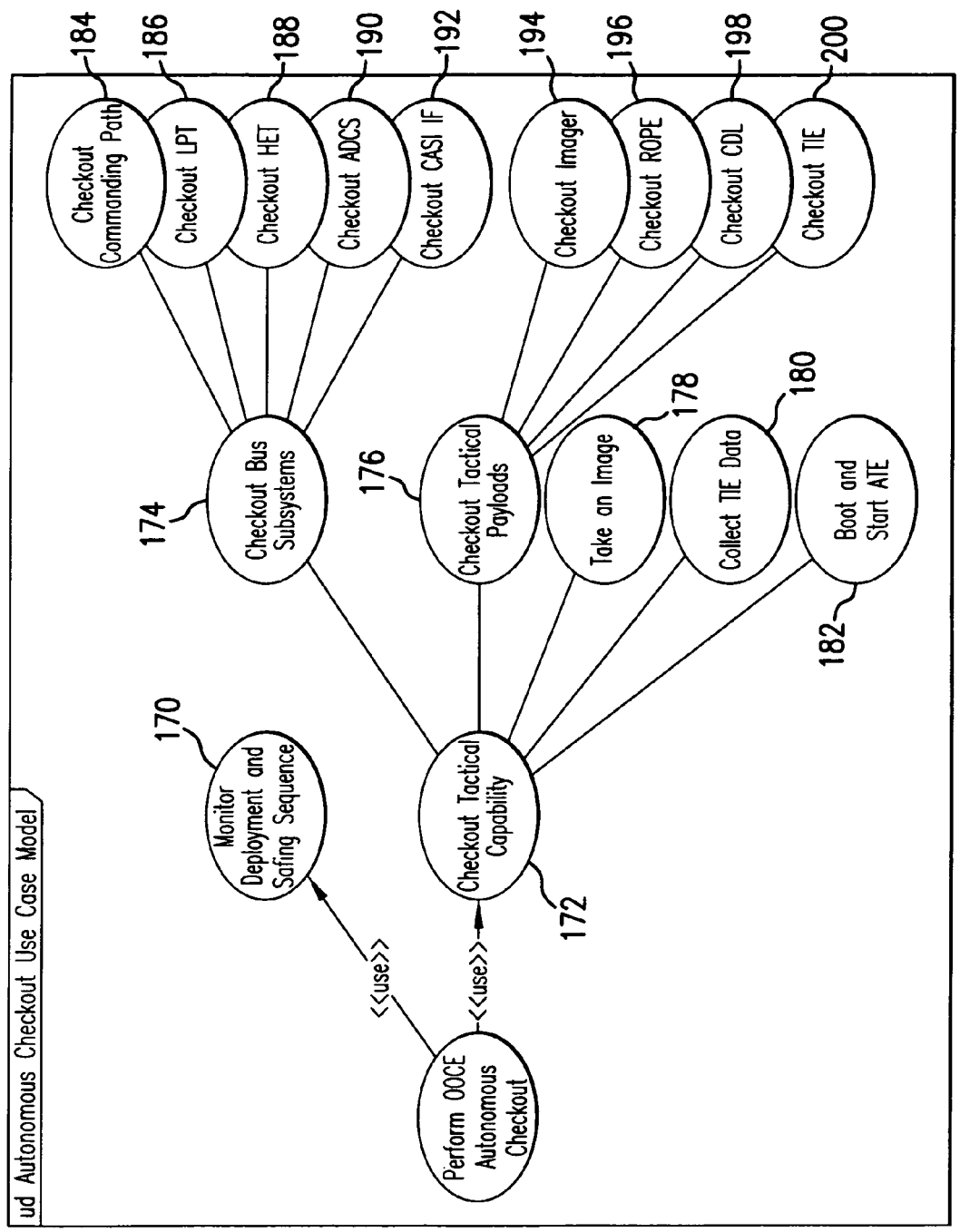
FIG. 7 is a schematic representation of the "Autonomous Checkout" mode of operation of the OOCE system.

Referring to FIG. 6, the OOCE system 42 may operate in two modes, e.g. in Autonomous Checkout Mode and in Ala Carte Payload Testing Mode. As shown in FIG. 7, in the autonomous test mode the OOCE system 42 may monitor deployment and safing sequence, block 170, and performs the checkout tactical capabilities in block 172, as well as performs some other checkouts, as needed. In order to checkout the tactical capability of the spacecraft, the OOCE system checks the bus subsystems in block 174, performs the checkout of the tactical payloads in block 176, takes an image in block 178, and collects (Target Indicator Experiment) TIE data in block 180. The TIA uses a wide band sensor to gather radar, radio and handheld communication signals. The objective of the TIE is to locate targets based on RF signatures and use a total of 11 antennas.

A further step of the Autonomous Test mode is performed in block 182 "Boot and Start ATE".

In order to checkout bus subsystems in block 174, the OOCE system provides checkout of commanding pass in block 184. The OOCE system also performs checkout of LPT (Low Power Transceiver) in block 186 and further conducts the checkout of HTE (Hall Effect Thruster) in block 188. Further, ADCS (Attitude Determination and Control System) checkout in block 190, and checkout CASI IF in block 192.

In order to provide checkout of tactical payloads in block 176, the OOCE system performs the operation of imager checkout in block 194, ROPE (RoadRunner On-Board Processing Experiment) checkout in block 196, CDL (Common Data Link) checkout in block 198, and TIE checkout in block 200.

Figure 8:
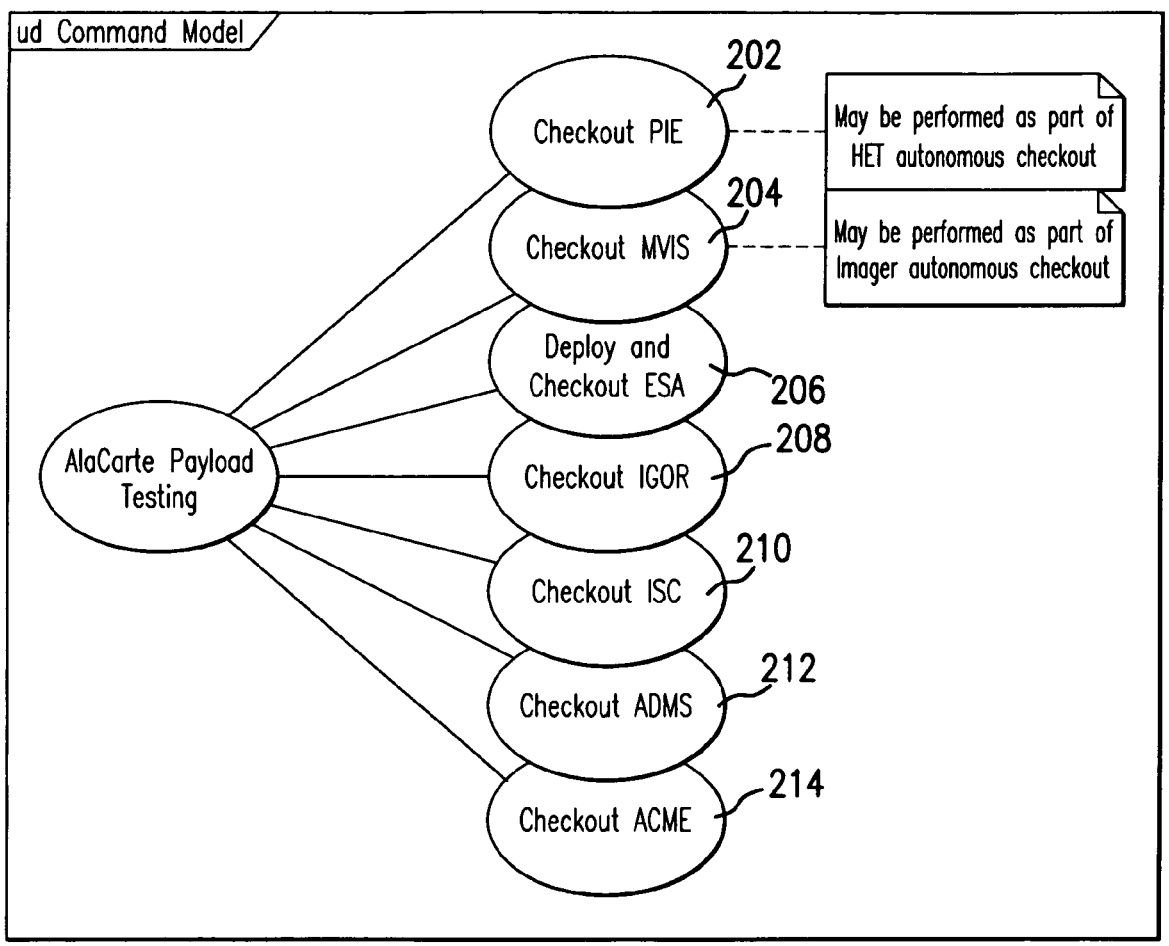
FIG. 8 is a schematic representation of the "Ala Carte" test mode of operation of the OOCE system.

The Ala Carte test block diagram is presented in FIG. 8. Ala Carte payload testing mode may be performed for example by checkout PIE (Positive Ion Emitter) in block 202 which also may be performed as a part of the HET autonomous checkout. Further the OOCE system 42 performs checkout of the MVIS (Miniaturized Vibration Isolation System) in block 204 which may be performed as a part of the Imager Autonomous Checkout. Further the OOCE system performs the operation of deployment and checks out ESA (Experimental Solar Array). In block 208 the OOCE system 42 performs IGOR (Integrated GPS On-Orbit Receiver) checkout. In block 210 the testing is performed to checkout the Inter Stellar Compass (ISC). In block 212 the Absolute Density Mass Spectrometer (ADMS) is checked out, and in the block 214 the Anemometer Cross-Track Measurement Experiment (ACME) is checked out.

Figure 9:
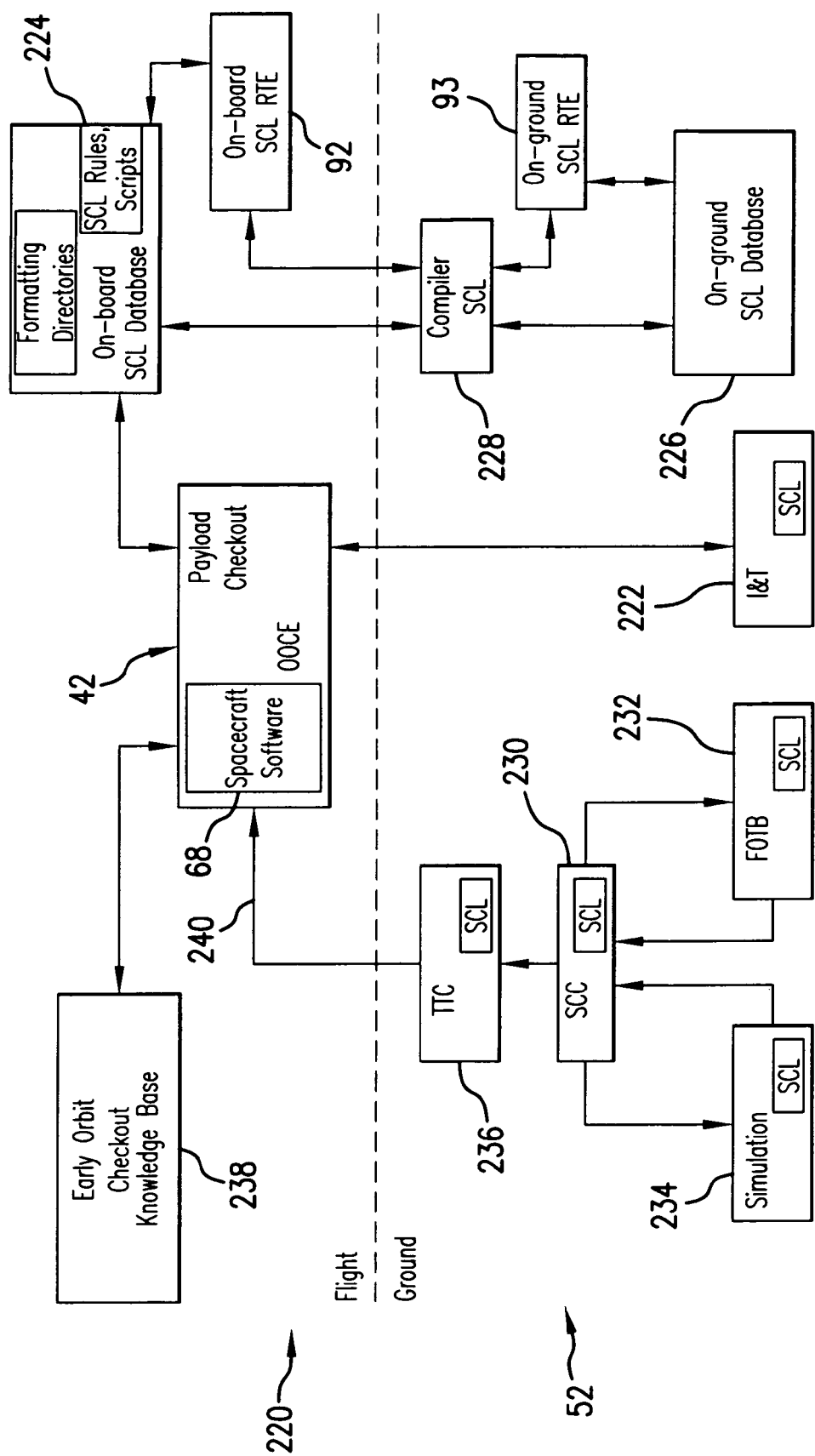
FIG. 9 is a schematic representation of the block-diagram of the OOCE system.

Referring to FIG. 9, representing the basic principles underlying the OOCE system 42, the on-board Autonomous Operations System 14 is a part of the integrated command-and-control solution of the ground segment 52 and the flight (on-board) segment 220. The SCL system underlying the architecture and operation of the Autonomous Operations System 14 is based on the unification of ground and space components, 52, 220, respectively, within the same control system. The SCL system provides a flight control system with an on-board SCL database 224, combined with closed loop control allowing scripts and rules to have visibility into on-board data samples and to autonomously react to changing state data. The SCL scripts and rules were developed and tested in early phases of Integration and Test (I&T) 222 and stored in repositories for use throughout the life of the mission. The resulting high-level observing sequences (scripts) are being built upon underlying configuration-managed scripts and rules that have been tested and verified at various development stages.

FIG. 9 reflects the unique aspect of the SCL system which is its end-to-end, autonomous system architecture that encompasses both flight and ground environments. The SCL system enables execution of autonomous operations from either on-board the satellite, from the ground, or in a coordinated manner from both locations. Among the key elements of the system are the SCL knowledge database 238, the SCL Real-Time Engine (RTE) 92, and the SCL compiler 228. The on-board SCL database 224 provides visibility into the current state of each on-board sensor or system, maintains the scripts and rules that define the operational logic for the control of the satellite elements, and maintains the formatting directives for generating real-time commands. These database items provide the basis for taking autonomous actions via the SCL RTE 92, the primary application running the flight-software environment. A complimentary version of the SCL operations database 226 is retained on the ground to support both autonomous ground-based and operator-initiated activities through on-ground SCL RTE 93. Creation of the SCL operational database, both flight and ground, is achieved quickly through the SCL compiler 228 which creates the data files used by the SCL components at execution.

SCL rules may be associated with event triggers. When an event occurs, any rules associated with the event are executed by the SCL expert system. Rules in turn may execute SCL scripts. A rule is a statement that is compiled as an individual SCL code block. A script is a block of commands and SCL statements that are somewhat similar to a typical store-command list.

A Satellite Control Center (SCC) 230 provides the capabilities to develop and transmit files of activities to the satellite and the ground stations, monitor the execution of these activities, to perform maintenance and fault management of the associated systems, and to perform preliminary data processing and storage of all information received from the satellite and ground stations. The SCC 230 also provides the capability to command the satellite and ground stations directly through a consistent suite of graphical screens that are accessible from multiple operator stations within the SCC. The SCC 230 controls the flight operations test bed (FOTB) 232 and a simulator 234. Both FOTB and simulator units provide the necessary capabilities to simulate, to the degree necessary, actions and responses of the spacecraft to support planning and execution of on-orbit activities, as well anomaly identification and resolution.

The SCC unit 230 provides data to the Telemetry Tracking and Command system 236 (TTC) which provides the function of monitoring and commanding the spacecraft and ground. For the ground stations, the TTC function supports a series of graphical user interface (GUI) screens that displays the current status of the ground stations and their progress in terms of executing the timeline of activities provided via a pass-level schedule. For the spacecraft, the TTC 236 provides command packet and telemetry data management capabilities required to monitor the spacecrafts state and issue real-time commands to the spacecraft.

The TTC function also provides the capability to develop absolute- and relative-time based autonomous procedures for upload and execution by the spacecraft. The TTC function also supports the capability to display the satellite's current orbit and attitude configuration.

As further shown in FIG. 9, the SCL is being used on the satellite, on the I&T test set 222, in the SCC 230, as well as in TTC 236. Despite the multiple hardware architectures, engineering knowledge is successfully being transitioned from one phase of development to another in an efficient flow to result in the checkout knowledge base 238 which is used for the OOCE operation and which includes mostly scripts written in the SCL grammar, which are executed by the SCL RTE 92.

The system 10 of the present invention, e.g. RoadRunner program, had several variations of the ground segment 52, all based on a common core set of software. The spacecraft has 2 communications links, an S-band link 240 for primary command and telemetry link, and an X-band (CDL) Common Data Link (274 Mbit) downlink for payload data. The primary command and telemetry link 240 is a Space Ground Link System (SGLS) compatible link that is used for RF testing and operations. It may be replaced with a serial (umbilical) interface in the Integration and Test environment. The CDL (Common Data Link) is an AFRL experimental communication system. The objective is to use the CDL payload in combination with a ground-based CDL terminals. This high-performance system permits downlink data rates of up to 274 Mbit/s. This link consists of a secure, jam-resistant uplink operating at 200 Kbit/s and a down link that can operate at various data rates. CDL is currently also being used on UAVs (Unmanned Aerial Vehicle) including Global Hawk and Predator. The AI&T system contains an umbilical interface to the CDL to allow testing in a lab environment.

The SCL product is used for ground segment command and control, which is the same software used on the spacecraft for the on-board Autonomy Operations system 14. The automation capabilities of SCL are used to facilitate in automation of the day-to-day testing for the test conductors. This also allowed efficiencies in the testing of flight software scripts for the OOCE 42 and ATE 44. The scripts and rules for the flight system were verified on the ground system and further included is the flight software. Simulations were written in SCL scripts, and rules were generated to exercise the flight software system using a desktop version of SCL.

Figure 10:
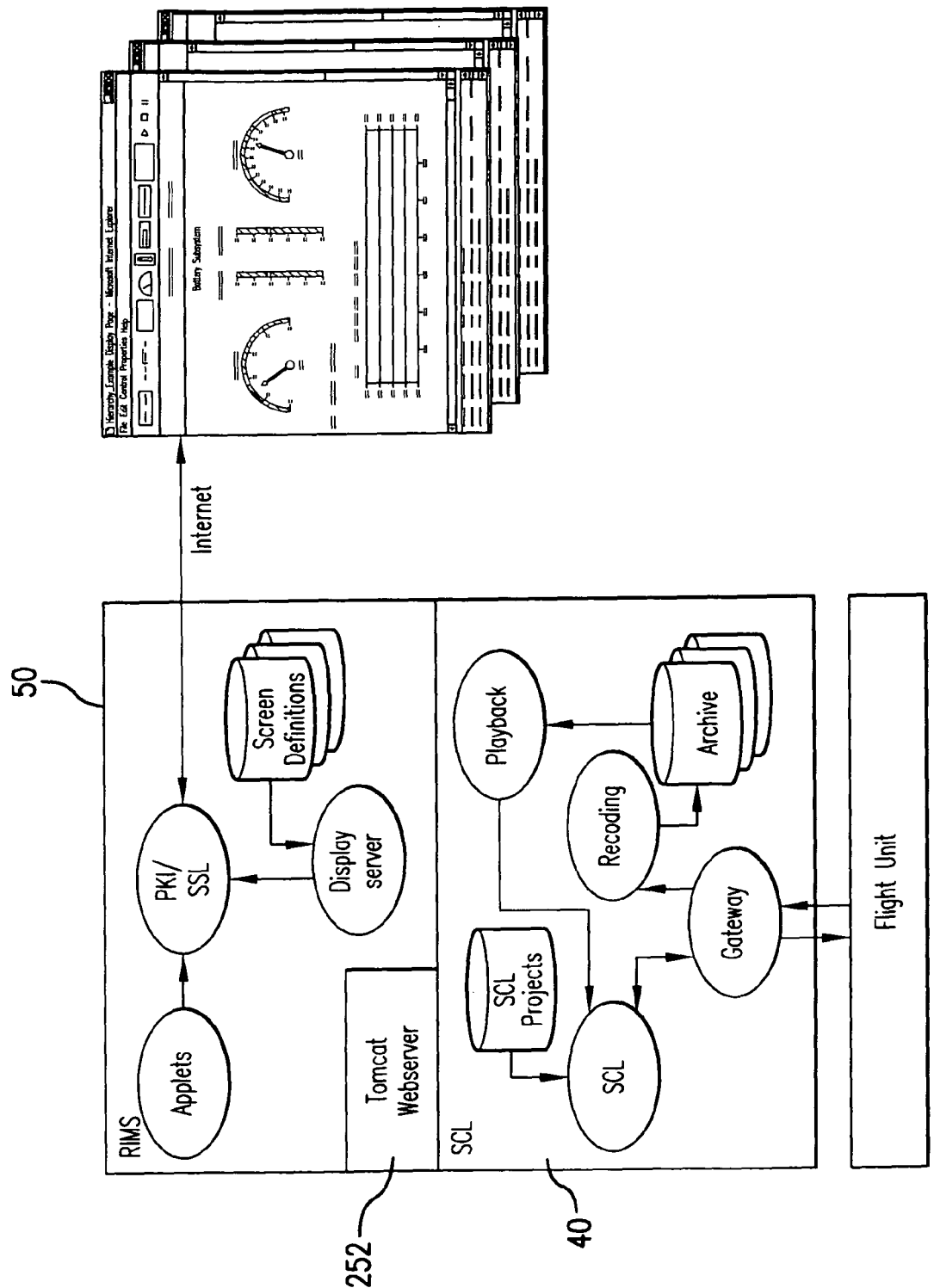
FIG. 10 is a schematic representation of the SCL/RIMS architecture underlying the web-based command and control system of the present invention.

Referring to FIG. 10, a Remote Intelligent Monitor System (RIMS) 50 is used to provide a near real-time interface for all phases of the mission. The RIMS tool is layered on top of SCL system 40 and the Tomcat Java Webserver 252. RIMS supports ~50 concurrent users per Web-server. For security concerns, RIMS uses 128 bit encryption and standard Internet browsers for real-time displays. Although RIMS 50 and SCL 40 are available on both Windows and Linux environments, the Windows Operating System may be chosen as an example.

On-ground operation systems e.g. RDT&E Support Complex (RSC) at Kirtland and the Remote Tactical Terminal (RTT) at the China Lake CDL site were developed to be used in conjunction with the system of the present invention. Both systems needed to collate and collate payload data and feed the resulting files to the Roadrunner Data Center for long-term archiving. The RSC system was segmented into 2 systems to satisfy red/black data separation requirements for NSA security concerns. The data acquisition computer was designed to capture the low rate telemetry (SGLS data, modify the format and send it on to the RIMS Server to be decommutated, archived and distributed.) The two RSC machines are connected on a private, point-to-point fiber optic network. The RIMS machine has an additional internet card to serve the Base LAN users to allow them to login and monitor and control the satellite.

Figure 11A:
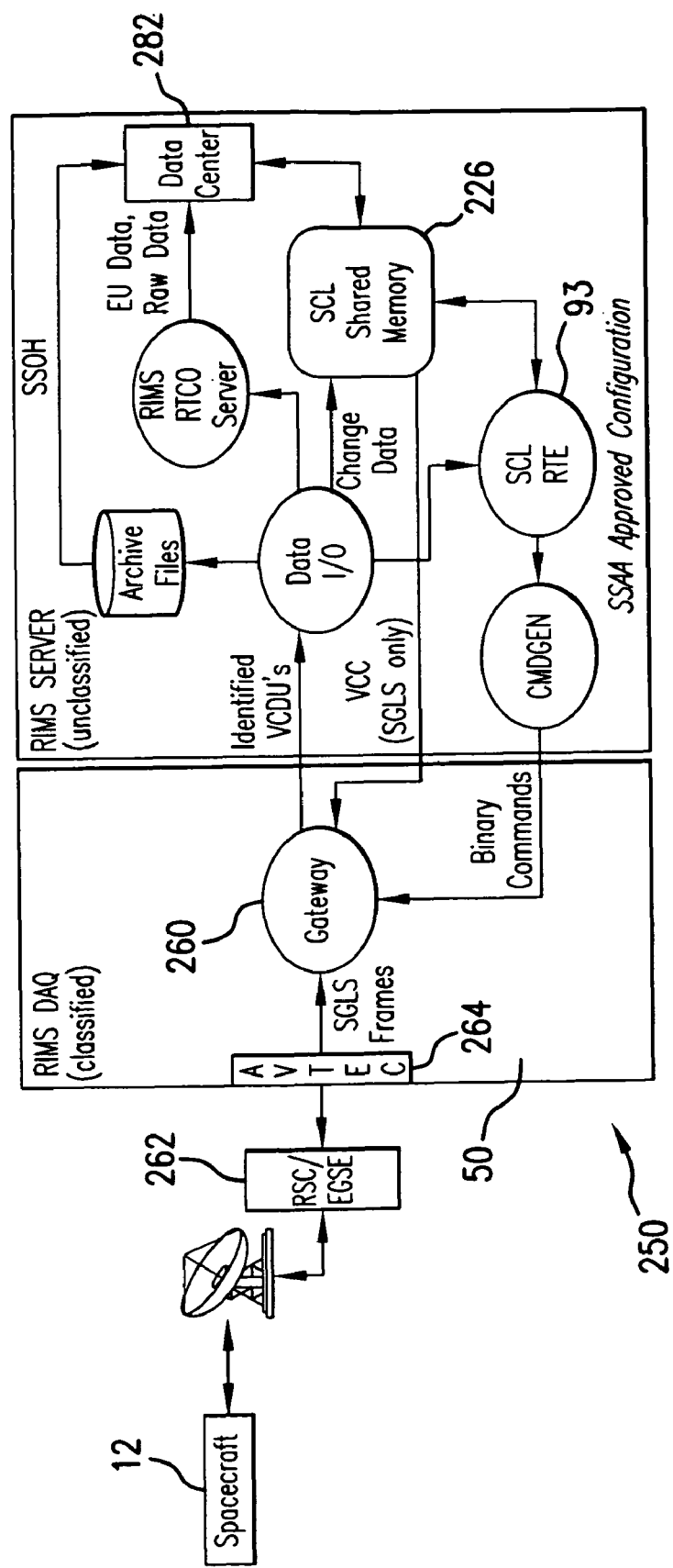
FIGS. 11A and 11B are schematic representations, of the commanding data flow.
Figure 11B:
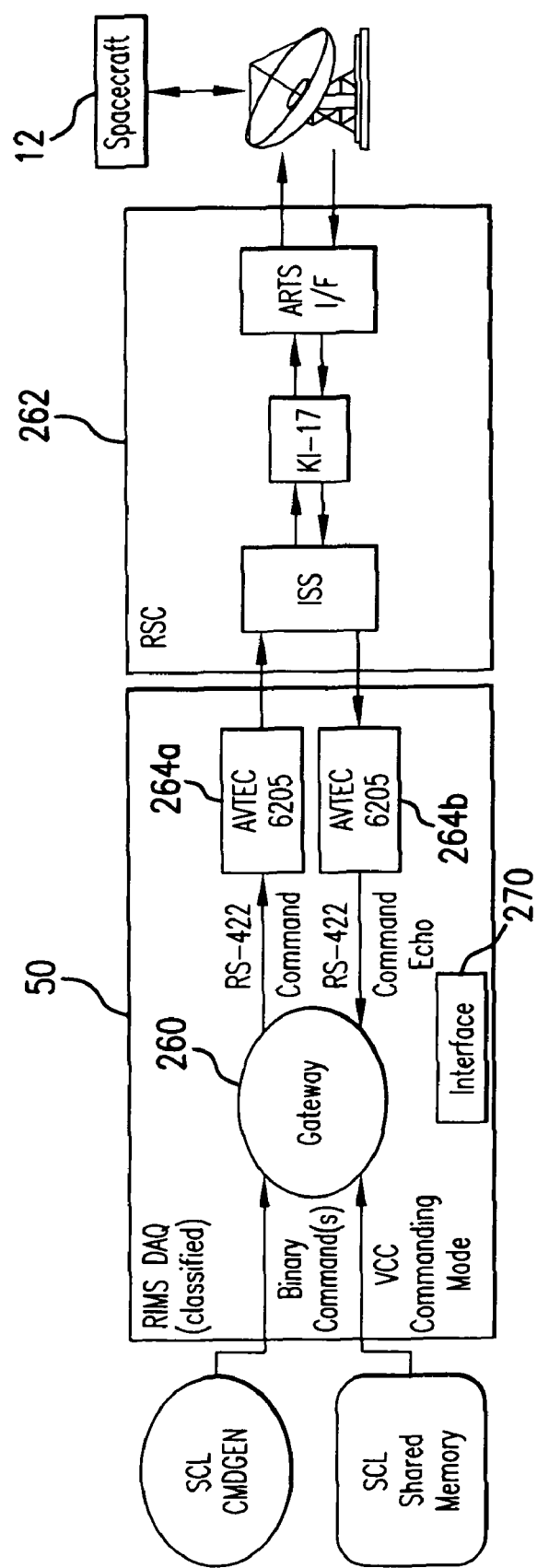
Figure 12:
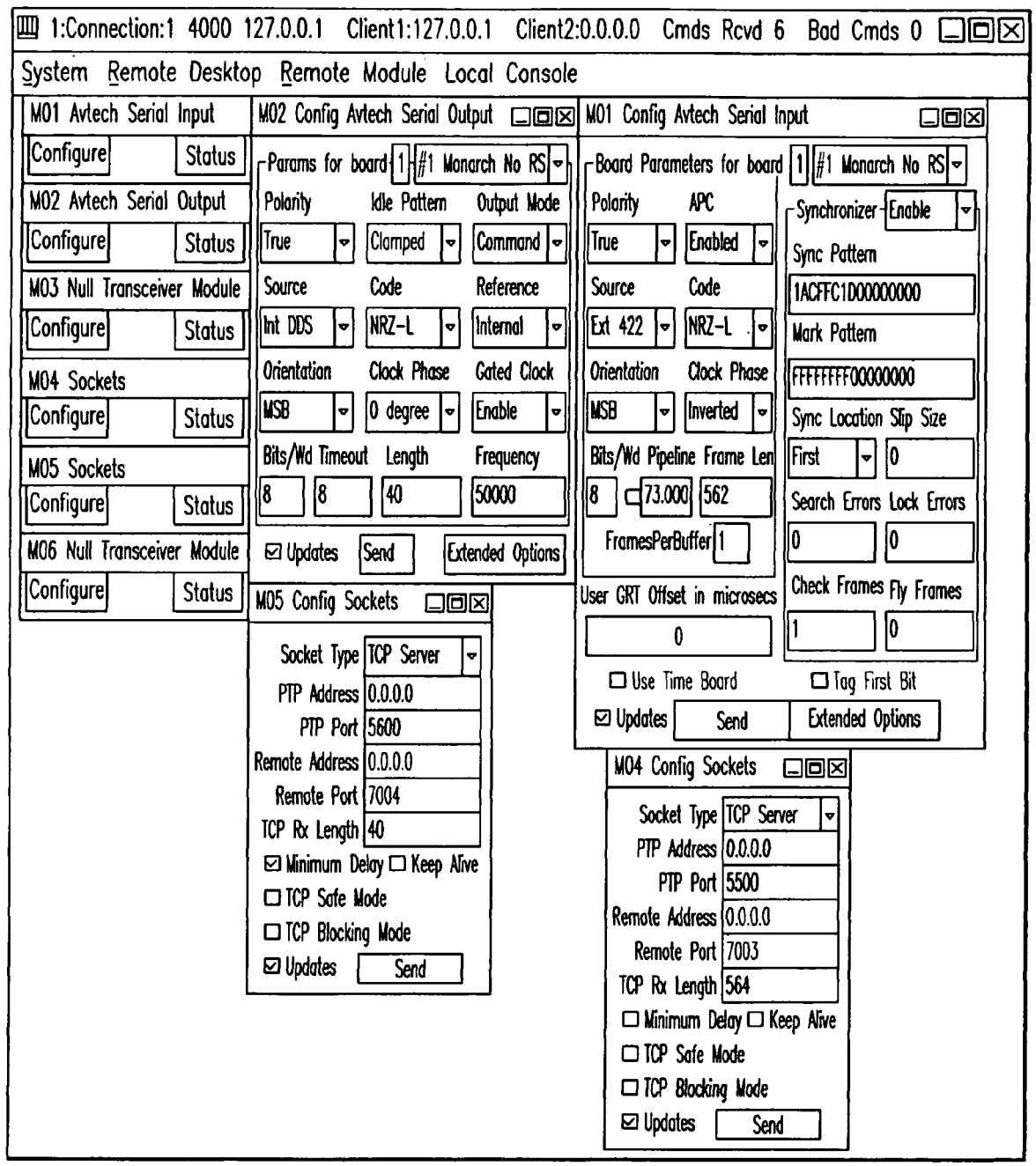
FIG. 12 represents AVTEC desktop socket interface configuration.

FIG. 11A illustrates the RSC Ground Software Dataflow and FIG. 11B illustrates the Mission Operations Center (MOC) Data flow.

The RIMS is a part of the SGLS (Space-Ground Link System) on the ground segment 52. In the RIMS 50, a Gateway unit 260 controls RS-422 links 264a, b to RSC 262. The Gateway unit 260 also receives SGLS packages from the RSC 262 via the AVTEC unit 264.

The SGLS adds VCC to command packets, breaks SGLS data into 18-byte Code Blocks—64 bits of data, 48 bits of VCC, implements multiple commanding modes: closed, open, pseudo. The SGLS also performs command retransmission for dropped packets (monitors VCC).

The ground segment 52 to accommodate a requirement for a Command Echo test as part of the commanding path verification.

Command Echo is a bit-for-bit compare of the command which echoes at the Encryptor.

The Gateway 260 receives binary commands from SCL Command Generator System (CMD GEN), and VCC (SGLS only) from the SCL Shared Memory unit of the RIMS server.

All SGLS commands with the exception of those destined for the encryptor are defined in a 128 bit format with 64 bits of spacecraft command data and a 48 bit VCC. Based on institutional knowledge at AFRL (Air Force Research Laboratory) and the existing testsets left over from TechSat-21, AVTEC Programmable Telemetry Processor (PTP) boards 264 (264a, b) are chosen as a standard RS-422 command and telemetry interface for AI&T, the RTT, and the RSC systems. All 3 systems use the AVTEC model 6205 PTP cards for telemetry bit-sync and frame-sync. The PTP cards use a Desktop (drive, modules, and GUI). The AVTEC Desktop Socket Interface Configuration, presented in FIG. 14; allows the PTP card to look like a socket connection to other software processes. This greatly simplified the software development and allowed for command and playback utilities to be easily written to exercise the downlink code.

Figure 13:
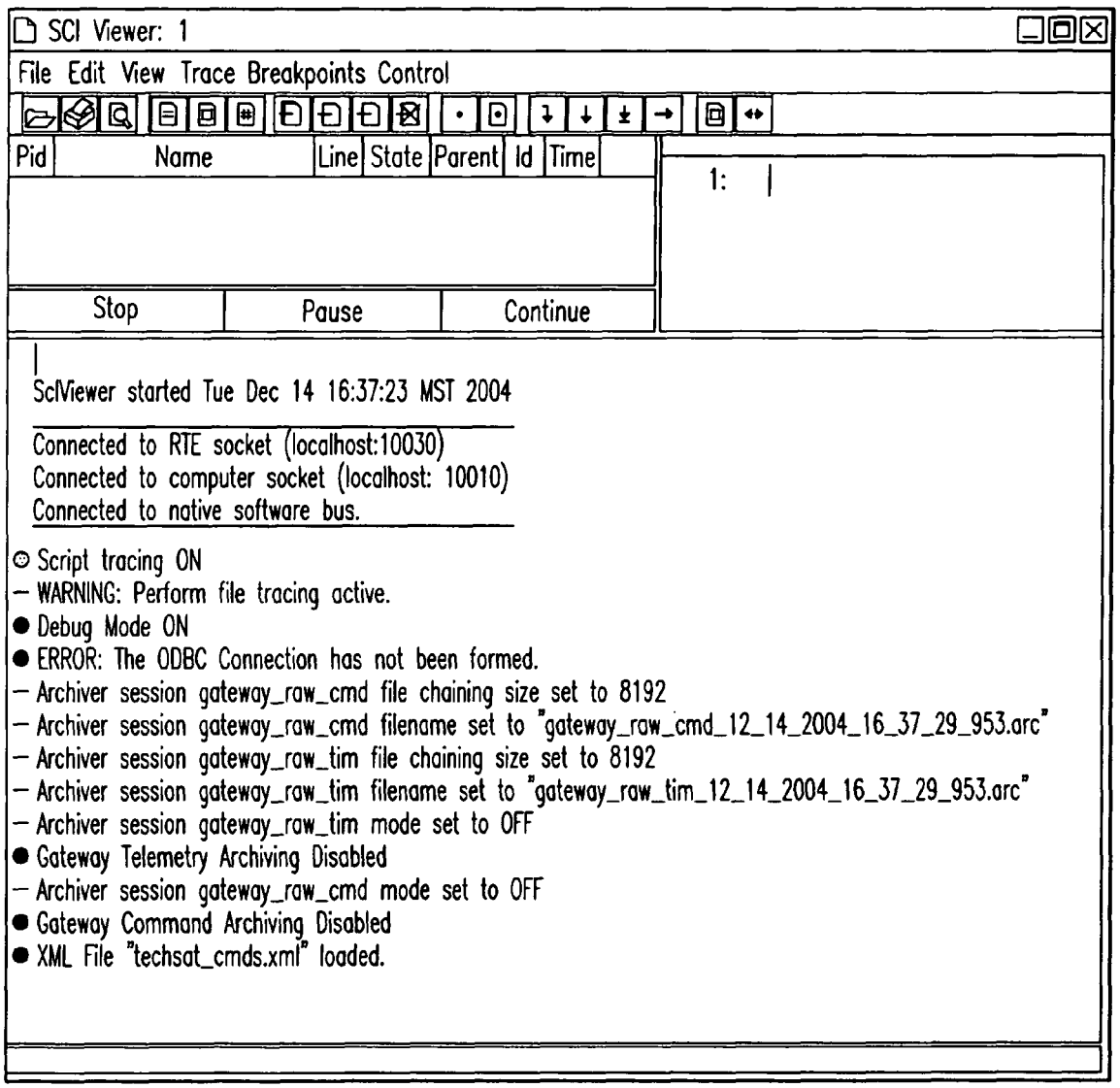
FIG. 13 represents the SCL viewer application.

The SCL/RIMS system 50 includes display interface units 270 to present test conductors and operators with screens for the interaction with the RIMS using the SCL viewer (shown in FIG. 13) or the RIMS screens. The SCLviewer application is used for Integration and Test (I&T) and allows the test conductor to issue SCL command line directives and watch execution of scripts and rules using a debugger-like interface. The SCLviewer is a Java application that is normally run directly on the RIMS server console. The RIMS web applets may be run on any machine on the Base Network. Alternatingly, a separate interface may be used for the Operations support that would only allow operators to issue commands which have had parameters validated and saved. The SCLviewer application, shown in FIG. 13, allows a command or script to be executed without regard for operator privilege or capabilities.

The RoadRunner ground segment 52 is based on a RIMS product offered by Interface & Control Systems, Inc. (ICS), the Applicant of the present Application which has been customized to meet the needs of the project. Mission unique applications were developed to decode and present payload specific data. Since many mission unique application needed to be created, the present Applicant developed a standard framework to base these applications on respective Mission Unique Plug-ins shown in FIG. 14. These frameworks provide a standard behavior and a common set of code that has proven to ease development and maintenance of the applications. Each of the payload specific plug-ins is a software module resident on the dedicated payload interface controller and containing payload-specific data parameters.

Figure 14:
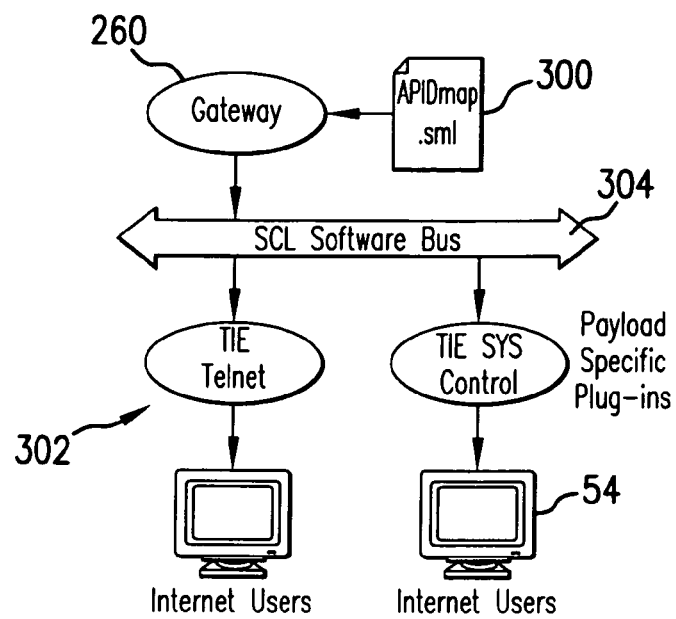
FIG. 14 represents schematically the SCL/RIMS mission unique Plug-ins.

In FIG. 14, an APIDmap.sml 300 provides a required application ID to identify the application that produces the data for the specific pay-load operation. The Gateway 260 downloads pay-load specific data corresponding to the application ID to pay-load specific plug-ins 302 through the SCL Software Bus 304 and interface the pay-load specific data (parameters) with the controllers (Internet users) 54 in a predetermined format, for example, presentable on PC's displays.

Figure 15:
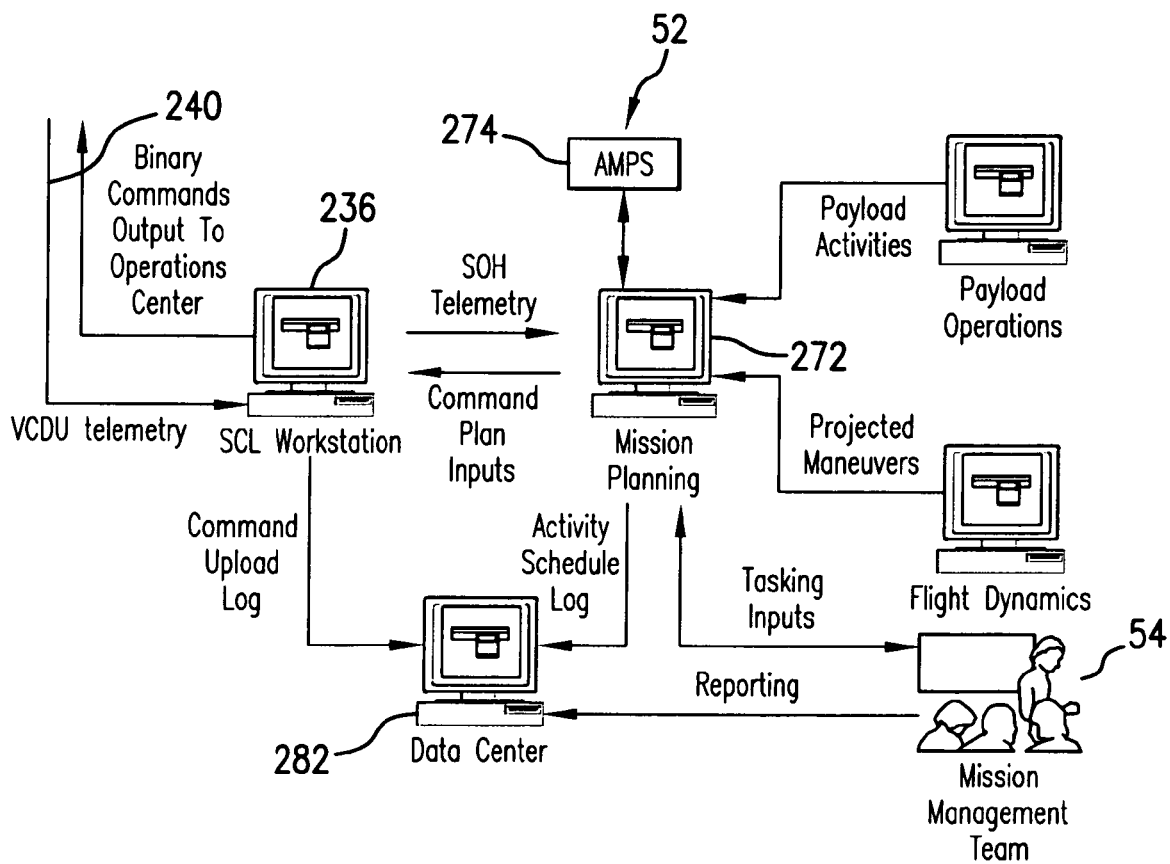
FIG. 15 is a block-diagram of the RCS Mission Operations Center.

Referring again to FIGS. 11A, 11B, and further to FIG. 15, representing a block-diagram of the Mission Operations Center (MOC) of the RSC 262, the SCL Telemetry, Tracking and Command (TT&C) workstation 236 (also shown in FIG. 9), decommutates and processes raw telemetry and generates valid commands ready for upload. Virtual Channel Data Unit (VCDU) telemetry is downlinked via S-band 240 to the AFSCN (Air Force Satellite Control Network). The RSC facility has access to the AFSCN antenna network. The PTP machine 264 captures the data from the front end equipment, sanitizes it for security and forwards the CCSDS VCDUs to MOC RIMS/SCL workstation 50. The SCL Gateway 260 application picks the CCSDS ( ) Consultative Committee for Space Data Systems) telemetry packets out and passes them to the DataIO process. DataIO then decommutates the packets into the mnemonic values. It performs engineering unit conversion and limit checking. Console operators are alerted to any anomalous conditions. The SCL rules based Expert System is used in the TT&C workstation 236. Ground based scripts and rules are programmed to monitor events and telemetry.

TT&C 236 also performs command generation. SCL flight scripts and bus commands are run through the SCL Command Generation (CMDGEN) process shown in FIGS. 11A-11B, which converts them into binary CCSDS command packets. These command uploads are then sent to the RSC which handles the encryption and are transmitted via the AFSCN network.

The mission operations center uses RIMS interface 270 to monitor telemetry values. RIMS screens (displays) can view telemetry and derived items as color coded text, meters, thermometers, and strip charts. The RIMS system processes data as it is received from the RSC and supports playback of archived data sets.

Figure 16:
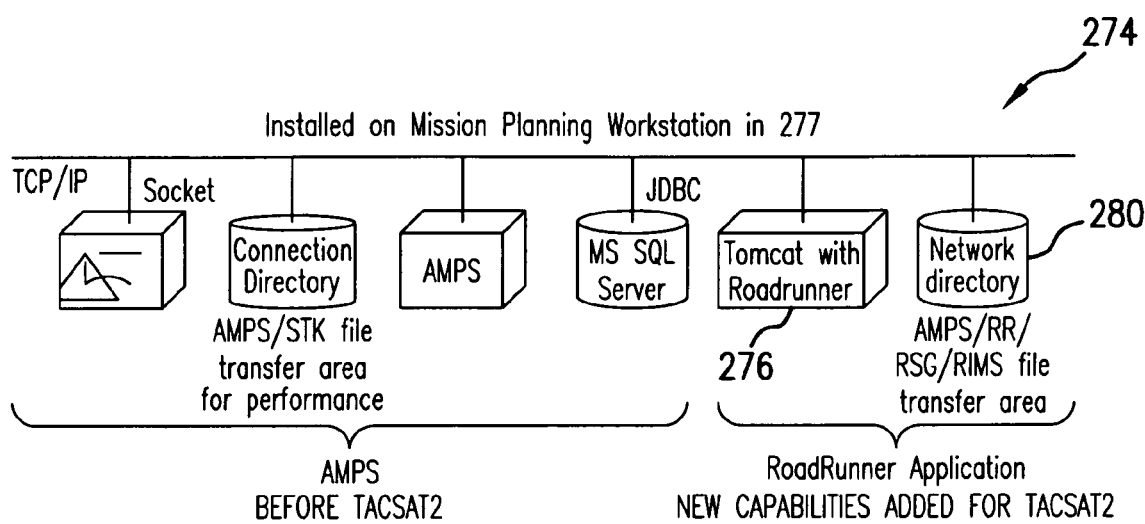
FIG. 16 is a schematic representation of the Mission Planning Workstation architecture.

Mission Planning Workstation (MPW) 272 of the RSC 262 is responsible for generating activity plans (schedules) for mission events including experimental data collection events. To do this it evaluates orbital geometries and required resources against specified constraints and competing usage to find an acceptable opportunity and corresponding schedule. The scheduling tool within the MPW 272 is the Automated Mission Planning System (AMPS) 274 developed by the present Applicant (Interface & Control System). Specifically, as shown in FIG. 16, the AMPS system 274 includes the Tomcat Webserver 276, and Network directory file server 280. Alternatively, it may also include my SQL module 278 (the computer language designed for the retrieval and management of data in relational database management systems). The spacecraft model is defined in the SQL database to allow the AMPS system to be reused on other spacecraft.

Figure 17:
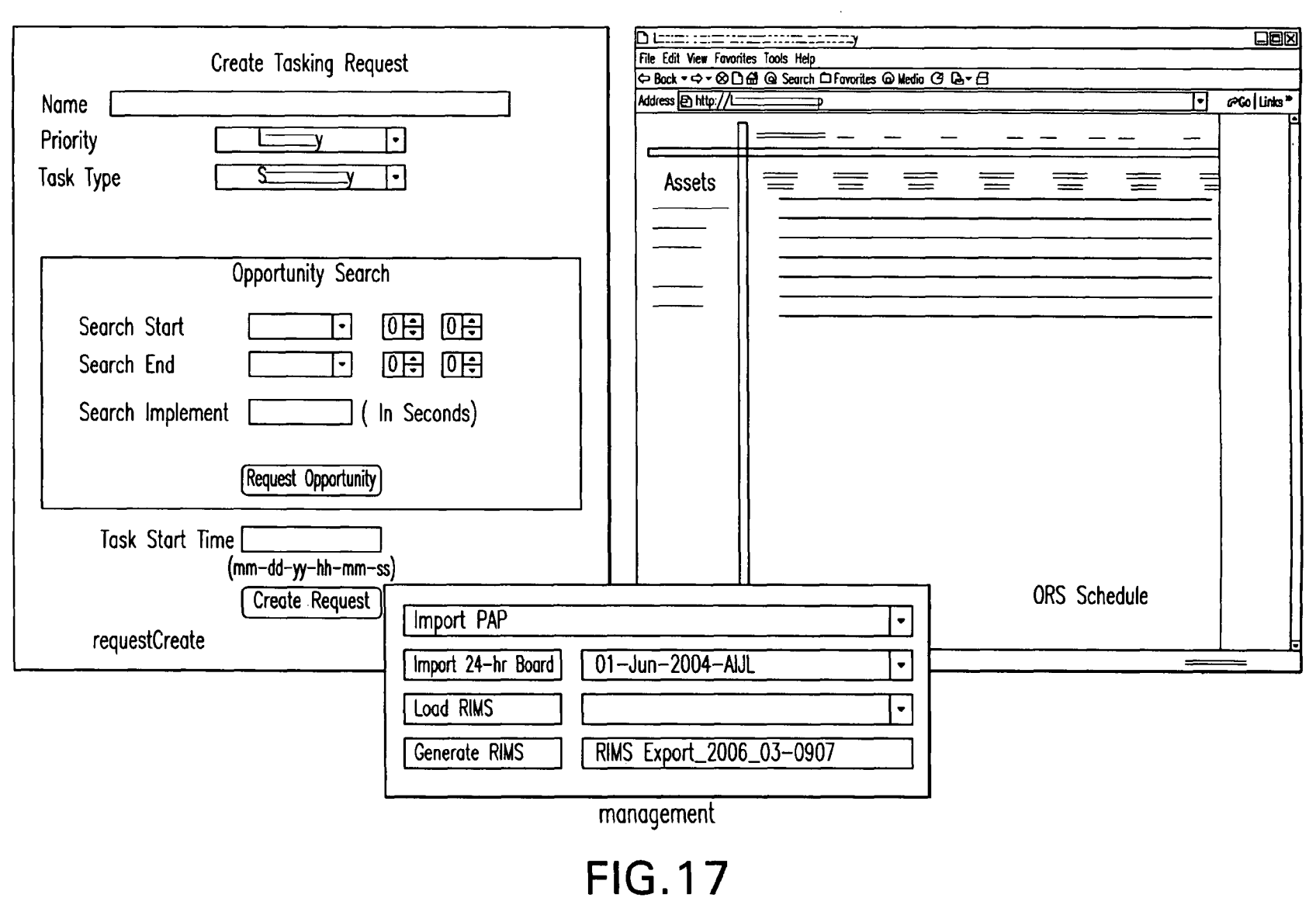
Figure 18:
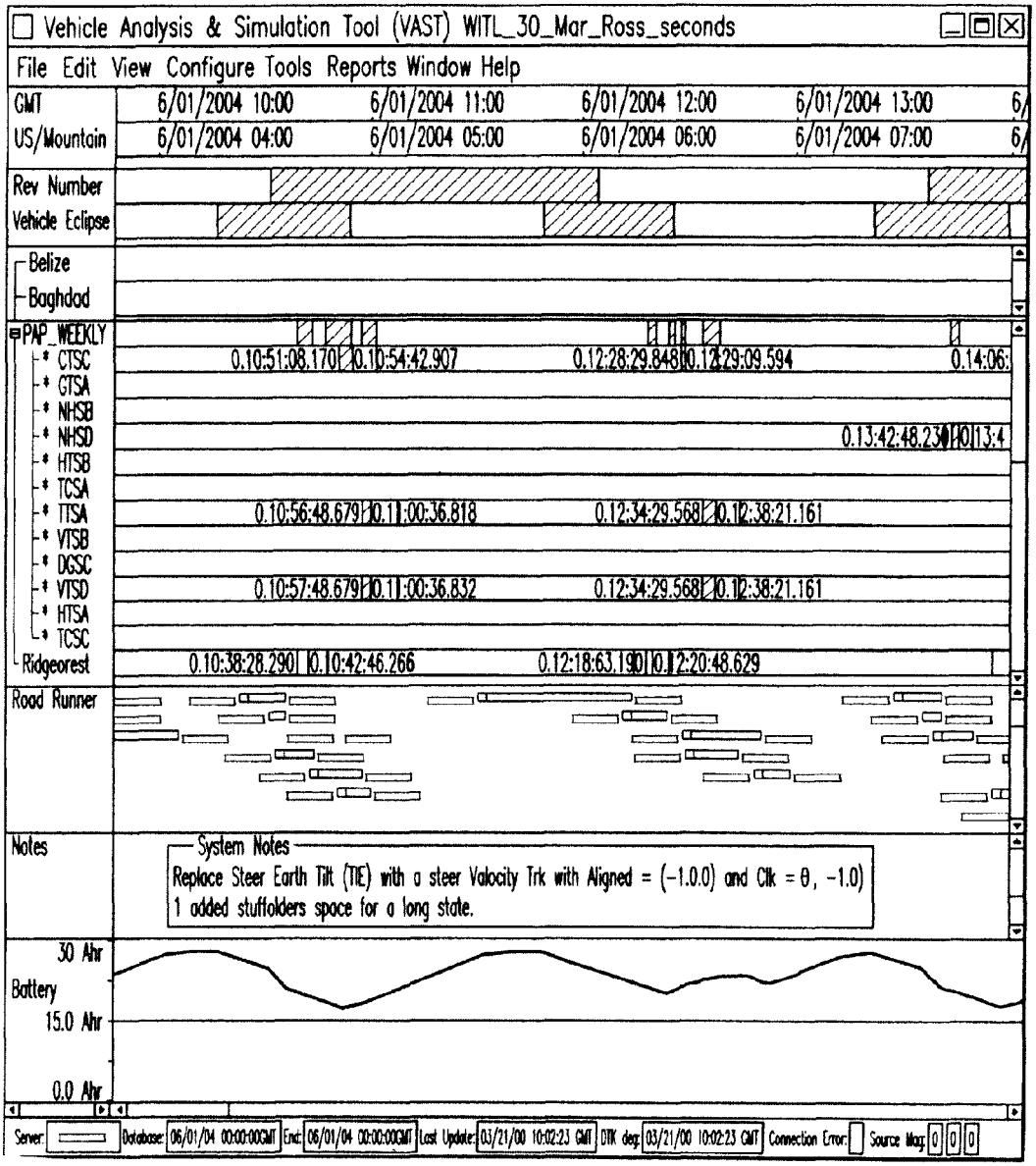
FIG. 18 represents the AMPS Mission Planning tool data flow.

The RIMS system 50 may be used for day-to-day operations and was extended to include hyperlinks to the AMPS system 274. The AMPS system provides form-based data entry using a wizard-like interface shown in FIG. 17 to guide a user through each ATE objective. Although multiple web servers are used, the web content is integrated to make the Planning and Tasking System appear as a single system. The AMPS interface allows a user to schedule objectives and view the ATE schedule on a Gantt chart interface presented in FIG. 18.

Figure 19:
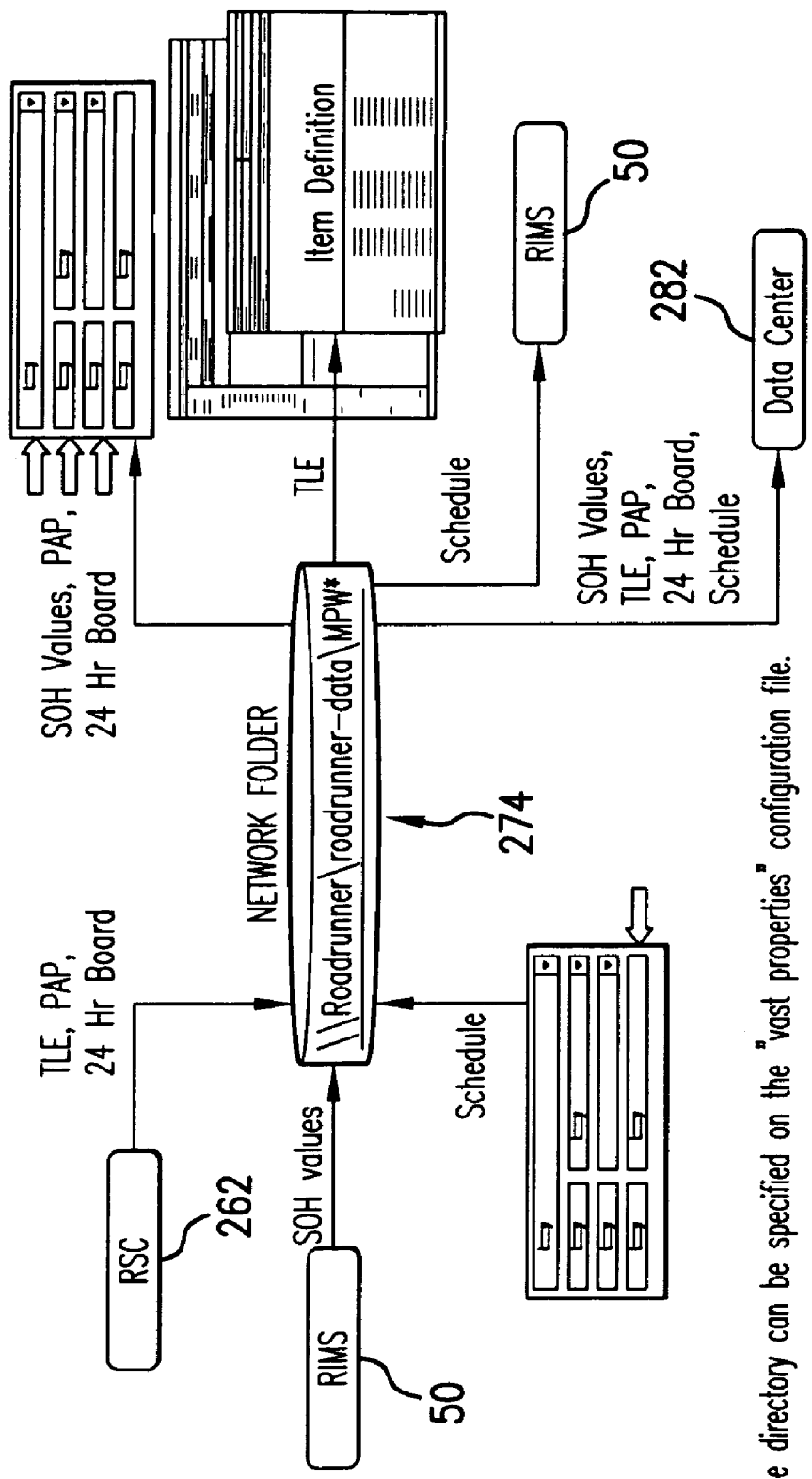
FIG. 19 represents the AMPS Gantt chart showing ATE activities and state of charge for on-board batteries.

The AMPS system 274 employs electrical modeling, thermal modeling, and orbit propagation to aid in the definition of mission constraints. As shown in FIG. 19, the RoadRunner State of Health (SOH) data is supplied by the RIMS system 50 to the AMPS system 274 at the end of each pass and is used by the AMPS modeling software to assess the current state of the vehicle. The Two Line Element (TLE) ephemeris data is supplied by the RSC each day to seed the AMPS orbit propagator. Additionally, the RSC 262 provides a daily 24-hour Board file in an XML format for import into RIMS and AMPS. These files are used to aid in the display of pass opportunities and populate the vehicle simulation with current state of health values. All files are provided to the Data Center 282 for long term archiving.

Using a set of web-based forms, the ATE objectives are requested and queued by the user. These requested objectives are then evaluated against the VAST models, orbit propagator, and hard mission constraints. The ATE objectives are accepted, rejected or possibly optimized by the AMPS scheduling algorithm. This provides a first opportunity to produce a successful ATE load of the mission pass plan. As an example, a Mission Operations System which includes the AMPS system, may be deployed with AMPS on the Secret Internet Protocol Router Network (SIPRNET), while the Mission Operations Center is on the Non-secure Internet Protocol Router Network (NIPRNET). This would require the ATE objectives to be exported to an XML file and to hand-carry the file across to the RIMS server where it is imported.

Once the ATE Objective XML file is imported into the RIMS Standard Query Language (SQL Server) Server database shown in FIG. 16, all pass plans are available for viewing using a web browser. At least once per day, the satellite operator selects a RIMS menu item to generate the pass plan. The Planning and Tasking (P&T) translators developed by the Applicant of the subject patent application then traverse the SQL Server tables and extract all ATE objectives and auto-generate the mission data load and the corresponding ground segment SCL Perform File. The perform file is used to automate the daily passes. A standard set of files are called from the pass perform file. These files are exported by the P&T translators and may be populated or blank depending on the needs for the pass. A standardized structure is employed to allow automation of the passes while providing flexibility for changing mission needs and contingencies.

Figure 20:
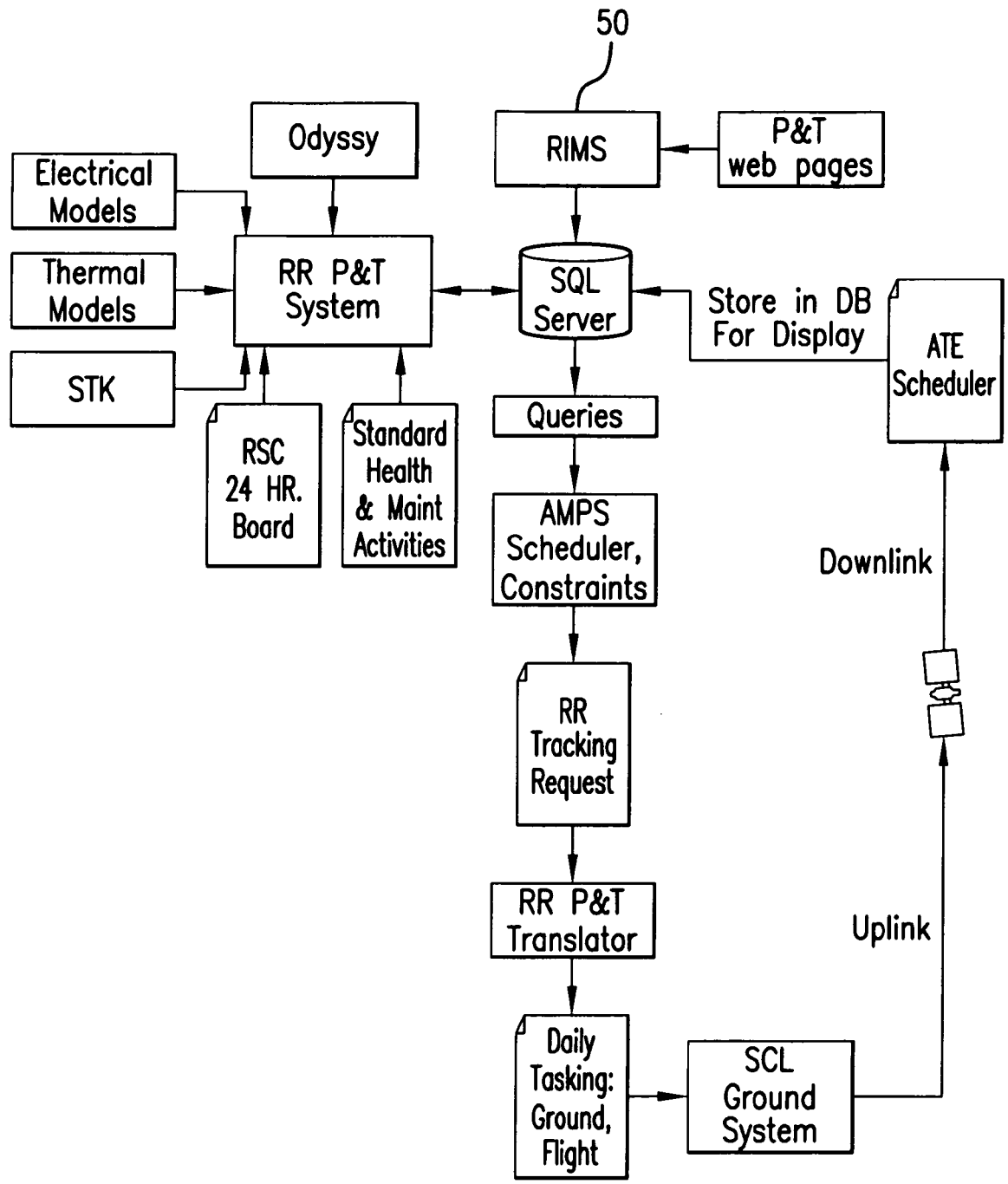
FIG. 20 is a schematic representation of the Mission Planning Workstation data flow.

Because the RoadRunner Autonomy Flight Software 14 has the ATE 44 planning function on-board, there is opportunity for the on-board orbit propagator to override ATE Objectives. Also, Remote Tasking Terminal (RTT) makes a high priority Imaging and Tactical Field Request which causes the on-board schedule to be re-planned or items to be rejected. All ATE activities and re-planning are captures in the ATE log files and on-board schedule. These files are routinely downloaded and imported to the RIMS system where they are displayed and compared against the requested tasking (i.e. requested vs. actual). The full Planning and Tasking System data flow described in the previous paragraphs is presented in FIG. 20.

The Data Center 282, shown in FIGS. 11A and 15, is the main repository for all data on the program. The Data Center hosts bus and experiment telemetry and imagery data, both raw and processed. The Data Center has been developed by the AFRL. The present Applicant, e.g. Interface and Control systems, Inc. (ICS), defined a data structure to segment the State of Health (SOH), Stored State of Health (SSOH) and payload data into individual directories in a directory tree which is cross-mounted by the Data Center server. The Data Directory Structure is presented in FIG. 21. The root of the directory tree is biased by the ongoing reliance on the C:/data directory tree used by the AI&T team. ICS used an Environment Variable to define the root of the data directory so that additional hard drives could be added to the RIMS server to support long-term trending. The RoadRunner Flatsat and Flight systems routinely generate more than 10 Mbytes of data during a single 8-hour shift. The data is made available to the Data Center through the directory structure, but it is also kept on-line for ~30 days to allow operators to perform long term trending of values using the RIMS Strip Charts.

A Flight Dynamics Workstation 284 show in FIG. 15 is responsible for monitoring flight control status and state-of-health as well as building the Two Line Element Sets (TLEs) used by AMPS system 274 and the pass plans. The Flight Dynamics Workstation uses Odyssy Software to consume the GPS history files provided by the RIMS system 50. These GPS history files are downloaded from the spacecraft to the CDL site and provide detailed GPS coordinates of the orbiting satellite. The Odyssy software uses these GPS readings to perform precision orbit propagation and generate the ephemeris data needed by the AMPS system to scheduled passes and predict orbit track and sensor field of view for mission tasking requests.

Figure 22:
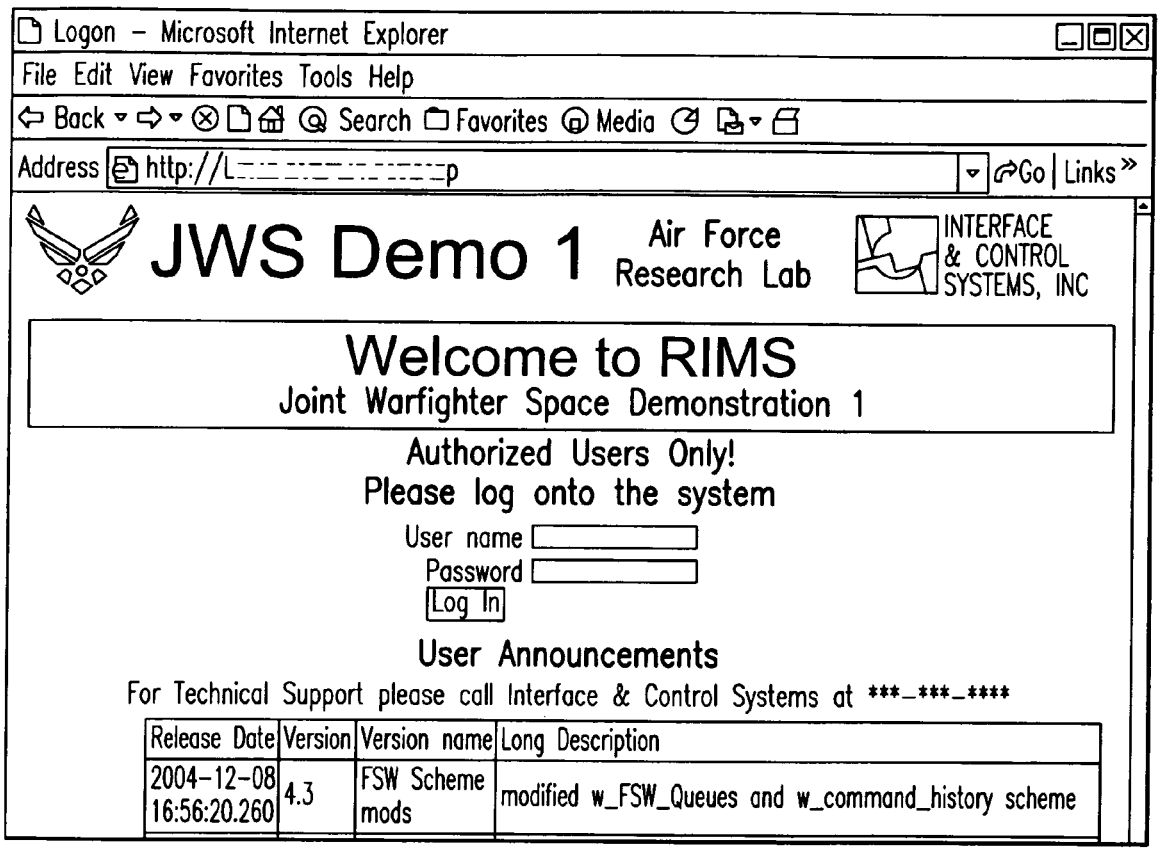
FIG. 22 illustrates the RIMS log-in page.

The RIMS workstation 50 hosts the operational SCL system, SQL Server database, Tomcat Web Server, and the Java Server Pages that make up the Operations screens and the Mission Planning screens. The RoadRunner program has embraced a web-centric model for the command and control of the spacecraft, as may be seen in FIG. 22. The RoadRunner team is made up of a geographically-diverse group of contractors and civil servants. Using a web-based paradigm for monitor and control allows contractors to monitor their respective payloads and avoid the costs associated with travel.

These "virtual engineers" aid in the day-to-day operations without traveling and provide a significant value to the AFRL at a much-reduced cost.

The RIMS system 50 is a product of Interface and Control Systems modified for the RoadRunner implementation, and thus uses additional Java Server Pages (JSP) to brand the system as a AFRL project and to extend the core RIMS system to implement mission unique requirements for RoadRunner. The SCL and RIMS implementations are designed to allow incremental updates and releases of the SCL and RIMS products without a significant integration effort by the RoadRunner ground team.

The RIMS system uses the Tomcat web server 276 which allows for a username and password for log-in. Each user is assigned a "role" within Tomcat. These roles are used to assign privileges to each user. For instance an "Admin" role allows the user to add other users. The absence of the "command" role can inhibit the ability to send commands, essentially making this user a "monitor-only" user.

Figure 23:
FIG. 23 illustrates RIMS Home page.
Figure 24:
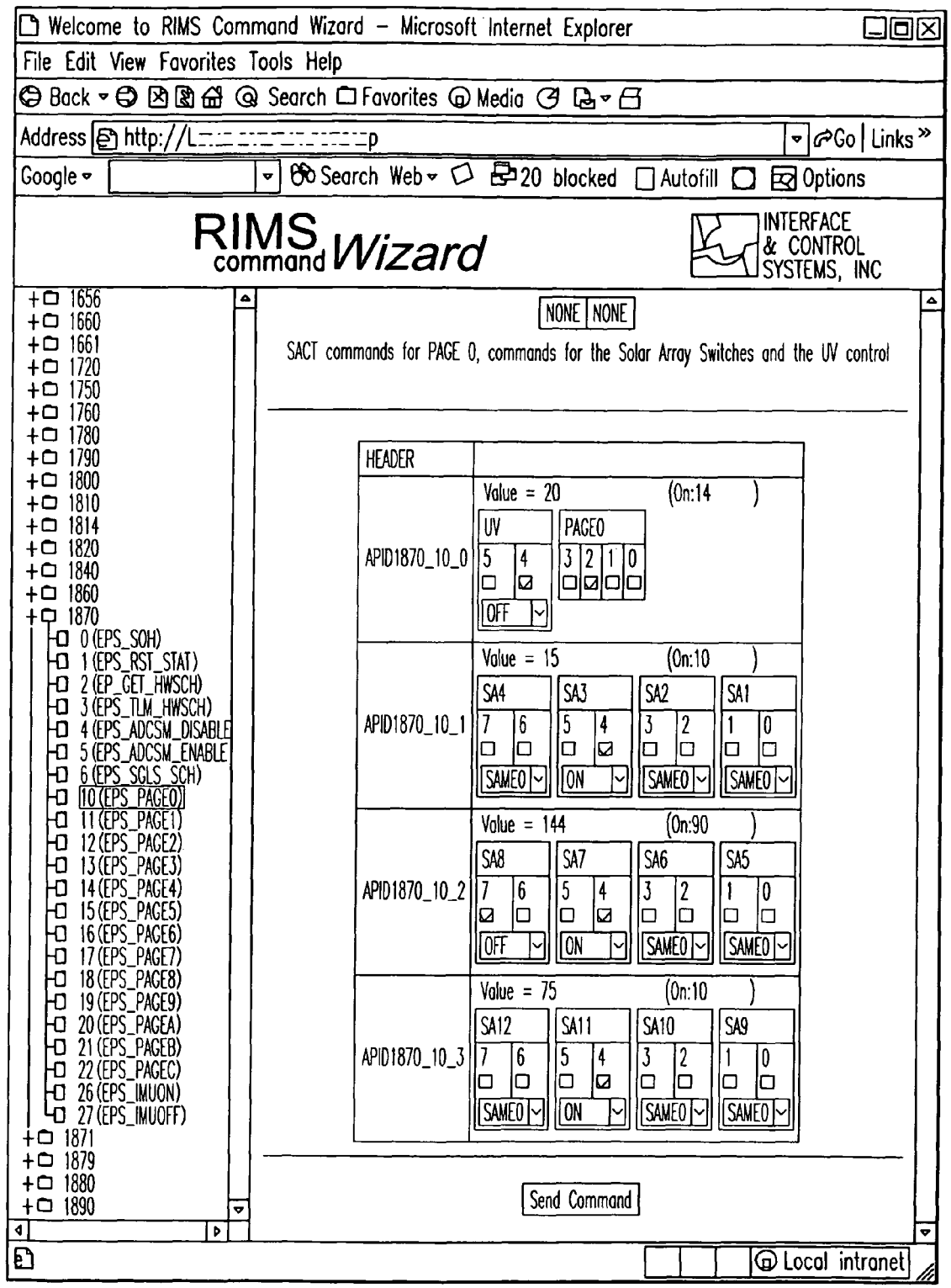
FIG. 24 illustrates the RIMS Command Wizard.

Once logged into the RIMS system, the user is presented a "Home Page" shown in FIG. 23. This can be tailored to the needs of the community to make announcements, show upcoming pass plans, etc. FIG. 24 shows the standard Home Page, but alternatively it may be modified to look as a web portal.

Along the left side of the page in FIG. 24 is the Navigation panel 290. This region is tailored to the user's privilege and provides hyperlinks into the rest of the RIMS system and the Mission Planning System depending on the user's access level, the feature unique for the RIMS 250 of the present system. ICS has segregated the required changes to a single directory under RIMS to ease the installation of new releases of the RIMS system.

One of the tools developed for the RoadRunner system is the Command Wizard, shown in FIG. 24. The Command Wizard parses the XML command definitions and presents a web-based form to allow the user to select the command by Application Identification (APID), and select from check boxes and pull-down menus as much as possible to define a syntactically-correct command. Commands that the user defines are able to be named and stored for later retrieval and execution. The named/stored commands are stored in the SQL server database.

Figure 25:
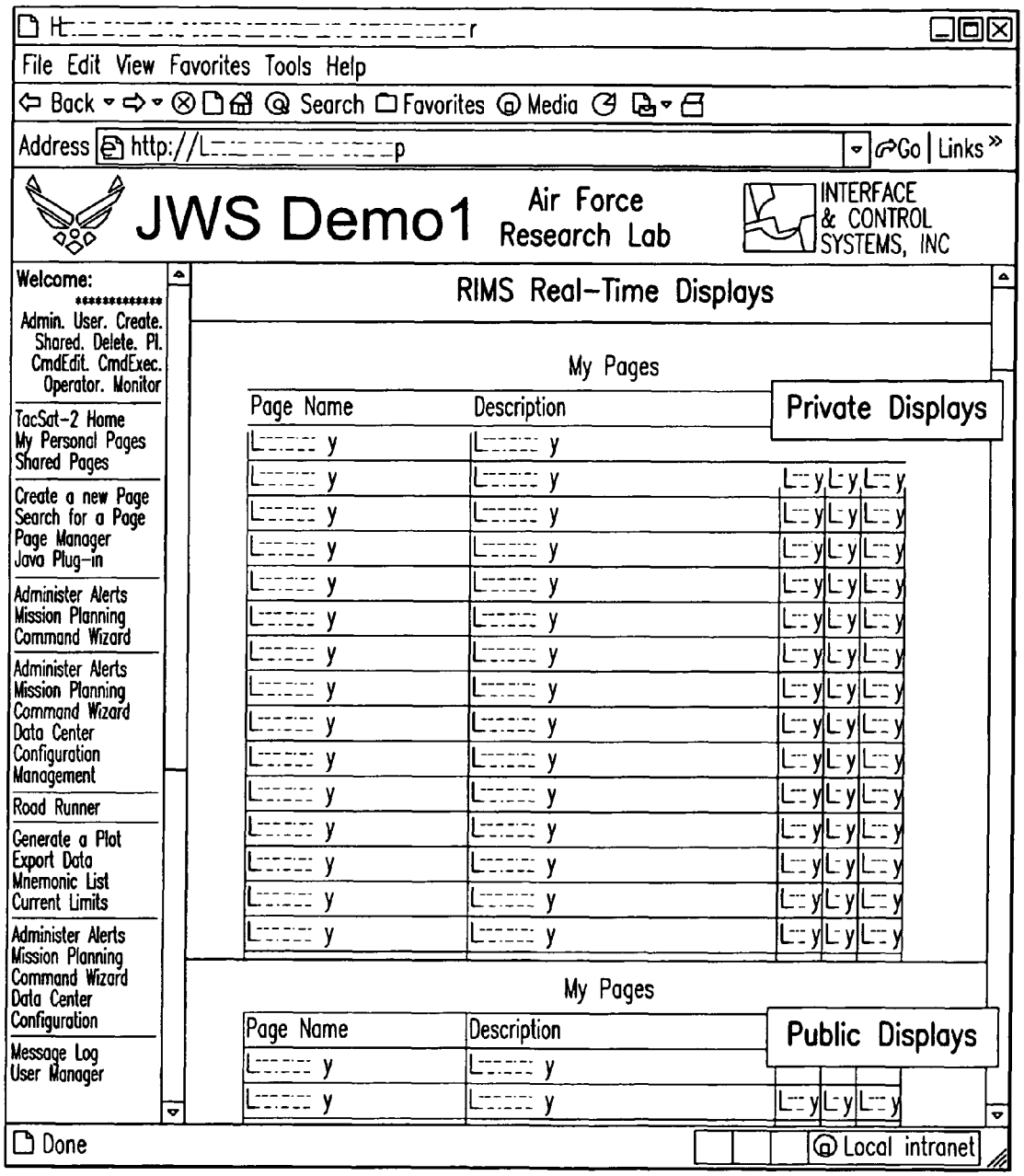
FIG. 25 illustrates the RIMS Private and Public page.

The RIMS system 50 allows the user to define custom web pages using the built in graphical editor. The user can define and name pages that are either Public (i.e. accessibility by other users), or Private, as presented in FIG. 25.

Figure 26:
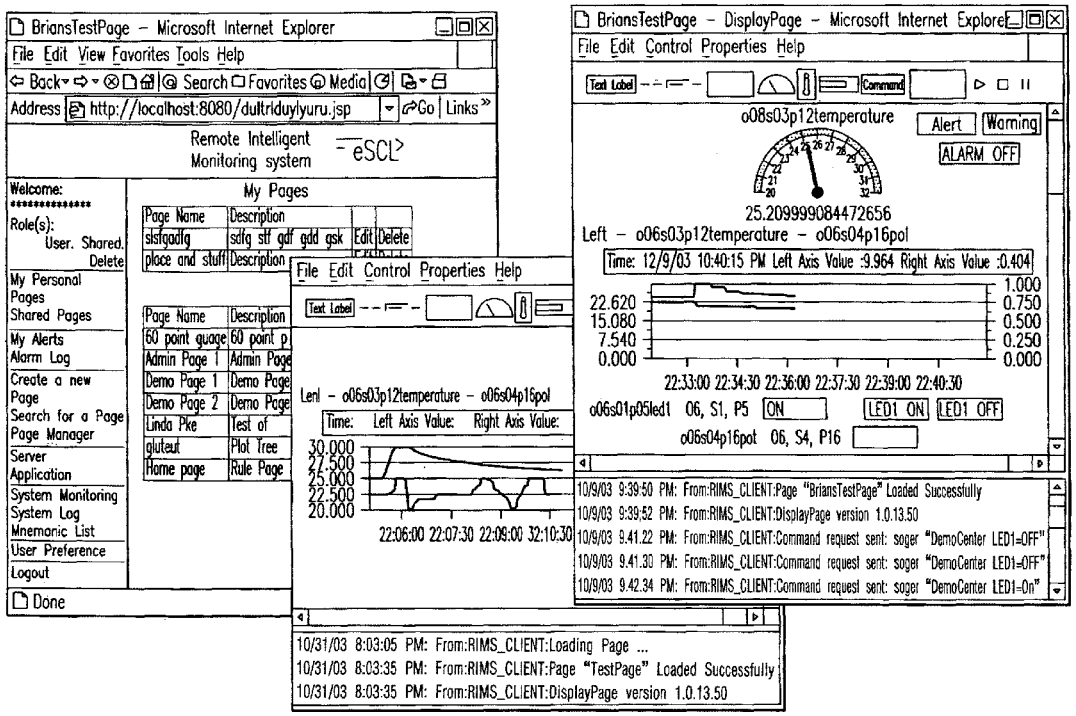
FIG. 26 illustrates examples of RIMS User Defined pages.

RIMS users may select from many different types of controls that may be displayed in a RIMS pages shown in FIG. 26. The standard text displays may be color coded based on an alarm condition. Gauges and vertical and horizontal thermometer-style gauges can also include color coded alarms. Two types of strip charts are available. A single item strip chart is the simplest. However, the multi-item strip chart is the most useful since it can display up to 10 items on the chart and can have different scales on the right and left Y axes.

Figure 27:
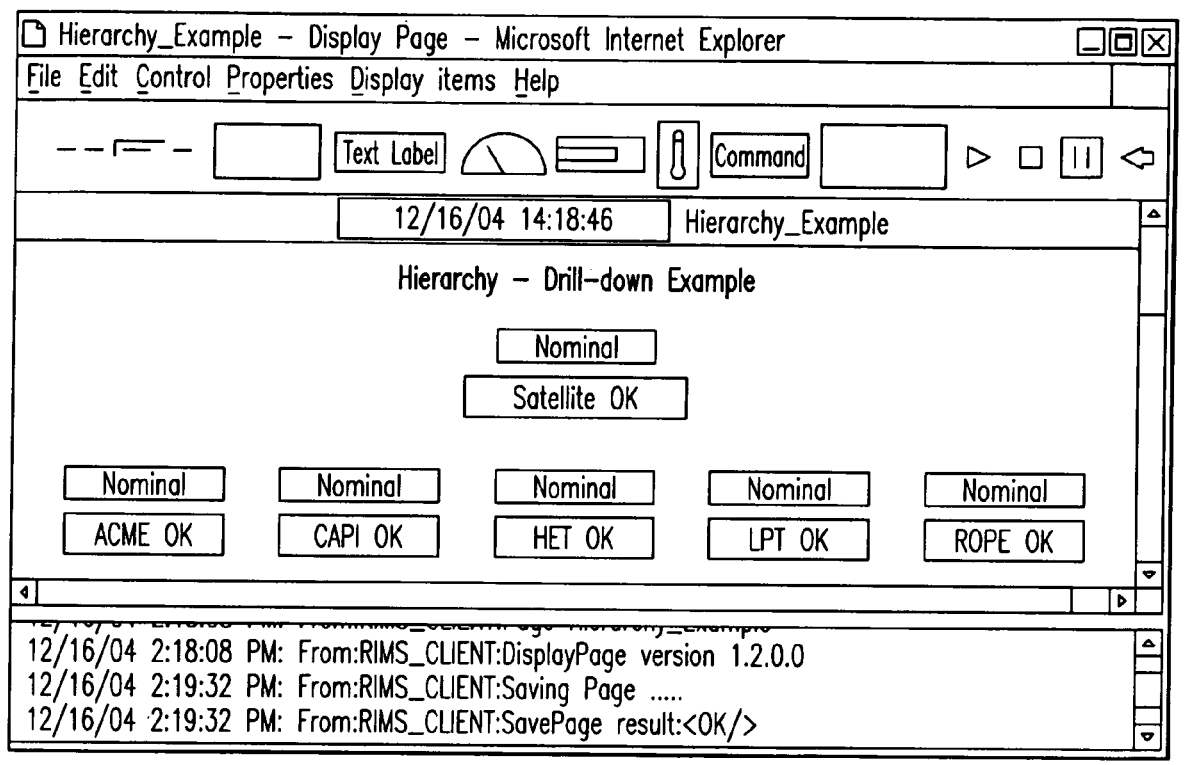
FIG. 27 illustrates the RIMS Hierarchical Drill Down Display.

A capability to have Hierarchical displays and drill-down display capabilities is added, as shown in FIG. 27. The operational concept is for a top level display to contain color coded displays of SCL derived items. These derived items are calculated by rules on a subsystem-by-subsystem basis. Each state (nominal=green/fault=red) can have a button below it. When clicked, these buttons allow the corresponding RIMS page to be displayed in the window. When the user drills down a page, a "back" button appears and allows the user to move back up the hierarchy.

Figure 28:
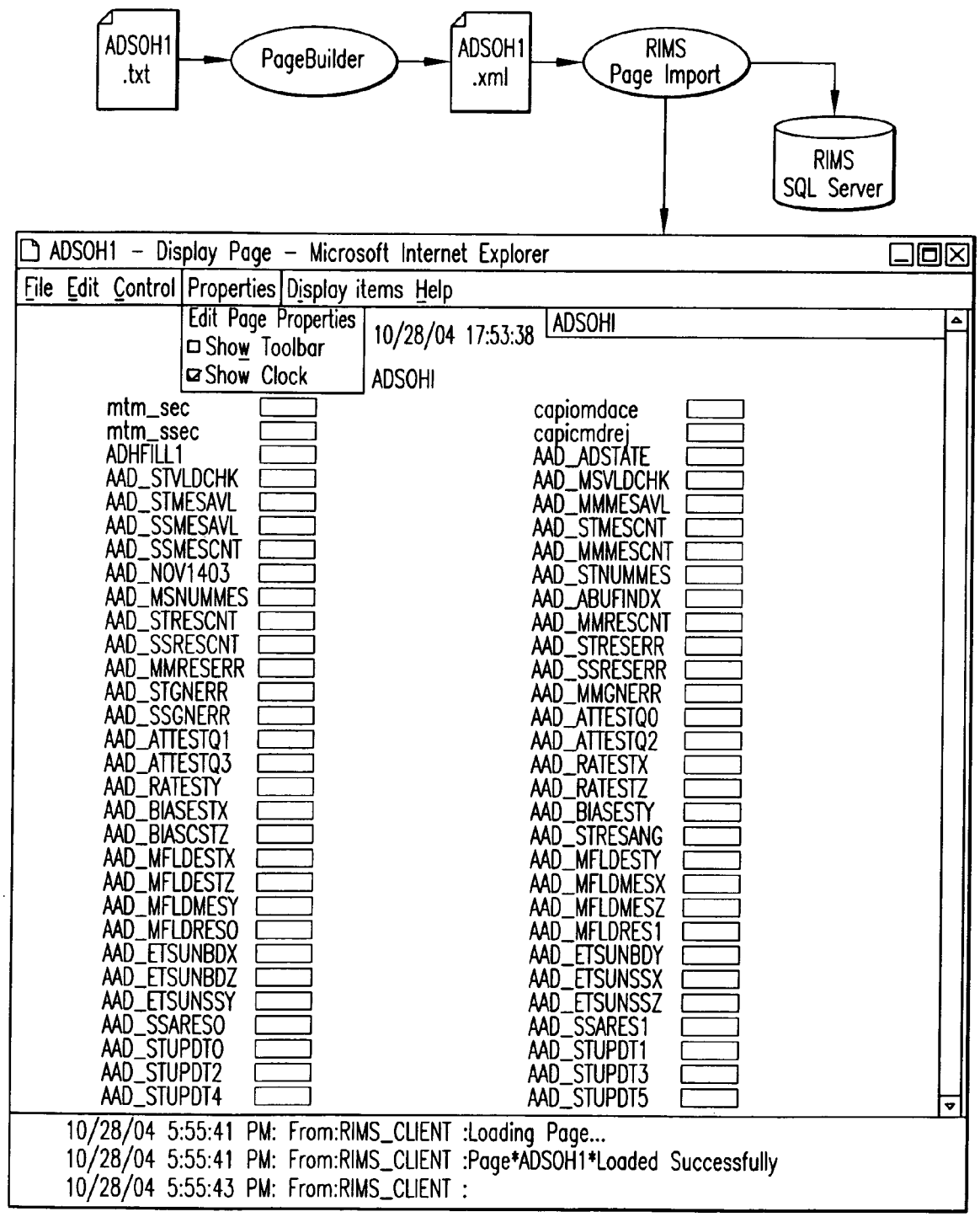
FIG. 28 illustrates RIMS page builder.

A capability needed for Integration and test is the ability to quickly auto-generate RIMS pages. The RoadRunner system has in excess of 32,000 monitored data points. The sheer number of items that is monitored for each subsystem/payload creates a daunting task for the operators. To manually develop a web screen for each payload would have required additional staffing. Instead, ICS developed a "PageBuilder" application, shown in FIG. 28. The PageBuilder allowed the user to specify a set of standard items which could be displayed at the top of each page (i.e. time and counters), and use a separate file to define the items that they wished to monitor. The PageBuilder automatically generates an XML file which may be imported into the RIMS system. The XML files may also be placed under configuration management to allow them to be shared among the development team.

The RoadRunner mission planning system is added to the RIMS. The RoadRunner mission planning system was designed to accommodate 11+ experiments and be reusable for other programs. The ATE flight software is largely reusable and could be applied to future AFRL missions with changes to the orbit propagator and addition of any mission unique constraints. ICS developed a version of the Mission Planning interface to exercise the ATE Flight Software and to support AI&T testing of the ATE system.

Figure 30:
FIG. 30 illustrates the Imager Planning and Tasking Wizard of the system of the present invention.

ICS has developed a mission planning interface presented in FIGS. 29-30. The Mission Planning System is designed to provide menu items based on the User's Tomcat role. The Menus are grouped based on activity types and the selection of an activity brought up a specific wizard to guide the user through only the parameters needed for that ATE Objective. After the wizard has collected all needed parameters, the Objective or Activity is added to the "Scheduled Activities" list. Items on the Scheduled activities list can be edited, deleted, or committed to the schedule.

The RoadRunner Ground segment has several mission unique "BLOB plug-ins". The Plug-ins were designed to look for a specific CCSDS Application Identifier (APID) in the header. When the SCL Gateway found a specified APID, the packet was sent to the Binary Large Object (BLOB) Plug-in. The plug-in was responsible for all mission unique processing and storage of the data for display or processing. Examples include the Broadreach Flight Software Queue and Command History packet displays, shown in FIGS. 31, 32, respectively. All BLOB plug-ins were developed using a C++ class which allowed much of the communications and behavior to be inherited and allowed for an accelerate development of the software and reduced the amount of code developed for each plug-in.

Figure 31:
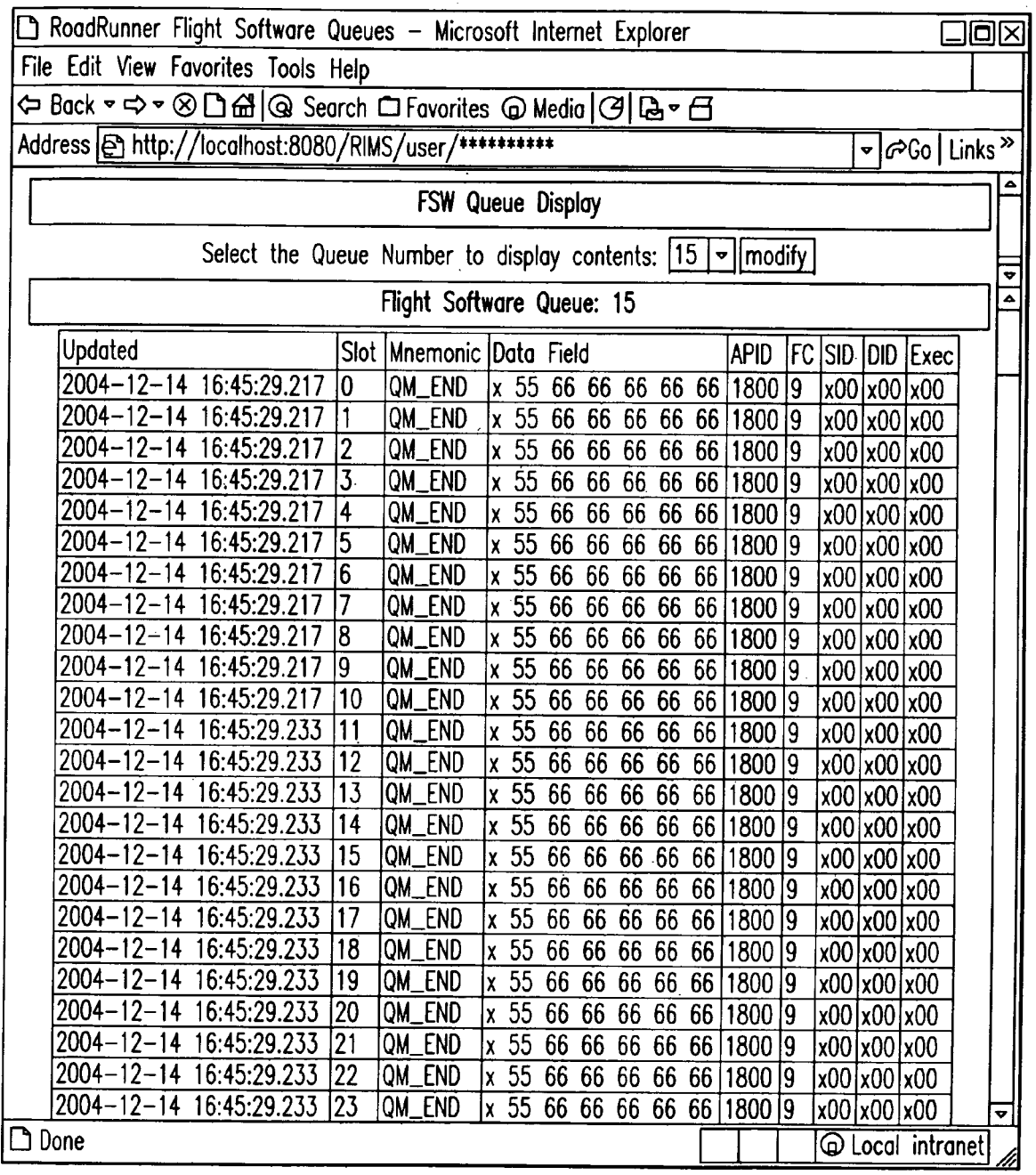
FIG. 31 illustrates the Flight Software Queue Display.

FIG. 31 shows a display of the Flight Software (FSW) Queues. The BLOB Plug-in is responsible for processing the Queue APID and storing the data in a file. The FSW Queue Java Server Page read the data from the file and presented it to the user as a HyperText Markup Language (HTML) web page. The queue (1-32) to be displayed is selected at the top of the form.

A useful tool for the AI&T and Operations staff is the Flight Software Command History Buffer, shown in FIG. 32. This buffer contains the last 512 commands executed by the Broadreach flight software. The Command History BLOB Plug-in was responsible for processing the APID and storing the data in a file. The FSW Command History Buffer Java Server Page read the data from the file and presented it to the user as a web page.

Figure 33:
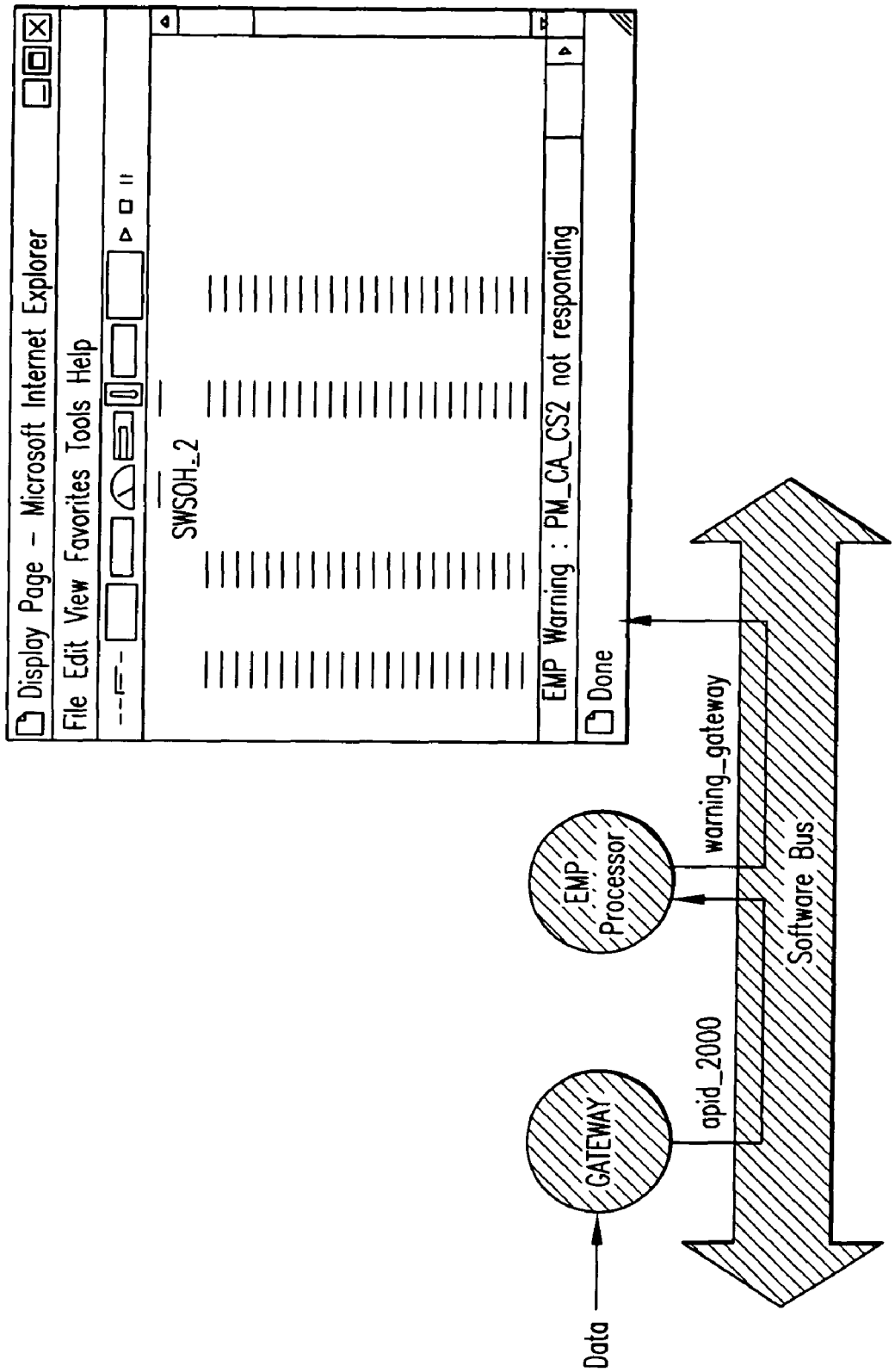

The Broadreach Flight Software puts out Emergency Message Processor (EMP) messages at critical points in the boot up sequence and during operations. The AI&T and operations staff look for the messages to determine the state of health of the vehicle. ICS designed a BLOB plug-in to capture this APID, decode the message and display the EMP message on the Alert line on the RIMS pages. The EMP messages appear in a distinct color on each RIMS page that is being displayed in FIG. 33.

The Remote Tasking Terminal (RTT) is used at the China Lake Modernized Interoperable Surface Terminal (MIST) ground station. The MIST ground station provides the interface to the CDL antenna. The RIMS/SCL system used for AI&T and for Mission Operations is also used for the RTT. The RTT captures data form the 274 MB payload downlink using a Wideband Systems Recorder. This high speed feed is too fast for processing using commercial data capture cards and off the shelf workstations. The 10.159 MB state of health data downlink is also capture to the Wideband recorder and processed post-pass. Although the ground segment can theoretically keep up with the 10.159 MB state of health link, the Systems Engineering team felt that it would be safer to capture all data on the recorder, then play it back thru the RTT workstation post-pass.

The Wideband Systems recorder collects the imager's Red, Green, Blue and Panchromatic imagery in real-time. Post-pass the recorder can be commanded to "re-stitch" the streams of data into JPEG images. The state of health data stream is played back into the SCL system and decommutated, separated by payload, and passed to the RSC and Data Center computers as needed. Imagery can be viewed and annotated at the Tactical Field Site using the Tactical Exploitation System (TES-Lite) software. A software, for example which is developed by Technology Service Corporation, may be used at the RTT to geo-locate the image (i.e. "pin the corners") based on GPS data in the state of health downlink. Field commanders may then use Annotated imagery as actionable intelligence.

The command and control software used for the RTT is the same RIMS and SCL software used for AI&T and the RSC for SGLS operations. The RTT site also supports the in-theater tasking of the spacecraft using the RoadRunner Planning and Tasking system. These Tactical Field commands are uploaded to the ATE flight software and given the highest priority. Because of the ability for tactical field sites to asynchronously add objectives to the ATE flight schedule, the ATE logs files are downlinked on each SGLS pass to examine the ATE log and schedule files for any additional ore rescheduled objectives.

The RTT field site has two types of Internet connections for data transfer. The RTT machine is connected to the high speed Defense Research Engineering Network for unclassified and For Official Use Only (FOUO) data transfer to the Data Center and the RSC. The Secret Internet Protocol Router Network (SIPRNET) connection is used by the AMPS/RIMS Virtual Mission Operations Center server. The SIPRNET connection allows users on classified networks to request ATE tactical field reservations and have the objectives uploaded from the tactical field site.

Exercises have been conducted for RTT and MIST testing at China Lake as well as the testing at the AFRL when the MIST antenna was in Albuquerque, N. Mex. The MIST interfaces were tested and the interfaces with the Wideband System recorder were also exercised. Testing at China Lake allowed to exercise both the command and telemetry paths for our software.

The present system including the on-board Autonomy Operations System and on-ground RIMS provides a key enabling technology for future airforce satellite programs. The ability to automatically checkout the spacecraft provides an operational capability in a fraction of the time and support the goals for a responsive space program. On-board planning and re-planning support the goals of reducing operations costs and flying the satellite with extremely limited number of operators. The web-centric approach for the ground segment of the present system allows geographically diverse teams to cooperate on the planning and tasking of the experiment and allow remote monitoring of spacecraft operations in a standard cost effective fashion. Off the shelf laptop and desktops may be used and the only software required to be installed at the Client's side is a web browser and Java Virtual Machine (JVM).

Although this invention has been described in connection with specific forms and embodiments thereof, it will be appreciated that various modifications are themselves discussed above may be resorted to without departing from the spirit or scope of the invention as defined in the appended Claims. For example, equivalent elements may be substituted for those specifically shown and described, certain features may be used independent of other features, and in certain cases, particular applications of elements may be reversed or interposed, all without departing from the spirit or scope of the invention as defined in the appended Claims.

What is claimed is:

1. An intelligent system for a spacecraft autonomous operations, comprising:
   (a) an on-board autonomous operations system, including: an On-Orbit Checkout Engine (OOCE) system, and an Autonomous Tasking Engine (ATE) system;
   (b) a Remote Intelligent Monitor System (RIMS) in communication with said on-board autonomous operations system through a communication channel, said RIMS including a user interface for communication with a plurality of user stations; and
   (c) a Spacecraft Command Language (SCL) infrastructure system operatively coupled to said OOCE system, ATE system, and RIMS;
   wherein said OOCE system collects checkout logic, generates SCL based checkout commands in accord with said checkout logic, and executes said SCL based checkout commands to perform a functional testing of respective components of the spacecrafts substantially upon the spacecraft reaching orbit, and to perform a performance testing of said respective spacecraft components to monitor an operations state thereof, and
   wherein said ATE system receives objectives, plans a sequence of on-board actions to attain said objectives, generates SCL based scheduling commands for said on-board actions, and executes said SCL based scheduling commands in a predetermining order.

2. The intelligent system of claim 1, wherein said ATE system is coupled to on board ephemeris and orbit propagator to schedule, reschedule and execute said SCL based scheduling commands, and
   wherein said ATE system performs short-term and long-term autonomous planning and scheduling.

3. The intelligent system of claim 1, wherein said ATE system checks for mission constraints violations prior to execution of said SCL based scheduling commands, and wherein said ATE system re-schedules said execution of said on-board actions in a predetermined time window if a mission constraint violation is detected.

4. The intelligent system of claim 2, wherein said OOCE system includes an OOCE database storing a plurality of cooperating OOCE rules, OOCE scripts, and OOCE constraints, and wherein said OOCE system collects behavioral knowledge data for said respective components of the spacecraft and auto-generates SCL scripts for respective commands to be executed, said respective commands being presented in a specified command pattern.

5. The intelligent system of claim 4, further comprising a spacecraft bus for communication between said on-board autonomous operations system and said respective components of the spacecraft.

6. The intelligent system of claim 5, wherein said SCL infrastructure system is coupled to said respective components of the spacecraft to monitor a State of Health (SOH) thereof by triggering predetermined rules of said OOCE and OOCE scripts from said OOCE system responsive to change in data of said respective components.

7. The intelligent system of claim 5, further comprising a communication channel between said spacecraft bus and said respective components of said spacecraft, said communication channel including a Flight Software System (FSS) Bridge coupled bi-directionally to said spacecraft bus, a Packet Handler bi-directionally connected to said FSS Bridge to communicate real-time operating system kernel (OSE) signals therebetween, said telemetry data being received at said OOCE database through said FSS Bridge.

8. The intelligent system of claim 5, further comprising an SCL Real-Time Engine (RTE) Unit coupled between said spacecraft bus and said OOCE database and executing on-board said OOCE scripts and OOCE rules stored in said OOCE database.

9. The intelligent system of claim 8, further comprising a Packet Generator unit coupled to said SCL RTE unit to generate on-board command packets under the control of said SCL RTE, said on-board command packets being transmitted to said respective spacecraft components.

10. The intelligent system of claim 2, wherein, based on Latitude and Longitude of a specified target, field of view of an Imager, daylight parameters, conflicts with other components of the spacecraft, and downlink or power constraints, said ATE system further determines a next event to image the specified target.

11. The intelligent system of claim 3, wherein said ATE system performs in a predetermined mode of operation selected from a group consisting of:
 (a) application of a priority scheme for execution of said on board actions if multiple objectives requests are uploaded from said RIMS;
 (b) executing said SCL based scheduling commands on First come-First served (FIFO) basis; and
 (c) blocking out a section of a schedule immune to re-scheduling as a high priority objective.

12. The intelligent system of claim 9, further comprising an on-ground Automated Mission Planning System (AMPS) unit evaluating said objectives against spacecraft power, thermal model thereof and said orbit propagator data, said AMPS optimizing a schedule of said objectives and transmitting said optimized schedule to said RIMS, wherein said RIMS translates said optimized schedule into ATE commands transmitted thereto, said Packet Generator generating command packets responsive to said ATE commands for transmission to said respective components of the spacecraft.

13. The intelligent system of claim 2, wherein said ATE system further includes:
 an ATE Activity Manager (ATE-AM) unit;
 an ATE Plan Manager (ATE-PM) unit,
 an ATE Execution Manager (ATE-EM) unit,
 an ATE Script Scheduler (ATE-SS) unit, and
 an ATE Event Executive (ATE-EE) unit,
 wherein said Orbit Propagator includes an ATE Near-Term Orbit Propagator (ATE-NTOP) and ATE Long-Term Orbit Propagator (ATE-LTOP),
 upon receiving ATE commands, said ATE-AM unit generating objectives to the ATE commands, and separating said objectives into near-term objectives and a long-term objectives,
 entering a respective SCL script command corresponding to each of said near-term objectives into said ATE-SS unit, and sending said long-term objectives to said ATE-PM unit,
 said ATE-AM unit communicating with said ATE-EE unit to receive therefrom a notification signal for execution of a respective near-term objective,
 said ATE-EM unit being coupled to said ATE-AM unit to receive therefrom an execution time signal for said respective near-term objective, and
 said ATE-AM unit fine tuning execution time signal for said respective near-term objective in accordance with data received from said ATE-NTOP.

14. The intelligent system of claim 13, wherein said ATE-PM unit enters said long-term objectives into a long-term objectives unit, and sends a respective objective from said long-term objectives unit to said ATE-AM unit for adding to said near-term objectives upon receiving a notification signal from said ATE-EE unit.

15. The intelligent system of claim 14, wherein said ATE-PM unit fine tunes execution time signal for each of said long-term objectives in accordance with data received from said ATE-LTOP.

16. The intelligent system of claim 13, wherein said ATE-AM unit removes said objective from said near-term objective unit when said objective is completed or cannot be completed due to an error occurred during the objective execution or due to failure to schedule said objective execution before a predetermining expiration time thereof.

17. The intelligent system of claim 14, wherein said ATE-PM unit defines unscheduled objectives among said long-term objectives based on expiration time thereof, and periodically attempts said unscheduled objectives for execution.

18. The intelligent system of claim 13, wherein said ATE-EM unit performs "just-in-time" mission constraints verification of said near-term objectives prior to execution thereof.

19. The intelligent system of claim 13, further comprising a SCL script schedule, said ATE-SS unit entering said SCL script command into said SCL script schedule a predetermined time period prior to execution of said SCL script command, and deleting said SCL script command from said SCL script schedule upon execution thereof.

20. The intelligent system of claim 4, wherein said OOCE system is loaded and started along with said Autonomy Operations System prior to a spacecraft launch, wherein said OOCE system starts a functional testing mode thereof substantially at spacecraft separation stage as a "listen-only" test sequence during Solar Array deployment and Attitude Determination and Control System (ADCS) safe mode sequence to check whether active spacecraft systems function in expected states and expected state transitions occur, and completes said functional testing mode substantially upon reaching a Sun Track, by administering tests of said respective components of the spacecraft, including command path, Enhanced Commercial Imager, RoadRunner On-Board Processing Experiment (ROPE), and Common Data Link (CDL); and
 wherein in a performance testing mode thereof, said OOCE system performs verification of operating mode changes and State of Health (SOH) telemetry for said respective components, including spacecraft subsystems and payloads, and
 generates a test report of a current state of each said respective component.

21. The intelligent system of claim 20, wherein said OOCE system further includes:
a test history log, a test event log, a
diagnostic log, and a flight knowledge
base.

22. The intelligent system of claim 20, wherein in said functional test mode and said performance test mode, said OOCE system executes said OOCE scripts defining the sequence of tests to be executed for each said respective component of a spacecraft, and executing conditional logic to skip a following test depending on results from previous tests.

23. The intelligent system of claim 1, wherein said OOCE system operates in an Autonomous Checkout Mode to monitor deployment and safing sequence, and to checkout tactical capabilities of the spacecraft, and in Ala Carte Payload Testing Mode to test Positive Ion Emitter (PIE), Miniaturized Vibration Isolation System (MVIS), Experimental Solar Array (ESA), deployment, Inter Stellar Compass (ICS), Absolute Density Mass Spectrometer (ADMS), and Anemometer Cross-Track Measurement Experiment (ACME).

24. The intelligent system of claim 1, further including a SCL Real-Time Engine (SCL RTE), SCL compiler, and SCL database, wherein said SCL database provides visibility into a current state of each of said respective components of the spacecraft, maintains SCL scripts and SCL rules defining operational logic for controlling the respective components of the spacecraft, and maintains formatting directives for generating real-time commands, wherein said SCL RTE is coupled to said SCL database to perform autonomous actions using said SCL RTE content.

25. The intelligent system of claim 1, wherein 0 said RIMS resides at a ground segment, and wherein said communication channel between said RIMS and said on-board autonomous operations system includes an S-band link for transmission of primary commands and telemetry data, and an X-band Common Data Link (CDL) for downloading data at rates approximately up to 274 Mbit/s.

26. The intelligent system of claim 12, wherein said RIMS is hyperlinked with said AMPS unit, said RIMS hosting said SCL system, Tomcat Web-Server, and JAVA Server Pages for creating Operations Screens and the-Mission Planning Screens at said user stations.

27. An intelligent system for a spacecraft autonomous operations, comprising:
(a) an on-board autonomous operations system, including:
an On-Orbit Checkout Engine (OOCE) system,
(b) a Remote Intelligent Monitor System (RIMS) in communication with said on-board autonomous operations system through a communication channel, said RIMS including a user interface for Web-based communication with a plurality of user stations; and
(c) a Spacecraft Command Language (SCL) infrastructure system operatively coupled to said OOCE system and RIMS;
wherein said OOCE system collects checkout logic uploaded from said RIMS, generates SCL based checkout commands in accord with said checkout logic, and executes said SCL based checkout commands to perform a functional testing of respective components of the spacecrafts substantially upon the spacecraft reaches the orbit, and to perform a performance testing of said respective spacecraft components to monitor the operations state thereof.

28. The intelligent system of claim 27, wherein said OOCE system includes an OOCE database storing a plurality of cooperating OOCE rules, OOCE scripts, and OOCE constraints.

29. The intelligent system of claim 28, wherein said SCL infrastructure system is coupled to said respective components of the spacecraft to monitor a State of Health (SOH) thereof by triggering predetermined rules of said OOCE and OOCE scripts from said OOCE system responsive to change in data of said respective components.

30. The intelligent system of claim 28, further comprising a spacecraft bus coupled to said on-board autonomous operations system, and a communication channel coupled between said spacecraft bus and said respective components of said spacecraft, said communication channel including a Flight Software System (FSS) Bridge coupled bi-directionally to said spacecraft bus, said telemetry data being received at said on-board OOCE database through said FSS Bridge.

31. The intelligent system of claim 30, further comprising an SCL Real-Time Engine (RTE) Unit coupled between said spacecraft bus and said on-board OOCE database and executing on-board said OOCE scripts and OOCE rules stored in said OOCE database, and a Packet Generator unit coupled to said SCL RTE unit to generate on-board command packets under the control of said SCL RTE, said on-board command packets being transmitted to said respective spacecraft components.

32. The intelligent system of claim 28, wherein said OOCE system is loaded and started along with said Autonomy Operations System prior to the-spacecraft launch, wherein said OOCE system starts a functional testing mode thereof substantially at spacecraft separation stage and completes said functional testing mode substantially upon reaching the Sun Track, wherein in said functional test mode and said performance test mode, said OOCE system executes said OOCE scripts defining the sequence of tests to be executed for each said respective component of the spacecraft, and executing conditional logic to skip a following test depending on results from previous tests.

33. An intelligent system for a spacecraft autonomous operations, comprising:
(a) an on-board autonomous operations system, including:
an Autonomous Tasking Engine (ATE) system;
(b) a Remote Intelligent Monitor System (RIMS) in communication with said on-board autonomous operations system through a communication channel, said RIMS including a user interface for Web-based communication with a plurality of user stations; and
(c) a Spacecraft Command Language (SCL) infrastructure system operatively coupled to said ATE system and RIMS;
wherein said ATE system receives objectives uploaded from said RIMS, plans a sequence of on-board actions to attain said objectives, generates SCL based scheduling commands for said on-board actions, and executes said SCL based scheduling commands in a predetermining order, and
wherein said ATE system is coupled to an orbit propagator to schedule, reschedule and execute said SCL based scheduling commands.

34. The intelligent system of claim 33, wherein said ATE system checks for mission constraints violations prior to execution of said SCL based scheduling commands, and wherein said ATE system re-schedules said execution of said onboard actions in a predetermined time window if a mission constraint violation is detected.

35. The intelligent system of claim 33, wherein, based on Latitude and Longitude of a specified target, field of view of an Imager, daylight parameters, conflicts with other components of the spacecraft, and downlink or power constraints, said ATE system further determines a next event to image the specified target.

36. The intelligent system of claim 34, wherein said ATE system performs in a predetermined mode of operation selected from a group consisting of:
  (a) application of a priority scheme for execution if multiple objectives requests are uploaded from said RIMS;
  (b) executing said SCL based scheduling commands on First come-First served (FIFO) basis; and
  (c) blocking out a section of a schedule immune to re-scheduling as a high priority objective.

37. The intelligent system of claim 33, further comprising an on-ground Automated Mission Planning System (AMPS) unit evaluating said objectives against the spacecraft power, thermal model thereof and said orbit propagator data, said AMPS optimizing a schedule of said objectives requests and transmitting said optimized schedule to said RIMS, wherein said RIMS translates said optimized schedule into ATE commands transmitted thereto, said RIMS being hyperlinked with said AMPS unit, and hosting said SCL system, Tomcat Web-Server, and JAVA Server Pages for creating Operations Screens and the Mission Planning Screens at said user stations.

38. The intelligent system of claim 33, wherein said ATE system further includes:
  an ATE Activity Manager (ATE-AM) unit;
  an ATE Plan Manager (ATE-PM) unit,
  an ATE Execution Manager (ATE-EM) unit,
  an ATE Script Scheduler (ATE-SS) unit, and an ATE Event Executive (ATE-EE) unit,
  wherein said Orbit Propagator includes an ATE Near-Term Orbit Propagator (ATE-NTOP) and ATE Long-Term Orbit Propagator (ATE-LTOP),
    upon receiving ATE commands, said ATE-AM unit generating objectives to the ATE commands, and separating said objectives into near-term objectives and a long-term objectives,
    entering a respective SCL script command corresponding to each of said near-term objectives into said ATE-SS unit, and sending said long-term objectives to said ATE-PM unit,
  said ATE-AM unit communicating with said ATE-EE unit to receive therefrom a notification signal for execution of a respective near-term objective,
  said ATE-EM unit being coupled to said ATE-AM unit to receive therefrom an execution time signal for said respective near-term objective, and
  said ATE-AM unit fine tuning execution time signal for said respective near-term objective in accordance with data received from said ATE-NTOP.

39. The intelligent system of claim 38, wherein said ATE-PM unit enters said long-term objectives into a long-term objectives unit, and sends a respective objective from said long-term objectives unit to said ATE-AM unit for adding to said near-term objectives upon receiving a notification signal from said ATE-EE unit,
  wherein said ATE-PM unit fine tunes execution time signal for each of said long-term objectives in accordance with data received from said ATE-LTOP,
  wherein said ATE-AM unit removes said objective from said near-term objective unit when said objective is completed or cannot be completed due to an error occurred during the objective execution or due to failure to schedule said objective execution before a predetermining expiration time thereof,
  wherein said ATE-PM unit defines unscheduled objectives among said long-term objectives based on expiration time thereof, and periodically attempts said unscheduled objectives for execution, and
  wherein said ATE-EM unit performs "just-in-time" mission constraints verification of said near-term objectives prior to execution thereof.

40. The intelligent system of claim 38, further comprising a SCL script schedule, said ATE-SS unit entering said SCL script command into said SCL script schedule a predetermined time period prior to execution of said SCL script command, and deleting said SCL script command from said SCL script schedule upon execution thereof.

* * * * *